United States Patent
Jung et al.

(10) Patent No.: US 11,755,171 B2
(45) Date of Patent: Sep. 12, 2023

(54) ELECTRONIC DEVICE AND SCREENSHOT OPERATION METHOD FOR ELECTRONIC DEVICE

(71) Applicant: SAMSUNG ELECTRONICS CO., LTD., Suwon-si (KR)

(72) Inventors: Inhyung Jung, Suwon-si (KR); Sangheon Kim, Suwon-si (KR); Yeunwook Lim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/957,777

(22) Filed: Sep. 30, 2022

(65) Prior Publication Data
US 2023/0022300 A1    Jan. 26, 2023

Related U.S. Application Data

(63) Continuation of application No. PCT/KR2021/004055, filed on Apr. 1, 2021.

(30) Foreign Application Priority Data

Apr. 2, 2020 (KR) .......... 10-2020-0040153

(51) Int. Cl.
*G06F 3/0481*    (2022.01)
*G06F 3/04842*   (2022.01)
*G06F 1/16*      (2006.01)
*G06F 3/04886*   (2022.01)

(52) U.S. Cl.
CPC .......... *G06F 3/0481* (2013.01); *G06F 1/1616* (2013.01); *G06F 3/04842* (2013.01); *G06F 3/04886* (2013.01)

(58) Field of Classification Search
CPC .. G06F 3/0481; G06F 1/1616; G06F 3/04842; G06F 3/04886
See application file for complete search history.

(56) References Cited

U.S. PATENT DOCUMENTS

| 9,870,623 | B2 | 1/2018 | Roblek et al. |
| 2013/0227457 | A1 | 8/2013 | Kim et al. |
| 2013/0332878 | A1 | 12/2013 | Sung |
| 2014/0313143 | A1 | 10/2014 | Jung et al. |
| 2014/0313389 | A1 | 10/2014 | Kim et al. |

(Continued)

FOREIGN PATENT DOCUMENTS

| KR | 10-2009-0074580 A | 7/2009 |
| KR | 10-2010-0117156 A | 11/2010 |

(Continued)

OTHER PUBLICATIONS

Mohamed El-Serngawy et al., CaptureME: Attacking the User Credential in Mobile Banking Applications, Aug. 1, 2015, IEEE Computer Society, pp. 924-933 (Year: 2015).*

(Continued)

*Primary Examiner* — Tam T Tran

(57) ABSTRACT

A screenshot or screen capture operation method for an electronic device includes: capturing a screen displayed on a display; determining whether additional information exists on the displayed screen; when the additional information exists, extracting the additional information, based on the displayed screen; determining whether a command for modifying the captured screen has been received; when the command for modifying the captured screen is determined as having been received, modifying the captured screen according to a user input; and storing the extracted additional information and/or the captured screen as a captured image. The resulting method enables a user to capture a screen intended or desired by the user.

20 Claims, 26 Drawing Sheets

(56) References Cited

U.S. PATENT DOCUMENTS

| | | | |
|---|---|---|---|
| 2015/0007024 A1 | 1/2015 | Jeong et al. | |
| 2015/0277571 A1* | 10/2015 | Landau | G06F 3/04842 715/863 |
| 2016/0026381 A1 | 1/2016 | Kim et al. | |
| 2017/0308388 A1* | 10/2017 | Gerphagnon | G06F 9/451 |
| 2020/0073903 A1* | 3/2020 | Jain | G06F 40/117 |
| 2020/0151345 A1* | 5/2020 | Chauhan | G06F 21/604 |

FOREIGN PATENT DOCUMENTS

| | | |
|---|---|---|
| KR | 10-2013-0016655 A | 2/2013 |
| KR | 10-2014-0125073 A | 10/2014 |
| KR | 10-2014-0125212 A | 10/2014 |
| KR | 10-2014-0143610 A | 12/2014 |
| KR | 10-2015-0002180 A | 1/2015 |
| KR | 10-2016-0012779 A | 2/2016 |
| KR | 10-2019-0126267 A | 11/2019 |

OTHER PUBLICATIONS

Syeda Mariam Muzammal et al., Screen Stealer: Addressing Screenshot Attacks on Android Devices, Sep. 1, 2016, IEEE Xplore, pp. 1-6 (Year: 2016).*

International Search Report dated Jul. 13, 2021 issued by the International Searching Authority in counterpart International Application No. PCT/KR2021/004055 (PCT/ISA/210).

International Written Opinion dated Jul. 13, 2021 issued by the International Searching Authority in counterpart International Application No. PCT/KR2021/004055 (PCT/ISA/237).

* cited by examiner

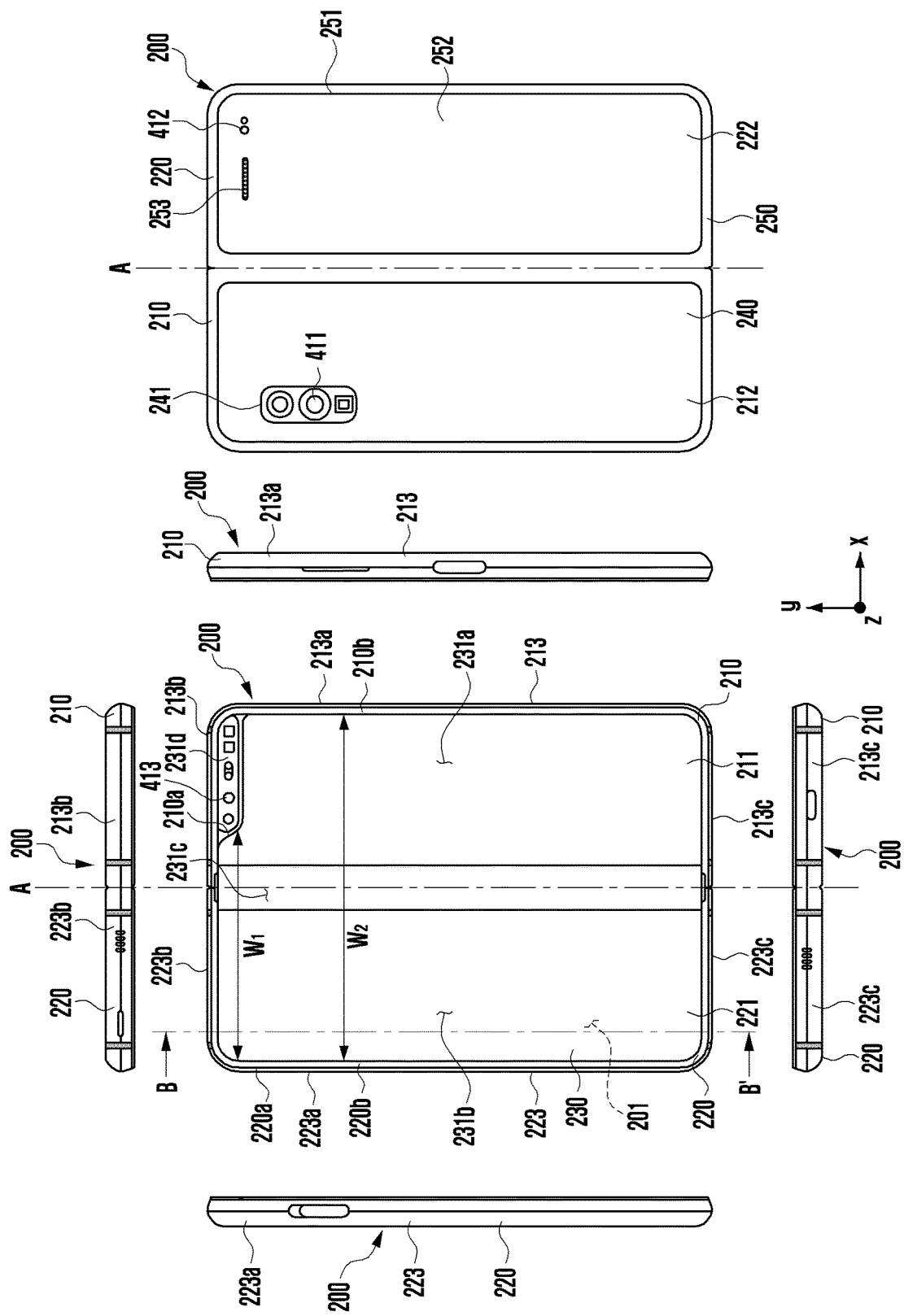

ELECTRONIC DEVICE AND SCREENSHOT OPERATION METHOD FOR ELECTRONIC DEVICE

CROSS-REFERENCE TO RELATED APPLICATIONS

This application is a bypass continuation application of International Application No. PCT/KR2021/004055, filed Apr. 1, 2021, which claims priority to Korean Patent Application No. 10-2020-0040153, filed on Apr. 2, 2020 in the Korean Intellectual Property Office, the disclosures of which are incorporated by reference herein in their entireties.

1. BACKGROUND

1. Field

Various embodiments of the disclosure relate to an electronic device and a screen capture operation method of the electronic device.

2. Description of Related Art

With the development of mobile communication and hardware/software technology, a portable electronic device (hereinafter, an electronic device) represented by a smart phone has continuously evolved to have various functions. The electronic device may include a touch screen-based display to allow a user to easily access various functions, and may provide screens of various applications via the display.

Recently, the electronic device may provide a function that allows a user to capture a screen being displayed on the display.

SUMMARY

There is a problem in that when a user captures a screen of an electronic device, a screen which is unintended by a user may be captured. In addition, a screen which is unintended by a user is captured, so that it is inconvenient for the user to control the electronic device several times.

Provided are an electronic device and a screen capture operation method of the electronic device, which may enable a user to capture a screen intended or desired by the user.

Additional aspects will be set forth in part in the description which follows and, in part, will be apparent from the description, or may be learned by practice of the presented embodiments.

In accordance with an aspect of the disclosure, a capture operation method of an electronic device may include capturing a screen displayed on a display; determining whether additional information exists on the displayed screen; when the additional information exists, extracting the additional information, based on the displayed screen; determining whether a command for modifying the captured screen has been received; when the command for modifying the captured screen is determined as having been received, modifying the captured screen according to a user input; and storing the extracted additional information and/or the captured screen as a captured image.

In accordance with another aspect of the disclosure, an electronic device may include a display; a processor operatively connected to the display; and a memory operatively connected to the processor. The memory may store instructions which, when executed, cause the processor to capture a screen displayed on the display; determine whether additional information exists on the displayed screen; when the additional information exists, extract the additional information, based on the displayed screen; determine whether a command for modifying the captured screen has been received; when the command for modifying the captured screen is determined as having been received, modify the captured screen according to a user input; and store the extracted additional information and/or the captured screen as a captured image in the memory.

An electronic device and a screen capture operation method of the electronic device according to various embodiments of the disclosure may provide a user interface capable of capturing a screen intended or desired by a user, thereby improving user experience.

An electronic device and a screen capture operation method of the electronic device according to various embodiments of the disclosure may provide a user interface capable of capturing a screen intended or desired by a user, thereby reducing the inconvenience that the user is required to control the electronic device several times to capture the screen.

BRIEF DESCRIPTION OF THE DRAWINGS

FIG. 2A is a diagram illustrating a flat state of an electronic device according to various embodiments of the disclosure;

DETAILED DESCRIPTION

Figure 1:
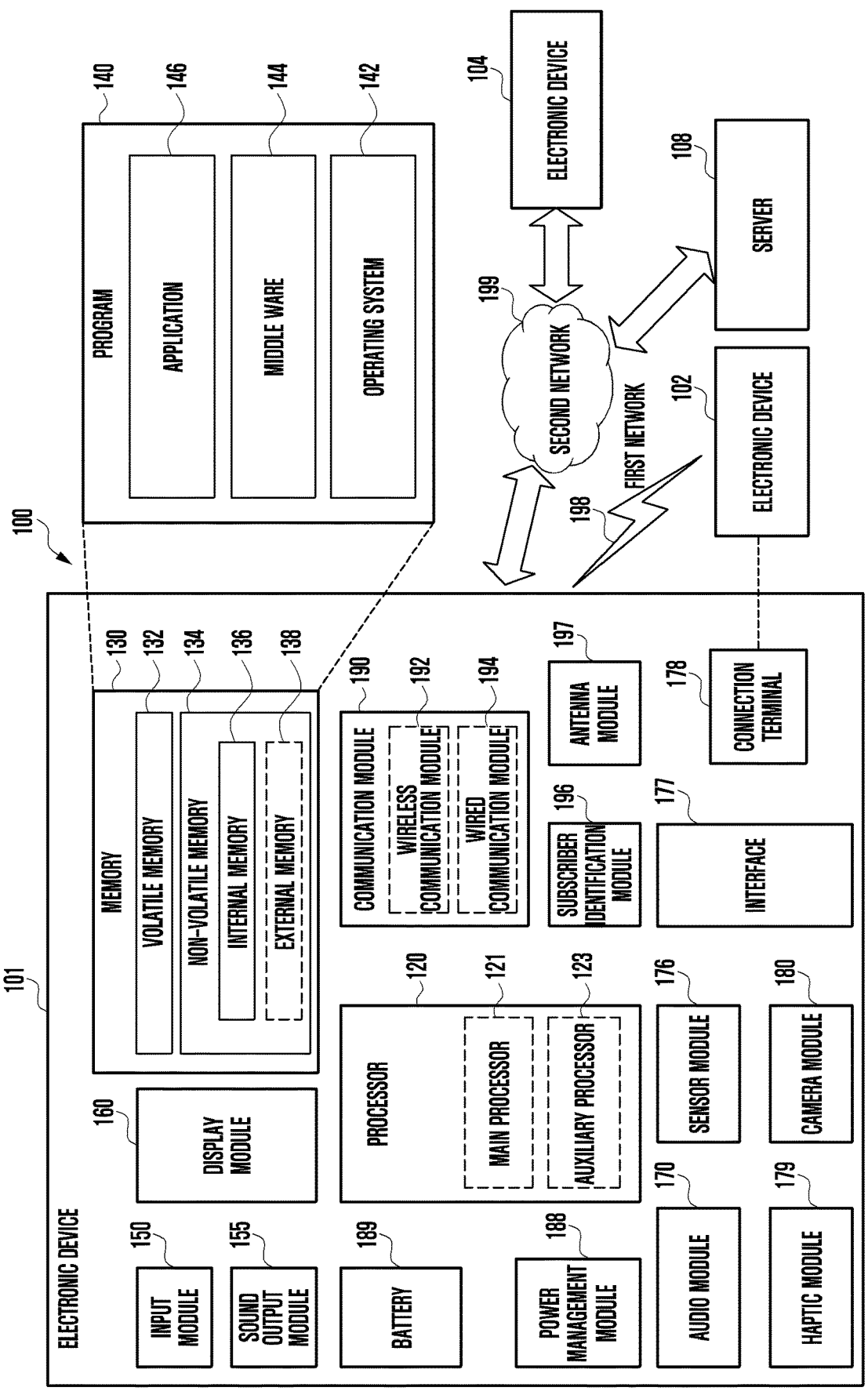
FIG. 1 is a block diagram of an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2B:
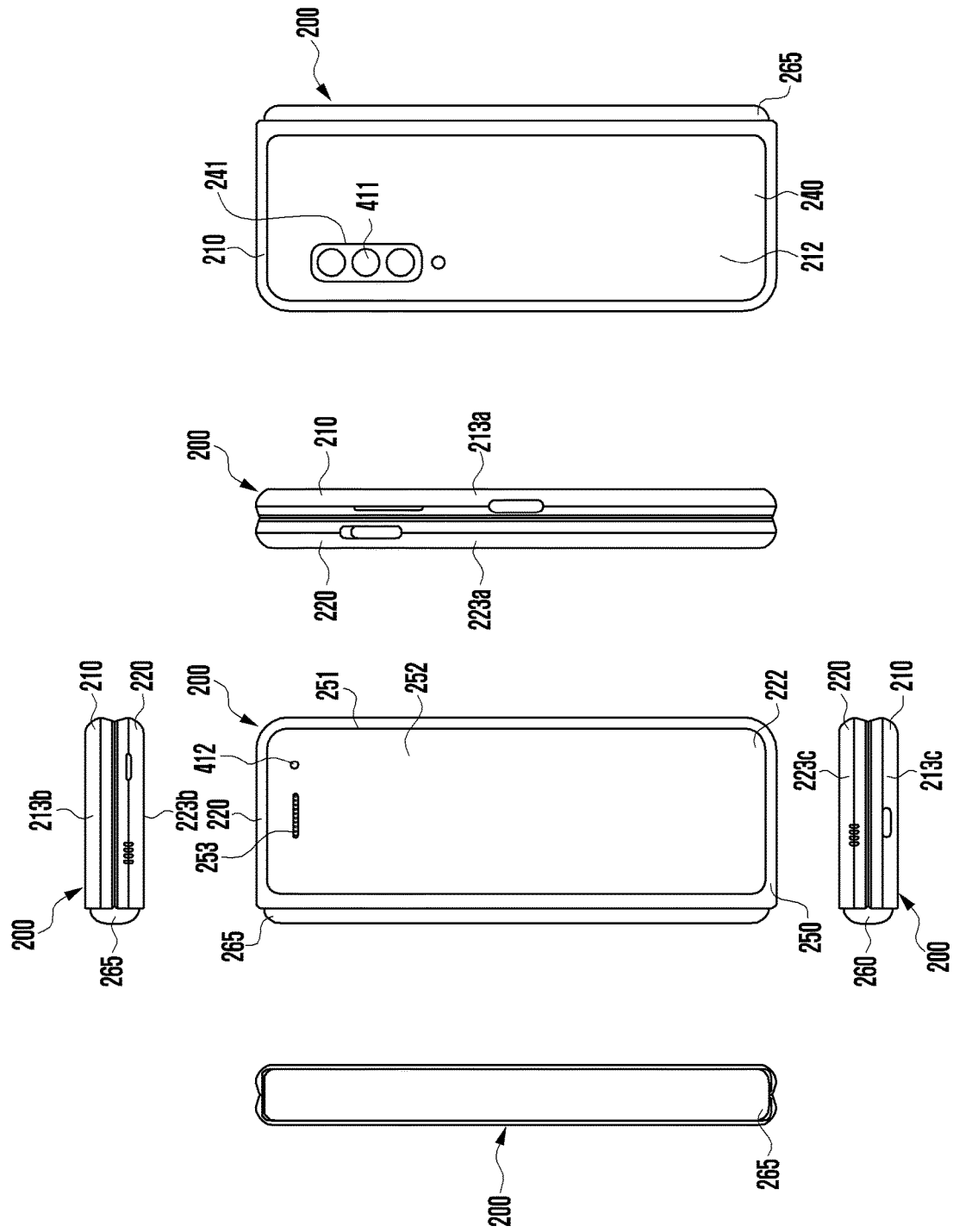
FIG. 2B is a diagram illustrating a folded state of the electronic device of FIG. 2A according to various embodiments of the disclosure.

FIG. 2A is a diagram illustrating a flat state of an electronic device according to various embodiments of the disclosure. FIG. 2B is a diagram illustrating a folded state of the electronic device of FIG. 2A according to various embodiments of the disclosure.

Referring to FIG. 2A, an electronic device 200 (e.g., the electronic device 101 of FIG. 1) may include a first housing structure 210 and a second housing structure 220 including at least one space in which at least one display can be arranged, at least one display 230 (e.g., a flexible display, a foldable display, or a first display) disposed in the at least one space, a second display (e.g., a sub-display) disposed on one surface of the second housing structure 220, a hinge structure configured to allow the first housing structure 210 and the second housing structure 220 to be folded on each other, and a hinge cover 265 configured to cover foldable portions of the first housing structure 210 and the second housing structure 220. Herein, a surface on which the first display 230 is disposed may be defined as a front surface of the electronic device 200, and an opposite surface to the front surface may be defined as a rear surface of the electronic device 200. In addition, a surface surrounding a space between the front surface and the rear surface may be defined as a side surface of the electronic device 200.

In an embodiment, a pair of housing structures 210 and 220 may include the first housing structure 210 including a sensor area 231*d*, the second housing structure 220, a first rear cover 240, and a second rear cover 250. The pair of housing structures 210 and 220 of the electronic device 200 are not limited to the shape and coupling shown in FIGS. 2A and 2B, and may be implemented by a combination and/or coupling of different shapes or components. For example, in another embodiment, the first housing structure 210 and the first rear cover 240 may be integrally configured, and the second housing structure 220 and the second rear cover 250 may be integrally configured.

According to an embodiment, the first housing structure 210 and the second housing structure 220 may be configured as one housing (not shown), and a folded portion of the one housing may be made of a flexible material (not shown), and a hinge structure 264 may not be configured separately but replaced with a flexible material. According to various embodiments, the first housing structure 210 and the second housing structure 220 may be disposed on both sides with respect to a folding axis A, and may be folded or unfolded with respect to the folding axis (axis A). According to an embodiment, an angle or distance between the first housing structure 210 and the second housing structure 220 may be different according to whether a state of the electronic device 200 is a flat state or an open state, is a folded state, or is an intermediate state. At least a partial area of the first housing structure 210 or the second housing structure 220 may include the sensor area 231*d* in which various sensors are disposed. In another embodiment, the sensor area 231*d* may be additionally disposed or replaced in at least a partial area of the second housing structure 220.

According to an embodiment, an angle between the first housing structure 210 and the second housing structure 220 may be adjusted by the hinge structure. According to an embodiment, when the first housing structure 210 and the second housing structure 220 face the same surface (e.g., the front surface) or are substantially parallel to the same axis (X-axis), the electronic device 200 may be configured to be in an open state. According to an embodiment, in the electronic device 200, the first display 230 may be disposed in a space configured by the first housing structure 210 and the second housing structure 220, the first display 230 may include a first surface 211 and a third surface 221, and a flexible area which can be bent at a predetermined angle may be configured between the first surface 211 and the third surface 221. According to an embodiment, the first display 230, at least a partial area of which can be bent, may have an area bendable in various forms in addition to the first surface 211 and the third surface 221, and the number of the bendable area is not limited to one. According to various embodiments, the hinge structure (e.g., 264 in FIG. 3) may be disposed in an area in which the first display 230 can be bent, and when the first display 230 is bent, the hinge structure may support the first display 230 to maintain a constant angle in a state where the first display is bent.

According to an embodiment, the first housing structure 210 may include the first surface 211 disposed to face the front surface, a second surface 212 facing an opposite direction to the first surface 211, and a first lateral member 213 surrounding at least a part of a space between the first surface 211 and the second surface 212. In an embodiment, the first lateral member 213 may include a first side surface 213*a* disposed substantially in parallel to the folding axis (A axis), a second side surface 213*b* extending from one end of the first side surface 213*a* in a direction substantially perpendicular to the folding axis, and a third side surface 213*c* extending from the other end of the first side surface 213*a* in a direction substantially perpendicular to the folding axis (A axis).

In an embodiment, at least a part of the second housing structure 220 may be connected to the hinge structure, and the second housing structure 220 may include the third surface 221 disposed to face the front surface of the electronic device 200, a fourth surface 222 facing an opposite direction to the third surface 221, and a second lateral member 223 surrounding at least a part of a space between the third surface 221 and the fourth surface 222. In an embodiment, the second lateral member 223 may include a fourth side surface 223*a* disposed substantially in parallel to the folding axis (A axis), a fifth side surface 223*b* extending from one end of the fourth side surface 223*a* in a direction substantially perpendicular to the folding axis (A axis), and a sixth side surface 223*c* extending from the other end of the fourth side surface 223*a* in a direction substantially perpendicular to the folding axis (A axis). In an embodiment, the third surface 221 may face the first surface 211 to be opposite thereto in a folded state.

In an embodiment, the electronic device 200 may include a recess 201 configured to receive the first display 230 which is at least partially bendable through structural shape coupling of the first housing structure 210 and the second housing structure 220. According to an embodiment, the recess 201 may have substantially the same size as that of the first display 230. In an embodiment, due to the sensor area 231d, the recess 201 may have two or more different widths in a direction substantially perpendicular to the folding axis (A axis). For example, the recess 201 may have a first width W1 between a first portion 220a of the second housing structure 220 and a first portion 210a disposed at the periphery of the sensor area 231d in the first housing structure 210, and may have a second width W2 by a second portion 220b of the second housing structure 220 and a second portion 210b substantially parallel to the folding axis (A axis) while not corresponding to the sensor area 213d in the first housing structure 210. According to various embodiments, the width of the recess 201 may not be limited to the illustrated example. According to various embodiments, the recess 201 may have two or more different widths or have substantially the same width.

In an embodiment, at least a part of the first housing structure 210 and the second housing structure 220 may be made of a metal or non-metal material having a rigidity of a selected size to support the first display 230.

In an embodiment, the sensor area 231d may be configured to be adjacent to one corner of the first housing structure 210 and have a predetermined area. The arrangement, shape, or size of the sensor area 231d may not be limited to the illustrated example. According to various embodiments, at least one of a front camera device, a receiver, a proximity sensor, an ultrasonic sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an indicator may be disposed in at least a partial area of the sensor area 231d. In various embodiments, the components may be disposed inside the electronic device without a separate sensor area. For example, at least a part of the components may be disposed under the first display 230 or may be viewed through a partial area of the first display 230.

In an embodiment, the first rear cover 240 may be disposed on the second surface 212 of the first housing structure 210 and may substantially have a rectangular periphery. In an embodiment, at least a part of the periphery may be surrounded by the first housing structure 210. Similarly, the second rear cover 250 may be disposed on the fourth surface 222 of the second housing structure 220, and at least a part of a periphery of the second rear cover may be surrounded by the second housing structure 220.

In the illustrated embodiment, the first rear cover 240 and the second rear cover 250 may substantially have a symmetrical shape with reference to the folding axis (A axis). In another embodiment, the first rear cover 240 and the second rear cover 250 may include various different shapes. In another embodiment, the first rear cover 240 may be integrally configured with the first housing structure 210, and the second rear cover 250 may be integrally configured with the second housing structure 220.

In an embodiment, the first rear cover 240, the second rear cover 250, the first housing structure 210, and the second housing structure 220 may be coupled to each other to provide a space in which various components (e.g., a printed circuit board, an antenna module, a sensor module, or a battery) of the electronic device 200 may be disposed, through the coupling structure. In an embodiment, one or more components may be disposed on the rear surface of the electronic device 200 or visually viewed through the rear surface. For example, one or more components or sensors may be visually viewed through a first rear area 241 of the first rear cover 240. In various embodiments, the sensor may include a proximity sensor, a rear camera device, and/or a flash. In another embodiment, at least a part of a sub-display 252 (e.g., the second display) may be visually viewed through a second rear area 251 of the second rear cover 250. In another embodiment, the electronic device 200 may include a speaker module 253 disposed through at least a partial area of the second rear cover 250.

The first display 230 may be disposed in a space configured by the first and second housing structures 210 and 220. For example, the first display 230 may be seated in the recess 201 formed by the first and second housing structures 210 and 220, and be disposed to occupy substantially most parts of the front surface of the electronic device 200. Accordingly, the front surface of the electronic device 200 may include the first display 230, and a partial area (e.g., a periphery area) of the first housing structure 210 and a partial area (e.g., a periphery area) of the second housing structure 220, which are adjacent to the first display 230. In an embodiment, the rear surface of the electronic device 200 may include the first rear cover 240, a partial area (e.g., a periphery area) of the first housing structure 210, which is adjacent to the first rear cover 240, the second rear cover 250, and a partial area (e.g., a periphery area) of the second housing structure 220, which is adjacent to the second rear cover 250.

In an embodiment, the first display 230 may refer to a display, at least a partial area of which can be transformed into a flat surface or a curved surface. In an embodiment, the first display 230 may include a folding area 231c, a first area 231a disposed on one side (e.g., a right area of the folding area 231c) with reference to the folding area 231c, and a second area 231b disposed on the other side (e.g., a left area of the folding area 231c). For example, the first area 231a may be disposed on the first surface 211 of the first housing structure 210, and the second area 231b may be disposed on the third surface 221 of the second housing structure 220. In an embodiment, the area division of the first display 230 is exemplary, and the first display 230 may be divided into multiple (e.g., four or more, or two) areas according to a structure or a function. For example, in the embodiment illustrated in FIG. 2A, an area of the first display 230 may be divided by the folding axis (A-axis) or the folding area 231c extending substantially in parallel to the y-axis. However, in another embodiment, an area of the first display 230 may be divided with reference to another folding area (e.g., a folding area substantially parallel to the x-axis) or another folding axis (e.g., a folding axis substantially parallel to the x-axis). The above-described area division of the display merely corresponds to a physical division by the pair of housing structures 210 and 220 and the hinge structure, and practically, the first display 230 may display one entire screen through the pair of housing structures 210 and 220 and the hinge structure. In an embodiment, unlike the second area 231b, the first area 231a may include a notch area obtained through cutting according to the existence of the sensor area 231d. In an embodiment, the first area 231a and the second area 231b may include symmetrical portions and asymmetrical portions.

Referring to FIG. 2B, the hinge cover 265 may be disposed between the first housing structure 210 and the second housing structure 220 and configured to cover an internal component. In an embodiment, the hinge cover 265 may be hidden by a part of the first housing structure 210 and the second housing structure 220, or may be seen from the outside according to an operation state (e.g., a flat state or a folded state) of the electronic device 200.

Hereinafter, operations of the first housing structure 210 and the second housing structure 220 and each area of the first display 230 will be described according to the operation state (e.g., a flat state and a folded state) of the electronic device 200.

In an embodiment, when the electronic device 200 is in a flat state (e.g., a state in FIG. 2A), the first housing structure 210 and the second housing structure 220 may form a horizontal angle (e.g., 180 degrees). In a flat state (e.g., a first designated state), the first area (e.g., 231a of FIG. 2A) and the second area (e.g., 231b of FIG. 2A) of the display may be disposed in substantially the same direction. In addition, when the electronic device is in a flat state, the folding area (e.g., 231c of FIG. 2A) may form substantially the same plane as the first area 231a and the second area 231b. In another embodiment, when the electronic device 200 is in a flat state, the first housing structure 210 and the second housing structure 220 may be, for example, folded in the reverse direction such that an angle formed by the second housing structure 220 with reference to the first housing structure 210 is changed to be 360 degrees through rotation to allow the second surface 212 and the fourth surface 222 to face each other.

In an embodiment, when the electronic device 200 is in an intermediate state (e.g., a second designated state, undepicted), the first housing structure 210 and the second housing structure 220 may be disposed at a certain angle (e.g., between 10 and 90 degrees). The first area (e.g., 231a of FIG. 2A) and the second area (e.g., 231b of FIG. 2A) of the first display 230 may form an angle larger than that in a folded state and smaller than that in a flat state. At least a part of the folding area (e.g., 231c of FIG. 2A) may be formed to have a curved surface having a predetermined curvature, and the curvature may be smaller than that in a folded state.

In an embodiment, when the electronic device 200 is in a folded state (e.g., a state in FIG. 2B or a third designated state), the first housing structure 210 and the second housing structure 220 may be disposed to face each other. An angle between the first area (e.g., 231a of FIG. 2A) and the second area (e.g., 231b of FIG. 2A) of the first display 230 may form an acute angle (e.g., between 0 and 10 degrees), and the first area and the second area may be disposed to face each other. At least a part of the folding area (e.g., 231c of FIG. 2A) may be formed to have a curved surface having a predetermined curvature.

Figure 3:
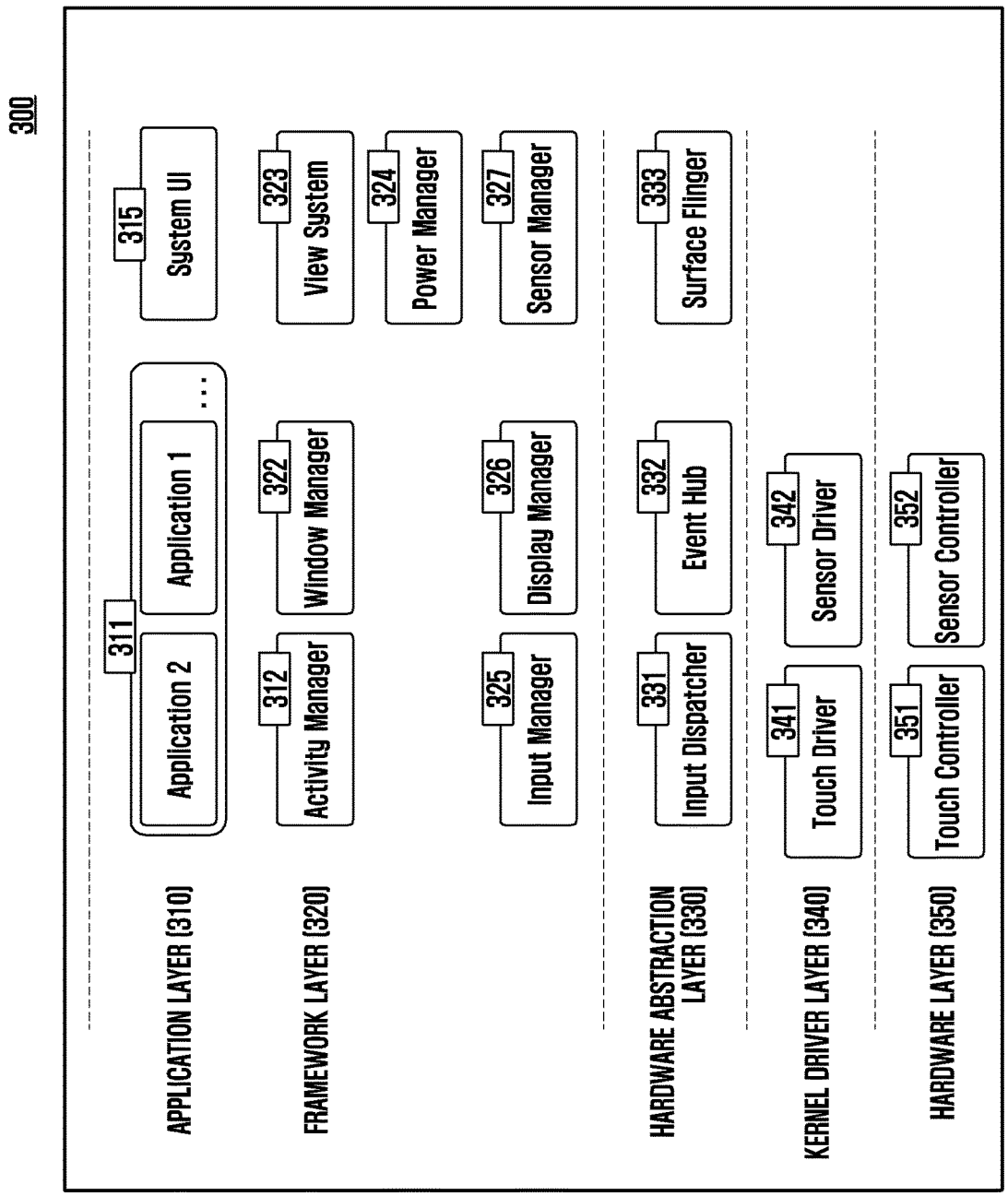
FIG. 3 is a diagram illustrating a software structure of an electronic device according to various embodiments of the disclosure.

FIG. 3 is a diagram illustrating a software structure 300 of an electronic device (e.g., the electronic device 101 of FIG. 1 or the electronic device 200 of FIG. 2A) according to various embodiments of the disclosure.

According to various embodiments of the disclosure, at least a part of the illustrated configuration may be changed according to a platform included in the electronic device (e.g., the electronic device 101 of FIG. 1 or the electronic device 200 of FIG. 2A).

An application layer 310 may include at least one application 311 (e.g., the application 146 of FIG. 1) and a system user interface (UI) 315 which are stored in a memory (e.g., the memory 130 of FIG. 1) and executable by a processor (e.g., the processor 120 of FIG. 1). The application 311 may include an Internet browser, a video application, a game, and the like, and the type of the application may not be limited thereto. The system UI 315 may refer to an application configuring various graphical user interface (GUI) screens implemented on a system of the electronic device, such as a notification bar or a quick view.

A framework layer (framework) 320 may provide various functions to the application 311 such that a function or information provided from one or more resources of the electronic device (e.g., the electronic device 101 of FIG. 1 or the electronic device 200 of FIG. 2A) can be used by the application 311.

The framework layer 320 may include an activity manager 312, a window manager 322, a view system 323, a power manager 324, an input manager 325, a display manager 326, and a sensor manager 327.

The activity manager 312 may control an activity stack and the lifecycle of an application.

The window manager 322 may manage one or more GUI resources used in a screen of the electronic device (e.g., the electronic device 101 of FIG. 1 or the electronic device 200 of FIG. 2A).

The view system 323 may be a set of extensible views used to generate an application user interface.

The power manager 324 may manage a capacity, temperature, or power of a battery of the electronic device (e.g., the electronic device 101 of FIG. 1 or the electronic device 200 of FIG. 2A), and use corresponding information among the managed capacity, temperature, or power to determine or provide relevant information required for an operation of the electronic device (e.g., the electronic device 101 of FIG. 1 or the electronic device 200 of FIG. 2A).

The input manager 325 may be a module (key layout, etc.) configured to provide information of an input device (e.g., the input device 150 of FIG. 1) provided by the electronic device (e.g., the electronic device 101 of FIG. 1 or the electronic device 200 of FIG. 2A).

The display manager 326 may manage the lifecycle (connection/attribute change/removal) of a display device (e.g., the display device 160 of FIG. 1), and manage hardware display mapping (H/W display mapping) to output a screen GUI element (window). The display manager 326 may function to change the display device (e.g., the display device 160 of FIG. 1) to be output by a system event such as a folding state change.

The sensor manager 327 may control an operation of a sensor module (e.g., the sensor module 176 of FIG. 1), based on usability such as an application of a sensor.

A hardware abstraction layer (HAL) 330 may refer to an abstracted layer between software of the electronic device and multiple hardware modules included in a hardware layer 350. The hardware abstraction layer 330 may include an input dispatcher 331, an event hub 332 configured to provide an interface which standardizes an event occurring in a sensor, or a surface flinger 333. The input dispatcher 331 may perform a function of determining an application 311 to which an occurred event is to be provided. The surface flinger 333 may perform a function of providing an execution screen to be displayed on the display device (e.g., the display device 160 of FIG. 1) among execution screens generated by various applications 311, and when a configuration of a display (e.g., the display device 160 of FIG. 1) is changed, the surface flinger may request the application 311 to process a change in resolution and density according to the changed configuration of the display (e.g., the display device 160 of FIG. 1). The event hub 332 may be an interface module in which an event occurring in a touch module and a sensor module (e.g., the sensor module 176 of FIG. 1) are standardized. The input dispatcher 331 may be a module which transfers an input event to an input target window process.

A kernel driver layer 340 may include various drivers for controlling various hardware modules included in the electronic device (e.g., the electronic device 101 of FIG. 1 or the electronic device 200 of FIG. 2A). The kernel driver layer 340 may include a touch driver 341 including an interface module which controls a touch controller 351, and a sensor driver 342 including an interface module which controls a sensor controller 352 connected to a sensor. The touch driver 341 may be an interface module which controls the touch controller 351. The sensor driver 342 may be an interface module which controls the sensor controller 352.

The hardware layer 350 may include the touch controller 351 and the sensor controller 352.

The touch controller 351 may be a module which controls a touch circuit configured on the display (e.g., the display device 160 of FIG. 1) to receive a touch input.

The sensor controller 352 may include a Hall sensor for detecting a folding state of a foldable electronic device (e.g., the electronic device 200 of FIG. 2).

Figure 4:
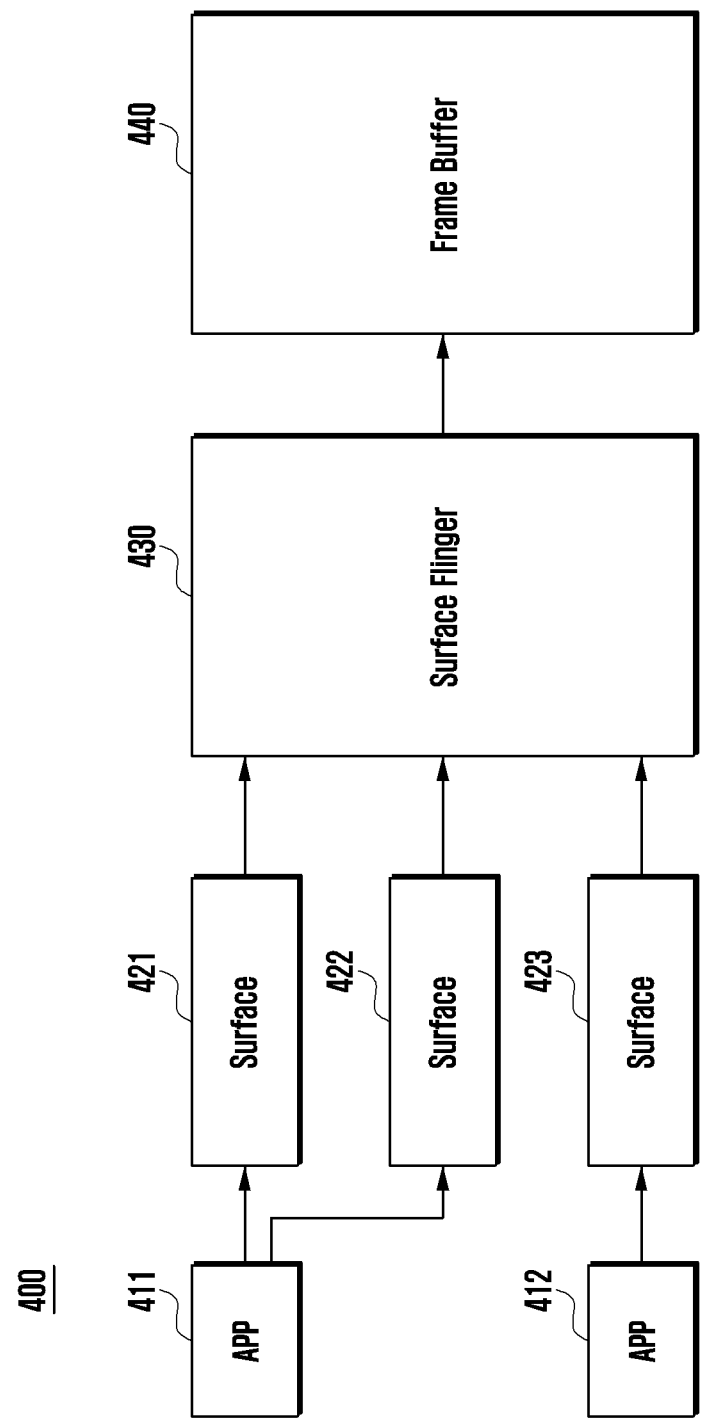
FIG. 4 is a block diagram illustrating a drawing engine of an electronic device according to various embodiments of the disclosure.

FIG. 4 is a block diagram illustrating a drawing engine 400 of an electronic device (e.g., the electronic device 101 of FIG. 1 or the electronic device 200 of FIG. 2A) according to various embodiments of the disclosure.

Referring to FIG. 4, the electronic device (e.g., the electronic device 101 of FIG. 1 or the electronic device 200 of FIG. 2A) may designate a partial area of a memory (e.g., the memory 130 of FIG. 1) as surfaces 421, 422, and 423 for recording execution states of applications 411 and 412 (e.g., the application 311 of FIG. 3).

A surface flinger 430 (e.g., the surface flinger 333 of FIG. 3) may determine whether to display, on a screen, an execution screen of an application recorded on the surfaces 421, 422, 423, and may request the applications 411 and 412 to process a change in resolution and density when a display configuration is changed.

A frame buffer 440 may store an execution screen corresponding to display resolution and density generated by each of the applications 411 and 412.

The surface flinger 430 may store, in the frame buffer 440, an execution screen corresponding to display resolution and density generated by each of the applications 411 and 412 and recorded on the surfaces 421, 422, and 423.

Figure 5:
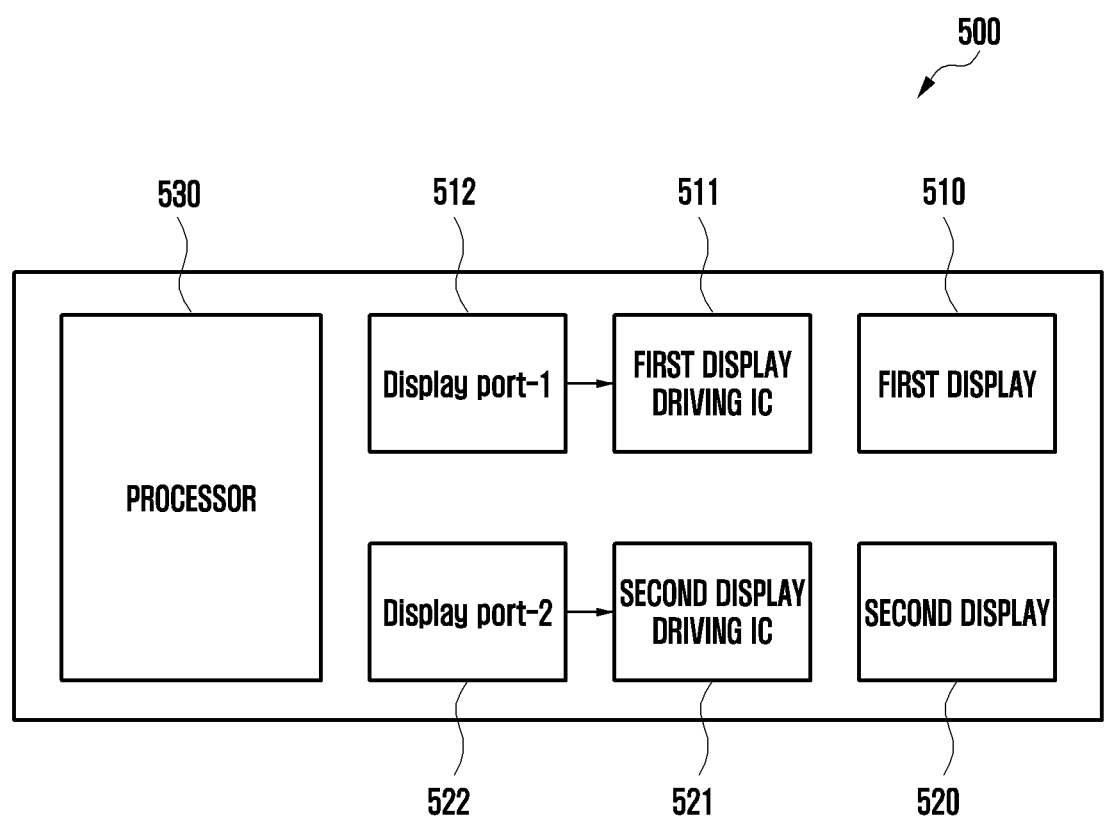
FIG. 5 is a block diagram illustrating a configuration related to a display of an electronic device according to various embodiments of the disclosure.

FIG. 5 is a block diagram illustrating a configuration related to a display (e.g., the display device 160 of FIG. 1, or the display 230 or the sub-display 252 of FIG. 2A) of an electronic device (e.g., the electronic device 101 of FIG. 1 or the electronic device 200 of FIG. 2A) according to various embodiments of the disclosure.

According to various embodiments, a first display driving IC 511 may include an interface module (not shown), a memory (e.g., a buffer memory) (not shown), an image processing module (not shown), or a mapping module (not shown). The first display driving IC 511 may receive, for example, image data or image information including an image control signal corresponding to a command for controlling the image data from another component of an electronic device 600 (e.g., the electronic device 101 of FIG. 1 or the electronic device 200 of FIG. 2A) via the interface module. For example, the first display driving IC 511 may receive the image information from a processor 530 (e.g., the processor 120 of FIG. 1), or receive the image information from a coprocessor 530 (e.g., the processor 120 of FIG. 1) (e.g., a graphics processing unit) which operates independently of a function of the processor 530 (e.g., the processor 120 of FIG. 1). According to an embodiment, the first display driving IC 511 may communicate with a touch circuit or a sensor module via the interface module. According to an embodiment, the first display driving IC 511 may store at least a part of the received image information in a memory, for example, in units of frames. According to an embodiment, for example, the image processing module may perform pre-processing or post-processing (e.g., resolution, brightness, or size adjustment) of at least a part of the image data, based at least in part on a characteristic of the image data or a characteristic of a first display 510. According to an embodiment, the mapping module may generate a voltage value or a current value corresponding to the image data pre-processed or post-processed via the image processing module. According to an embodiment, the generation of the voltage value or the current value may be performed, for example, based at least in part on attributes (e.g., an array (a RGB stripe or pentile structure) of pixels, or a size of each of sub-pixels) of pixels of the first display 510. For example, at least some pixels of the first display 510 are driven based at least in part on the voltage value or the current value, so that visual information (e.g., text, an image, or an icon) corresponding to the image data may be displayed via the first display 510.

According to an embodiment, a second display driving IC 621 may drive a second display 520 to display an image based on image information received from the processor 530 (e.g., the processor 120 of FIG. 1). According to an embodiment, the second display driving IC 521 may include the same or similar component as the first display driving IC 511, differing only in driving the second display 520. For example, the second display driving IC 521 may include an interface module (not shown), a memory (e.g., a buffer memory) (not shown), an image processing module (not shown), or a mapping module (not shown), which performs a function similar to the first display driving IC 511.

According to an embodiment, the processor 530 (e.g., the processor 120 of FIG. 1) may include a first display port 512 operatively connected to the first display driving IC 511, and a second display port 522 operatively connected to the second display driving IC 521. For example, the processor 530 (e.g., the processor 120 of FIG. 1) may transmit first image information to the first display driving IC 511 through the first display port 512, and transmit second image information to the second display driving IC 521 through the second display port 522.

According to an embodiment, the first image information and the second image information may be the same. For example, the processor 530 (e.g., the processor 120 of FIG. 1) may transmit image information including the same image data to the first display driving IC 511 and the second display driving IC 521.

According to another embodiment, image data included in the second image information may include at least a part of image data included in the first image information. For example, the processor 530 (e.g., the processor 120 of FIG. 1) may receive an input for selecting a part of first image data (e.g., the entire image displayed on the first display 510) from a user, and transmit second image data (e.g., a part of the entire image displayed on the first display 510), which is a part of the first image data, to the second display driving IC 521, based on the input.

According to another embodiment, the processor 530 (e.g., the processor 120 of FIG. 1) may transmit the same image data to the first display driving IC 511 and the second display driving IC 521, and additionally transmit coordinate information based on the user input to the second display driving IC 521. For example, the coordinate information may be coordinate information (e.g., a coordinate of the second image data) defining a part of the first image data selected by the user, and the second display driving IC 521 may drive the second display 520 to display a part (e.g., the second image data) of the first image data, based on the coordinate information.

According to an embodiment, the first display 510 and/or the second display 520 may be one of the display device 160 of FIG. 1, the display 230 of FIG. 2A, and/or the sub-display 252 of FIG. 2A.

Figure 6:
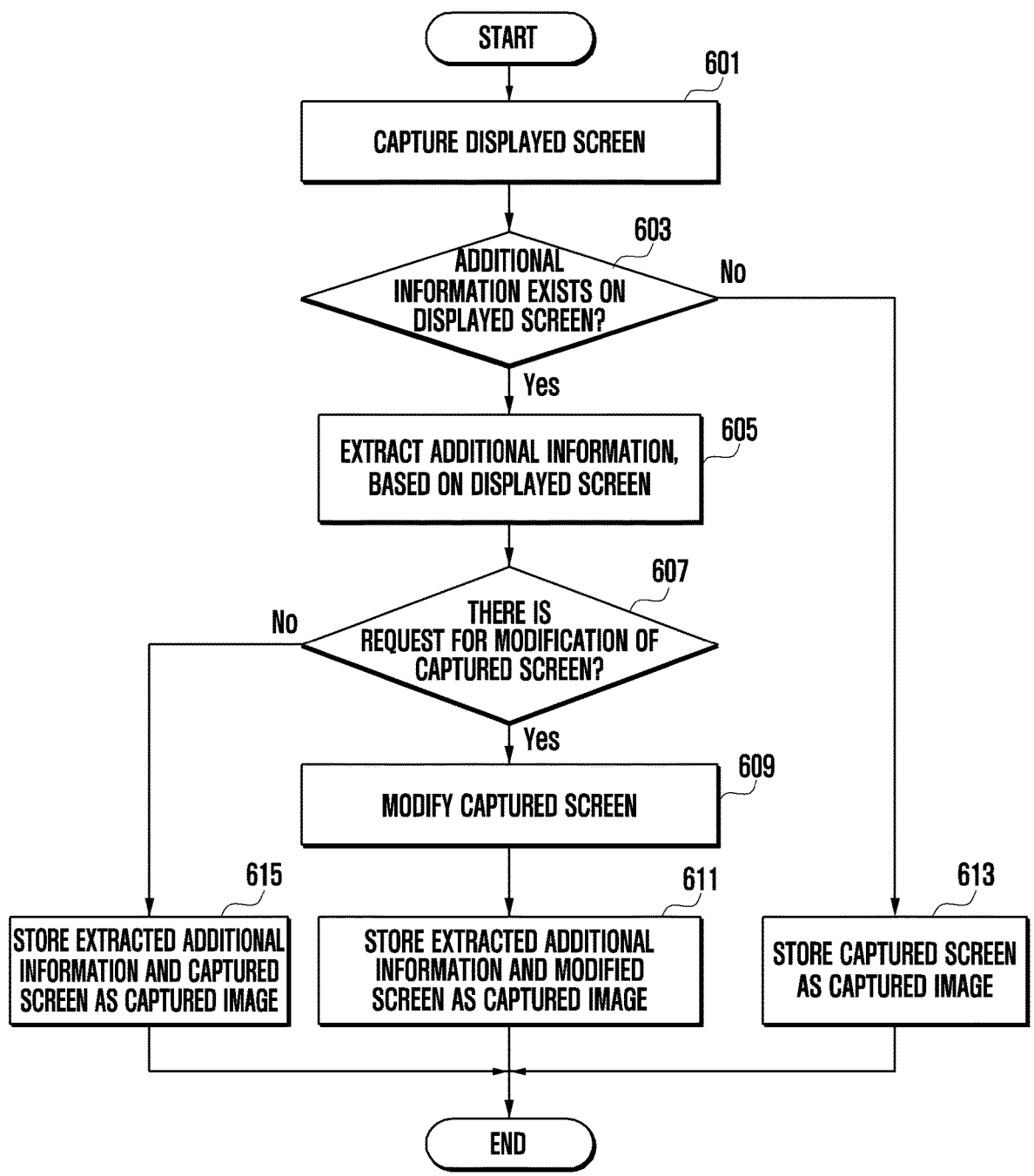
FIG. 6 is a flowchart illustrating a method of capturing a screen of an electronic device according to various embodiments of the disclosure.

FIG. 6 is a flowchart illustrating a method of capturing a screen of an electronic device (e.g., the electronic device 101 of FIG. 1 or the electronic device 200 of FIG. 2A) according to various embodiments of the disclosure.

According to various embodiments, the electronic device (e.g., the electronic device 101 of FIG. 1 or the electronic device 200 of FIG. 2A) may capture a screen displayed on a display (e.g., the display device 160 of FIG. 1, or the display 230 or the sub-display 252 of FIG. 2A) according to a capture command, in operation 601, under the control of a processor (e.g., the processor 120 of FIG. 1).

According to various embodiments, the displayed screen may be a screen in which image or video information is displayed in a window and/or a layout activated on the display (e.g., the display device 160 of FIG. 1, or the display 230 or the sub-display 252 of FIG. 2A).

According to various embodiments, the displayed screen may include a user interface of a running application. The application may correspond to a running application stored in one window frame buffer screen or multiple window frame buffers. According to various embodiments, the capturing operation may include an operation of acquiring and/or generating an image of a still image of a screen displayed on the display (e.g., the display device 160 of FIG. 1, or the display 230 or the sub-display 252 of FIG. 2A).

According to various embodiments, the electronic device (e.g., the electronic device 101 of FIG. 1 or the electronic device 200 of FIG. 2A) may request rendering information from the display (e.g., the display device 160 of FIG. 1, or the display 230 or the sub-display 252 of FIG. 2A) or the application in order to acquire an image of a still image, in operation 601, under the control of the processor (e.g., the processor 120 of FIG. 1). The rendering information may be information required for the display (e.g., the display device 160 of FIG. 1, or the display 230 or the sub-display 252 of FIG. 2A) to display a graphic object. For example, the electronic device (e.g., the electronic device 101 of FIG. 1 or the electronic device 200 of FIG. 2A) may request and acquire rendering information from a driving circuit of the display (e.g., the display device 160 of FIG. 1, or the display 230 or the sub-display 252 of FIG. 2A) to generate an image of a still image, under the control of the processor (e.g., the processor 120 of FIG. 1). For example, the electronic device (e.g., the electronic device 101 of FIG. 1 or the electronic device 200 of FIG. 2A) may request and acquire rendering information from the application to generate an image of a still image, under the control of the processor (e.g., the processor 120 of FIG. 1).

According to various embodiments, the electronic device (e.g., the electronic device 101 of FIG. 1 or the electronic device 200 of FIG. 2A) may acquire an image including a still image of an image displayed on the display (e.g., the display device 160 of FIG. 1, or the display 230 or the sub-display 252 of FIG. 2A), based on the acquired rendering information, in operation 601, under the control of the processor (e.g., the processor 120 of FIG. 1).

According to various embodiments, a command for capturing a screen of the electronic device (e.g., the electronic device 101 of FIG. 1 or the electronic device 200 of FIG. 2A) may include a command for selecting an object area to capture a screen and/or a command for capturing the entire screen.

According to various embodiments, a command for capturing a screen of the electronic device (e.g., the electronic device 101 of FIG. 1 or the electronic device 200 of FIG. 2A) may be performed by, for example, a key input, a touch input, a voice input, or a stylus input.

According to various embodiments, when an input by a combination of a plurality of button keys (e.g., the input device 150 of FIG. 1) is received, the electronic device (e.g., the electronic device 101 of FIG. 1 or the electronic device 200 of FIG. 2A) may capture a displayed screen.

According to various embodiments, when a specific gesture by a touch input is received, the electronic device (e.g., the electronic device 101 of FIG. 1 or the electronic device 200 of FIG. 2A) may capture a displayed screen. For example, the specific gesture by the touch input may be a gesture in which a user swipes the display (or a touch screen) with the edge or palm of his/her hand in a specific direction.

According to various embodiments, when a voice input is received, the electronic device (e.g., the electronic device 101 of FIG. 1 or the electronic device 200 of FIG. 2A) may capture a displayed screen. For example, the voice input may be a user voice including a specific word and/or an instruction. The electronic device (e.g., the electronic device 101 of FIG. 1 or the electronic device 200 of FIG. 2A) may receive and recognize the voice input through a voice recognition platform (e.g., Bixby).

According to various embodiments, when a stylus input is received, the electronic device (e.g., the electronic device 101 of FIG. 1 or the electronic device 200 of FIG. 2A) may capture a displayed screen.

According to various embodiments, when an input for selecting an object area according to a touch input of a stylus pen is received, the electronic device (e.g., the electronic device 101 of FIG. 1 or the electronic device 200 of FIG. 2A) may determine the input as a command for selecting an object area to capture a screen, under the control of the processor (e.g., the processor 120 of FIG. 1).

According to various embodiments, when an input for executing an object area selection function and selecting an object area according to a touch input (e.g., a stylus pen or a hand touch) is received, the electronic device (e.g., the electronic device 101 of FIG. 1 or the electronic device 200 of FIG. 2A) may determine the input as a command for selecting an object area to capture a screen, under the control of the processor (e.g., the processor 120 of FIG. 1).

According to various embodiments, the electronic device (e.g., the electronic device 101 of FIG. 1 or the electronic device 200 of FIG. 2A) may determine whether additional information exists on a displayed screen, in operation 603, under the control of the processor (e.g., the processor 120 of FIG. 1).

According to various embodiments, the electronic device (e.g., the electronic device 101 of FIG. 1 or the electronic device 200 of FIG. 2A) may determine whether additional information exists on a displayed process, in operation 603, under the control of the processor (e.g., the processor 120 of FIG. 1).

According to various embodiments, when it is determined in operation 603, under the control of the processor (e.g., the processor 120 of FIG. 1), that the additional information exists on the displayed screen, the electronic device (e.g., the electronic device 101 of FIG. 1 or the electronic device 200 of FIG. 2A) may proceed to operation 605 branched therefrom.

According to various embodiments, when it is determined in operation 603, under the control of the processor (e.g., the processor 120 of FIG. 1), that the additional information exists on the displayed process, the electronic device (e.g., the electronic device 101 of FIG. 1 or the electronic device 200 of FIG. 2A) may proceed to operation 605 branched therefrom.

According to various embodiments, when it is determined in operation 603, under the control of the processor (e.g., the processor 120 of FIG. 1), that the additional information does not exist on the displayed screen, the electronic device (e.g., the electronic device 101 of FIG. 1 or the electronic device 200 of FIG. 2A) may proceed to operation 613 branched therefrom.

According to various embodiments, when it is determined in operation 603, under the control of the processor (e.g., the processor 120 of FIG. 1), that the additional information does not exist on the displayed process, the electronic device (e.g., the electronic device 101 of FIG. 1 or the electronic device 200 of FIG. 2A) may proceed to operation 613 branched therefrom.

According to various embodiments, the additional information on the displayed screen may be window information of the displayed screen on a frame buffer.

According to various embodiments, the additional information on the displayed process may be window information of the displayed process on the frame buffer.

The electronic device (e.g., the electronic device 101 of FIG. 1 or the electronic device 200 of FIG. 2A) according to various embodiments may extract additional information, based on the displayed screen, in operation 605, under the control of the processor (e.g., the processor 120 of FIG. 1).

The electronic device (e.g., the electronic device 101 of FIG. 1 or the electronic device 200 of FIG. 2A) according to various embodiments may extract additional information, based on the displayed process, in operation 605, under the control of the processor (e.g., the processor 120 of FIG. 1).

Operation 605 of extracting the additional information based on the displayed screen according to various embodiments may be an operation of extracting window information on the displayed screen under the control of the processor (e.g., the processor 120 of FIG. 1).

Operation 605 of extracting the additional information based on the displayed process according to various embodiments may be an operation of extracting window information on the displayed process under the control of the processor (e.g., the processor 120 of FIG. 1).

According to various embodiments, the extracted window information may be pre-configured or may be selected by a user input. When the displayed screen includes multi-windows, the window information may be information on each of the windows. When the extracted window information is pre-configured and the displayed screen includes the multi-windows, the processor (e.g., the processor 120 of FIG. 1) may extract the largest window among the multi-windows as window information and/or additional information.

According to various embodiments, the extracted window information may be pre-configured or may be selected by a user input. When the displayed process includes multi-windows, the window information may be information on each of the windows. When the extracted window information is pre-configured and the displayed process includes the multi-windows, the processor (e.g., the processor 120 of FIG. 1) may extract the largest window among the multi-windows as window information and/or additional information.

The operation of extracting the additional information based on the displayed screen according to various embodiments may be an operation of providing a screen and/or a function capable of editing a captured screen, under the control of the processor (e.g., the processor 120 of FIG. 1). For example, the function for editing a captured screen may include image cropping, image reduction/enlargement, image rotation, image effects, image color temperature, image color correction, etc., and an icon, an image, or text corresponding to the function for editing a captured screen may be provided as a user interface in a toolbar type. The screen and/or function capable of editing a captured screen may correspond to a screenshot toolbar.

The operation of extracting the additional information based on the displayed process according to various embodiments may be an operation of providing a screen and/or a function capable of editing a captured screen, under the control of the processor (e.g., the processor 120 of FIG. 1). For example, the function for editing a captured screen may include image cropping, image reduction/enlargement, image rotation, image effects, image color temperature, image color correction, etc., and an icon, an image, or text corresponding to the function for editing a captured screen may be provided as a user interface in a toolbar type. The screen and/or function capable of editing a captured screen may be a screenshot toolbar.

The operation of extracting the additional information based on the displayed screen according to various embodiments may be an operation of extracting, by the electronic device (e.g., the electronic device 101 of FIG. 1 or the electronic device 200 of FIG. 2A), the additional information from a frame buffer in operation 605 under the control of the processor (e.g., the processor 120 of FIG. 1).

The operation of extracting the additional information based on the displayed process according to various embodiments may be an operation of extracting, by the electronic device (e.g., the electronic device 101 of FIG. 1 or the electronic device 200 of FIG. 2A), the additional information from the frame buffer in operation 605 under the control of the processor (e.g., the processor 120 of FIG. 1).

The operation of extracting the additional information based on the displayed screen according to various embodiments may be an operation of extracting, by the electronic device (e.g., the electronic device 101 of FIG. 1 or the electronic device 200 of FIG. 2A), the window information from the frame buffer in operation 605 under the control of the processor (e.g., the processor 120 of FIG. 1).

The operation of extracting the additional information based on the displayed process according to various embodiments may be an operation of extracting, by the electronic device (e.g., the electronic device 101 of FIG. 1 or the electronic device 200 of FIG. 2A), the window information from the frame buffer in operation 605 under the control of the processor (e.g., the processor 120 of FIG. 1).

The operation of extracting the additional information based on the displayed screen according to various embodiments may be an operation of extracting, by the electronic device (e.g., the electronic device 101 of FIG. 1 or the electronic device 200 of FIG. 2A), the additional information from an application in operation 605 under the control of the processor (e.g., the processor 120 of FIG. 1). For example, when the application is an Internet browser, the operation of extracting the additional information from the application may be an operation of parsing HTML information.

The operation of extracting the additional information based on the displayed process according to various embodiments may be an operation of extracting, by the electronic device (e.g., the electronic device 101 of FIG. 1 or the electronic device 200 of FIG. 2A), the additional information from the application in operation 605 under the control of the processor (e.g., the processor 120 of FIG. 1). For example, when the application is an Internet browser, the operation of extracting the additional information from the application may be an operation of parsing HTML information.

The parsing operation may be, as an operation in a process in which a compiler or translator translates source codes into a machine language in a computer, a process of analyzing a grammatical composition or syntax of each sentence, that is, an operation of receiving a stream of tokens appearing in a source program and configuring the same into a parsing tree according to the grammar of the language.

The operation of extracting the additional information based on the displayed screen according to various embodiments may be an operation of extracting, by the electronic device (e.g., the electronic device 101 of FIG. 1 or the electronic device 200 of FIG. 2A), the additional information from the rendering information acquired from the display (e.g., the display device 160 of FIG. 1, or the display 230 or the sub-display 252 of FIG. 2A) or the application, in operation 705, under the control of the processor (e.g., the processor 120 of FIG. 1).

The operation of extracting the additional information based on the displayed process according to various embodiments may be an operation of extracting, by the electronic device (e.g., the electronic device 101 of FIG. 1 or the electronic device 200 of FIG. 2A), the additional information from the rendering information acquired from the display (e.g., the display device 160 of FIG. 1, or the display 230 or the sub-display 252 of FIG. 2A) or the application, in operation 705, under the control of the processor (e.g., the processor 120 of FIG. 1). The operation of extracting the additional information based on the displayed screen according to various embodiments may be an operation of extracting an area and/or a block area of a still image of the displayed screen in operation 605 under the control of the processor (e.g., the processor 120 of FIG. 1).

The operation of extracting the additional information based on the displayed process according to various embodiments may be an operation of extracting an area and/or a block area of a still image of the displayed process in operation 605 under the control of the processor (e.g., the processor 120 of FIG. 1).

The electronic device (e.g., the electronic device 101 of FIG. 1 or the electronic device 200 of FIG. 2A) according to various embodiments may determine whether there is a request for modification of a captured screen, in operation 607, under the control of the processor (e.g., the processor 120 of FIG. 1).

When it is determined in operation 607, under the control of the processor (e.g., the processor 120 of FIG. 1), that there is the request for modification of the captured screen, the electronic device (e.g., the electronic device 101 of FIG. 1 or the electronic device 200 of FIG. 2A) according to various embodiments may proceed to operation 609 branched therefrom.

When it is determined in operation 607, under the control of the processor (e.g., the processor 120 of FIG. 1), that there is no request for modification of the captured screen, the electronic device (e.g., the electronic device 101 of FIG. 1 or the electronic device 200 of FIG. 2A) according to various embodiments may proceed to operation 615 branched therefrom.

The electronic device (e.g., the electronic device 101 of FIG. 1 or the electronic device 200 of FIG. 2A) according to various embodiments may store the extracted additional information and the captured screen as a captured image, in operation 615, under the control of the processor (e.g., the processor 120 of FIG. 1).

When the displayed screen is captured, the electronic device (e.g., the electronic device 101 of FIG. 1 or the electronic device 200 of FIG. 2A) according to various embodiments may display the screen captured on the display on the display (e.g., the display device 160 of FIG. 1, or the display 230 or the sub-display 252 of FIG. 2A).

When a screen for the displayed process is captured, the electronic device (e.g., the electronic device 101 of FIG. 1 or the electronic device 200 of FIG. 2A) according to various embodiments may display the screen captured on the display on the display (e.g., the display device 160 of FIG. 1, or the display 230 or the sub-display 252 of FIG. 2A).

When the captured screen is displayed on the display (e.g., the display device 160 of FIG. 1, or the display 230 or the sub-display 252 of FIG. 2A), the electronic device (e.g., the electronic device 101 of FIG. 1 or the electronic device 200 of FIG. 2A) may emphasize and display the captured screen under the control of the processor (e.g., the processor 120 of FIG. 1). For example, the operation of emphasizing and displaying the captured screen may include at least one of an operation of highlighting a captured screen and an operation of darkening an uncaptured screen.

When the captured screen is displayed, the electronic device (e.g., the electronic device 101 of FIG. 1 or the electronic device 200 of FIG. 2A) may determine whether there is a user' input and/or request for modification of the captured screen, under the control of the processor (e.g., the processor 120 of FIG. 1). The user's input and/or request for modification of the captured screen may be, for example, an input requesting a tool for editing the captured screen or a user's input (e.g., a touch or voice input) for the captured screen.

According to various embodiments, when there is the request for modification of the captured screen, the electronic device (e.g., the electronic device 101 of FIG. 1 or the electronic device 200 of FIG. 2A) may modify the captured screen, in operation 609, under the control of the processor (e.g., the processor 120 of FIG. 1).

According to various embodiments, when there is the request for modification of the captured screen, the electronic device (e.g., the electronic device 101 of FIG. 1 or the electronic device 200 of FIG. 2A) may perform at least one of an operation of selecting a window different from an automatically selected window in the captured screen according to a user's input, an operation of expanding or reducing the automatically selected window, and/or an operation of selecting a window different from the selected window and expanding or reducing the window selected by the user, in operation 609, under the control of the processor (e.g., the processor 120 of FIG. 1). A user input capable of expanding or reducing a window may be a gesture input, a multi-finger input, a touch input, and/or a pen input. The touch input may be, for example, an input of touching a specific location by using a pointer and/or touching a specific location by using the pointer and then dragging the touch to a predetermined distance while maintaining the touch. The touch input may be an input to the selected window or to an editing tool (for example, a GUI represented by a clamp) displayed together in the selected window. Under the control of the processor (e.g., the processor 120 of FIG. 1), the electronic device (e.g., the electronic device 101 of FIG. 1 or the electronic device 200 of FIG. 2A) may display a graphical user interface (GUI) relating to an editing screen on which a window can be selected, on the display (e.g., the display device 160 of FIG. 1, or the display 230 or the sub-display 252 of FIG. 2A), and receive a user input to the GUI relating to the editing screen.

The electronic device (e.g., the electronic device 101 of FIG. 1 or the electronic device 200 of FIG. 2A) according to various embodiments may modify an object screen captured by the frame buffer and/or the application, in operation 609, under the control of the processor (e.g., the processor 120 of FIG. 1).

The operation of modifying the captured screen according to various embodiments may be an operation of modifying the captured screen by a user input and/or by a predetermined image editing process.

For example, the operation of modifying the captured screen may be performing of an image cropping operation by a user input. For example, the operation of modifying the captured screen may be performing of an image cropping operation by a predetermined image editing process.

The electronic device (e.g., the electronic device 101 of FIG. 1 or the electronic device 200 of FIG. 2A) according to various embodiments may store the extracted additional information and the modified screen as a captured image, in operation 611, under the control of the processor (e.g., the processor 120 of FIG. 1).

The electronic device (e.g., the electronic device 101 of FIG. 1 or the electronic device 200 of FIG. 2A) according to various embodiments may store, as a captured image, the extracted additional information and a screen obtained by modifying the captured screen by operation 609, in operation 611, under the control of the processor (e.g., the processor 120 of FIG. 1).

The electronic device (e.g., the electronic device 101 of FIG. 1 or the electronic device 200 of FIG. 2A) according to various embodiments may store the captured screen as a captured image, in operation 613, under the control of the processor (e.g., the processor 120 of FIG. 1). When the additional information does not exist on the displayed screen and/or there is no request for modification of the captured screen, the operation in which the electronic device (e.g., the electronic device 101 of FIG. 1 or the electronic device 200 of FIG. 2A) stores the captured screen as a captured image, in operation 613, under the control of the processor (e.g., the processor 120 of FIG. 1) may be an operation of storing a screen in which an image is not modified.

According to various embodiments, the electronic device (e.g., the electronic device 101 of FIG. 1 or the electronic device 200 of FIG. 2A) may store the captured screen as a captured image, in operation 613, under the control of the processor (e.g., the processor 120 of FIG. 1). When the additional information does not exist on the displayed process and/or there is no request for modification of the captured screen, the operation in which the electronic device (e.g., the electronic device 101 of FIG. 1 or the electronic device 200 of FIG. 2A) stores the captured screen as a captured image, in operation 613, under the control of the processor (e.g., the processor 120 of FIG. 1) may be an operation of storing a screen in which an image is not modified.

Figure 7:
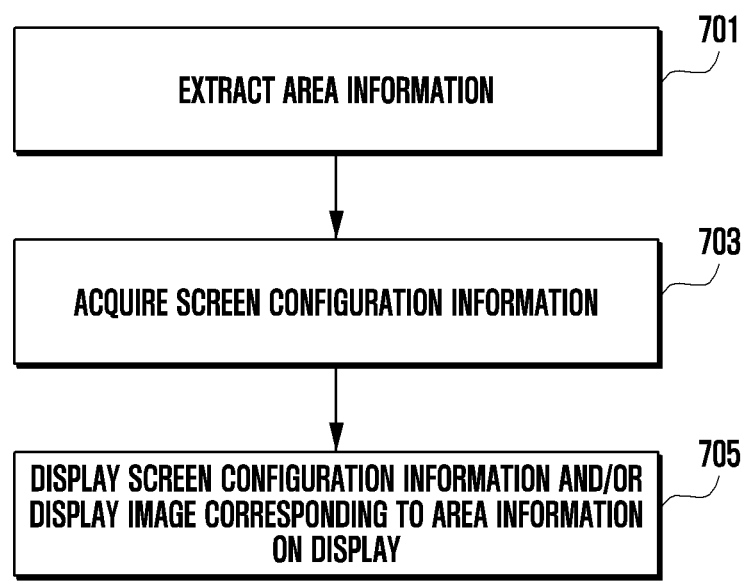
FIG. 7 is a flowchart illustrating an operation of extracting additional information based on a displayed screen in an electronic device according to various embodiments of the disclosure.

FIG. 7 is a flowchart illustrating operation 605 of extracting additional information based on a displayed screen in an electronic device (e.g., the electronic device 101 of FIG. 1 or the electronic device 200 of FIG. 2A) according to various embodiments of the disclosure.

The electronic device (e.g., the electronic device 101 of FIG. 1 or the electronic device 200 of FIG. 2A) according to various embodiments may extract area information from a frame buffer and/or a running application, in operation 701, under the control of a processor (e.g., the processor 120 of FIG. 1).

The electronic device (e.g., the electronic device 101 of FIG. 1 or the electronic device 200 of FIG. 2A) according to various embodiments may extract window area information from the frame buffer and/or the running application, in operation 701, under the control of the processor (e.g., the processor 120 of FIG. 1).

The electronic device (e.g., the electronic device 101 of FIG. 1 or the electronic device 200 of FIG. 2A) according to various embodiments may extract object area information from the frame buffer and/or the running application, in operation 701, under the control of the processor (e.g., the processor 120 of FIG. 1).

According to various embodiments, the area information may be information on an image area or a text area, window information, and/or layout information in the frame buffer and/or the running application.

The electronic device (e.g., the electronic device 101 of FIG. 1 or the electronic device 200 of FIG. 2A) according to various embodiments may acquire screen configuration information, based on the area information, in operation 703, under the control of the processor (e.g., the processor 120 of FIG. 1).

According to various embodiments, the screen configuration information may be information on a location and/or size of a window area in the frame buffer and/or the running application.

According to various embodiments, the screen configuration information may be information on a location and/or size of an object area in the frame buffer and/or the running application.

The electronic device (e.g., the electronic device 101 of FIG. 1 or the electronic device 200 of FIG. 2A) according to various embodiments may display the screen configuration information and/or display image data corresponding to the area information on the display (e.g., the display device 160 of FIG. 1, or the display 230 or the sub-display 252 of FIG. 2A), in operation 705, under the control of the processor (e.g., the processor 120 of FIG. 1).

According to various embodiments, the operation may be an operation of displaying information for screen editing of display image data corresponding to the object area information, the screen configuration information, and/or a user interface.

Figure 8:
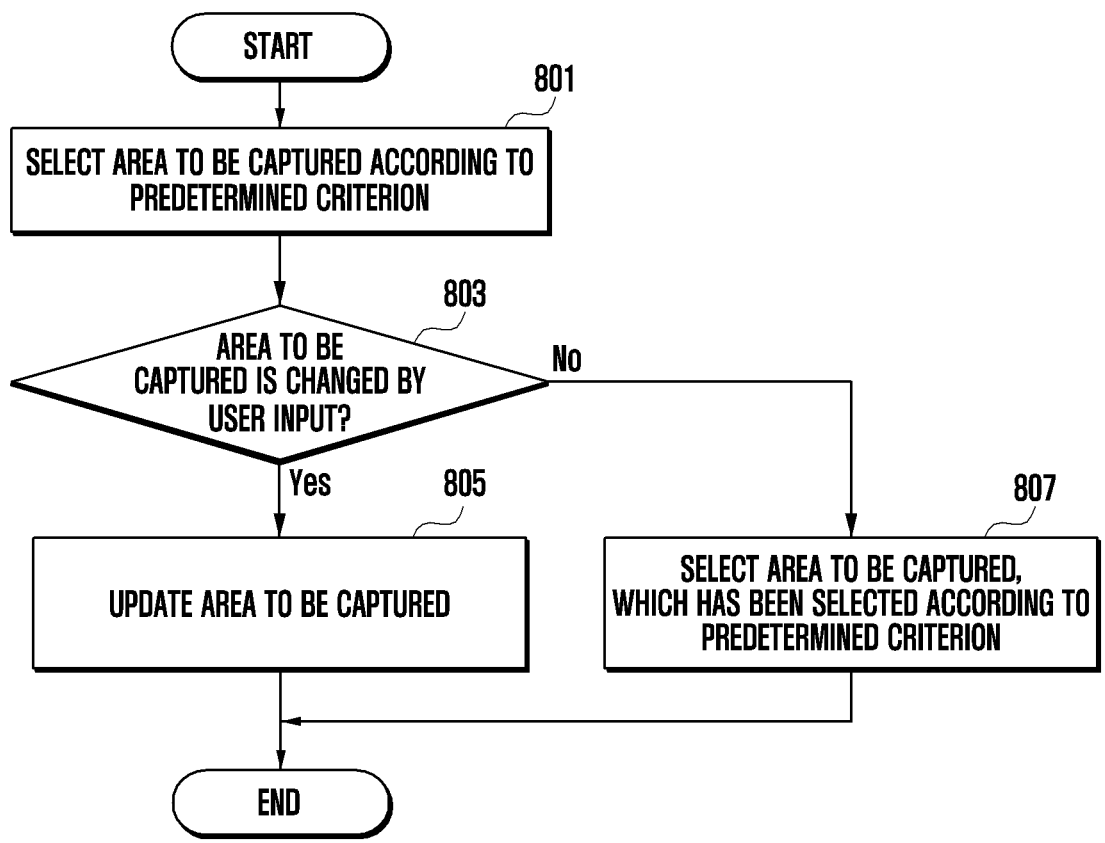
FIG. 8 is a flowchart illustrating an operation of modifying a captured screen of an electronic device according to various embodiments of the disclosure.

FIG. 8 is a flowchart illustrating operation 609 of modifying a captured screen of an electronic device (e.g., the electronic device 101 of FIG. 1 or the electronic device 200 of FIG. 2A) according to various embodiments of the disclosure.

The electronic device (e.g., the electronic device 101 of FIG. 1 or the electronic device 200 of FIG. 2A) according to various embodiments may capture a screen displayed on a display (e.g., the display device 160 of FIG. 1, or the display 230 or the sub-display 252 of FIG. 2A) and select and display an area to be captured, according to a predetermined criterion, in operation 801, under the control of a processor (e.g., the processor 120 of FIG. 1).

The operation in which the electronic device (e.g., the electronic device 101 of FIG. 1 or the electronic device 200 of FIG. 2A) according to various embodiments selects and displays the area to be captured, according to the predetermined criterion, in operation 801, under the control of the processor (e.g., the processor 120 of FIG. 1) may be an operation of automatically selecting and displaying the largest window among multi-windows as an area to be captured.

The operation in which the electronic device (e.g., the electronic device 101 of FIG. 1 or the electronic device 200 of FIG. 2A) according to various embodiments selects and displays the area to be captured, according to the predetermined criterion, in operation 801, under the control of the processor (e.g., the processor 120 of FIG. 1) may be an operation of automatically selecting and displaying, as an area to be captured, a screen corresponding to a window used by a user immediately before a capture command in multi-windows.

The operation in which the electronic device (e.g., the electronic device 101 of FIG. 1 or the electronic device 200 of FIG. 2A) according to various embodiments selects and displays the area to be captured, according to the predetermined criterion, in operation 801, under the control of the processor (e.g., the processor 120 of FIG. 1) may be an operation of automatically selecting and displaying, as an area to be captured, a process corresponding to a window used by a user immediately before a capture command in multi-windows.

The operation in which the electronic device (e.g., the electronic device 101 of FIG. 1 or the electronic device 200 of FIG. 2A) according to various embodiments selects and displays the area to be captured, according to the predetermined criterion, in operation 801, under the control of the processor (e.g., the processor 120 of FIG. 1) may be an operation in which when the electronic device (e.g., the electronic device 200 of FIG. 2A) receives a command for capturing an image on the sub-display 252 in a folded state and then switches into an unfolded state, the electronic device (e.g., the electronic device 200 of FIG. 2A) automatically selects a screen associated with the image displayed on the sub-display 252 as an area to be captured and displays the screen on the display 230.

According to various embodiments, the displayed screen may be a screen in which image or video information is displayed in a window and/or a layout activated on the display (e.g., the display device 160 of FIG. 1 or the display 230 of FIG. 2A).

According to various embodiments, the displayed screen may include a user interface of a running application. The application may correspond to a running application stored in one window frame buffer screen or multiple window frame buffers.

According to various embodiments, the operation in which the electronic device (e.g., the electronic device 101 of FIG. 1 or the electronic device 200 of FIG. 2A) captures the screen displayed on the display (e.g., the display device 160 of FIG. 1, or the display 230 or the sub-display 252 of FIG. 2A) and selects and displays the area to be captured, according to the predetermined criterion, in operation 801, under the control of the processor (e.g., the processor 120 of FIG. 1) may be an operation of displaying an image (e.g., a GUI element related to highlight, inversion, a box, and/or an icon) representing an area to be captured according to a predetermined criterion, for a predetermined time. When the pre-configured time has elapsed, the image (e.g., a GUI element related to highlight, inversion, a box, and/or an icon) representing the area to be captured according to the predetermined criterion may disappear.

The electronic device (e.g., the electronic device 101 of FIG. 1 or the electronic device 200 of FIG. 2A) according to various embodiments may maintain a view layout of the captured screen while displaying an image (e.g., a GUI element related to highlight, inversion, a box, and/or an icon) representing an area to be captured according to a predetermined criterion, for a predetermined time, under the control of the processor (e.g., the processor 120 of FIG. 1).

The electronic device (e.g., the electronic device 101 of FIG. 1 or the electronic device 200 of FIG. 2A) according to various embodiments may determine whether an area to be captured has been changed by a user input, in operation 803, under the control of the processor (e.g., the processor 120 of FIG. 1).

When it is determined in operation 803, under the control of the processor (e.g., the processor 120 of FIG. 1), that the area to be captured has been changed by the user input, the electronic device (e.g., the electronic device 101 of FIG. 1 or the electronic device 200 of FIG. 2A) according to various embodiments may proceed to operation 805 branched therefrom.

When it is determined in operation 803, under the control of the processor (e.g., the processor 120 of FIG. 1), that the area to be captured has not been changed by the user input, the electronic device (e.g., the electronic device 101 of FIG. 1 or the electronic device 200 of FIG. 2A) according to various embodiments may proceed to operation 807 branched therefrom.

The operation in which the electronic device (e.g., the electronic device 101 of FIG. 1 or the electronic device 200 of FIG. 2A) according to various embodiments changes an area to be captured, by a user input, in operation 803, under the control of the processor (e.g., the processor 120 of FIG. 1) may be at least one of an operation of selecting a window different from an automatically selected window in the captured screen according to a user's input, an operation of expanding or reducing the automatically selected window, and/or an operation of selecting a window different from the selected window and expanding or reducing the window selected by the user.

A user input capable of expanding or reducing a window may be a gesture input, a multi-finger input, a touch input, and/or a pen input. The touch input may be, for example, an input of touching a specific location by using a pointer and/or touching a specific location by using the pointer and then dragging the touch to a predetermined distance while maintaining the touch. The touch input may be an input to the selected window or to an editing tool (for example, a GUI represented by a clamp) displayed together in the selected window.

Under the control of the processor (e.g., the processor 120 of FIG. 1), the electronic device (e.g., the electronic device 101 of FIG. 1 or the electronic device 200 of FIG. 2A) may display a graphical user interface (GUI) relating to an editing screen on which a window can be selected, on the display (e.g., the display device 160 of FIG. 1, or the display 230 or the sub-display 252 of FIG. 2A), and receive a user input to the GUI relating to the editing screen.

According to various embodiments, in order to change an area to be captured by a user input, the electronic device (e.g., the electronic device 101 of FIG. 1 or the electronic device 200 of FIG. 2A) may provide a screen and/or a function capable of editing a captured screen and/or an area to be captured, under the control of the processor (e.g., the processor 120 of FIG. 1).

According to various embodiments, the editing screen may be an editing screen for maintaining a view layout of a captured screen while arranging editing tool user interfaces (for example, an image cropping user interface) around an area to be captured according to a predetermined criterion. In this case, an area on the captured screen other than the area to be captured according to the predetermined criterion may be displayed to be darker or separated from the area to be captured according to the predetermined criterion.

According to various embodiments, the operation of changing an area to be captured according to a user input may be an operation of selecting a screen desired by a user in a captured screen by moving an editing tool user interface (for example, an image cropping user interface) according to a user input. In this case, the editing operation according to the user input may include moving the editing tool user interface (for example, an image cropping user interface) according to the user input, and determining a time point when the user input is released as a time point when the image editing operation is completed. When the user input is released, the electronic device (e.g., the electronic device 101 of FIG. 1 or the electronic device 200 of FIG. 2A) may change a view layout of the captured screen, mainly based on an edited screen and/or image according to the user input, under the control of the processor (e.g., the processor 120 of FIG. 1).

According to various embodiments, when an image editing and/or modifying command is selected on a screenshot toolbar including a screen and/or a function capable of editing a captured screen, under the control of the processor (e.g., the processor 120 of FIG. 1), the electronic device (e.g., the electronic device 101 of FIG. 1 or the electronic device 200 of FIG. 2A) may determine that a command for modifying the captured screen has been received.

When the area to be captured is changed by the user input, the electronic device (e.g., the electronic device 101 of FIG. 1 or the electronic device 200 of FIG. 2A) according to various embodiments may update the area to be captured, in operation 805, under the control of the processor (e.g., the processor 120 of FIG. 1).

When the area to be captured is not changed by the user input, the electronic device (e.g., the electronic device 101 of FIG. 1 or the electronic device 200 of FIG. 2A) according to various embodiments may select the area to be captured, which has been selected according to the predetermined criterion, in operation 807, under the control of the processor (e.g., the processor 120 of FIG. 1).

Figure 9:
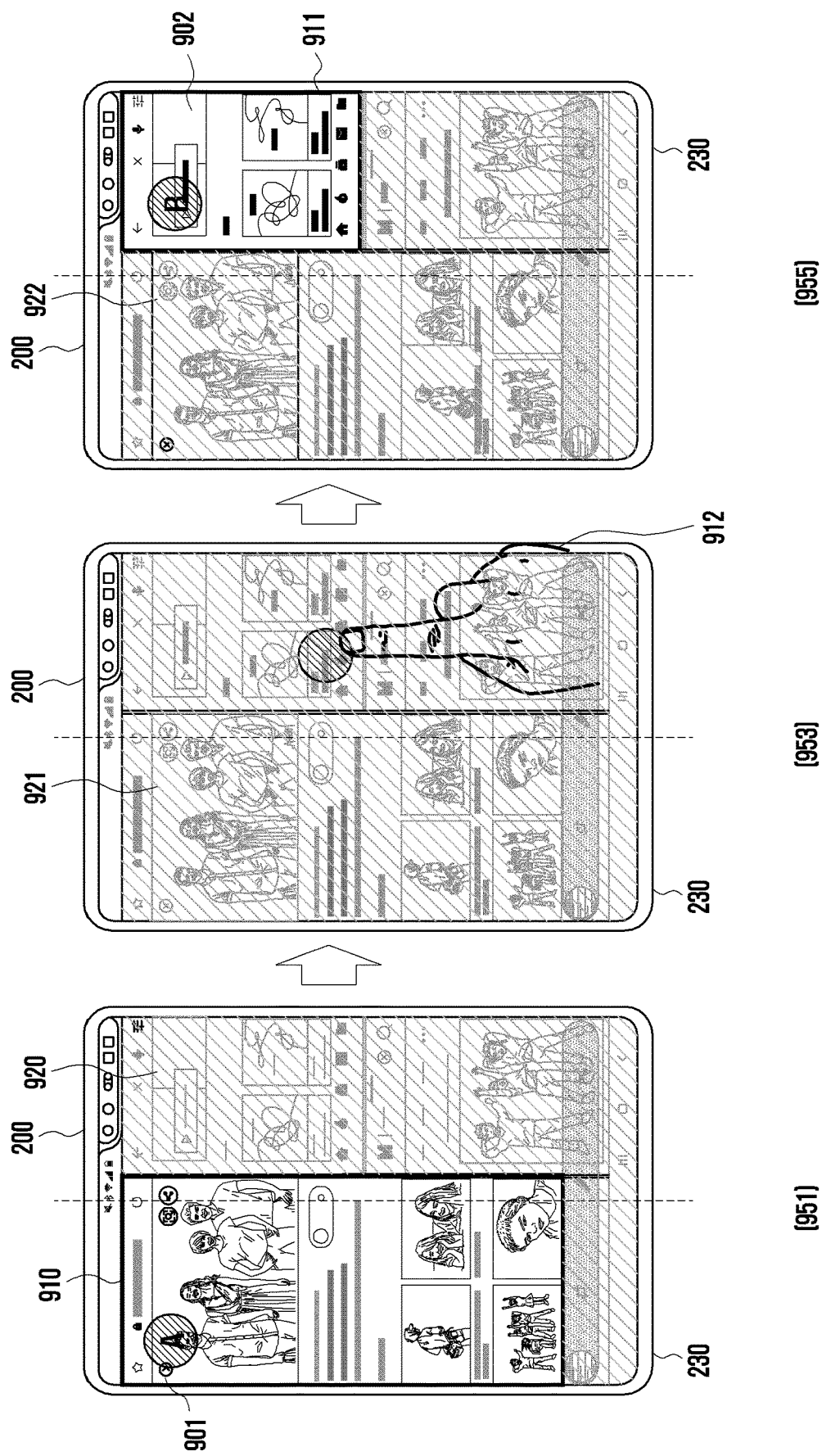
FIG. 9 is a diagram illustrating an exemplary execution of an operation of selecting and displaying an area to be captured according to a predetermined criterion and modifying a captured screen according to a user input in an electronic device according to various embodiments of the disclosure.

FIG. 9 is a diagram illustrating an exemplary execution of an operation of selecting and displaying an area to be captured according to a predetermined criterion and modifying a captured screen according to a user input in an electronic device (e.g., the electronic device 101 of FIG. 1 or the electronic device 200 of FIG. 2A) according to various embodiments of the disclosure.

According to various embodiments, on screen 951, the electronic device (e.g., the electronic device 101 of FIG. 1 or the electronic device 200 of FIG. 2A) may capture a screen displayed on a display (e.g., the display device 160 of FIG. 1, or the display 230 or the sub-display 252 of FIG. 2A) and select and display an area 910 to be captured from among multi-windows according to a predetermined criterion, under the control of a processor (e.g., the processor 120 of FIG. 1).

According to various embodiments, the operation of selecting and displaying, by the electronic device (e.g., the electronic device 101 of FIG. 1 or the electronic device 200 of FIG. 2A), the area to be captured, according to the predetermined criterion, under the control of the processor (e.g., the processor 120 of FIG. 1) on the screen 951 may be an operation of automatically selecting and displaying the largest window among the multi-windows as the area 910 to be captured.

According to various embodiments, the operation of selecting and displaying, by the electronic device (e.g., the electronic device 101 of FIG. 1 or the electronic device 200 of FIG. 2A), the area to be captured, according to the predetermined criterion, under the control of the processor (e.g., the processor 120 of FIG. 1) may be an operation of automatically selecting and displaying, as the area 910 to be captured, a screen corresponding to a window used by a user immediately before a capture command in the multi-windows.

According to various embodiments, the operation of selecting and displaying, by the electronic device (e.g., the electronic device 101 of FIG. 1 or the electronic device 200 of FIG. 2A), the area to be captured, according to the predetermined criterion, under the control of the processor (e.g., the processor 120 of FIG. 1) may be an operation of automatically selecting and displaying, as the area 910 to be captured, a process corresponding to a window used by a user immediately before a capture command in the multi-windows. According to various embodiments, the operation of selecting and displaying, by the electronic device (e.g., the electronic device 101 of FIG. 1 or the electronic device 200 of FIG. 2A), the area to be captured, according to the predetermined criterion, under the control of the processor (e.g., the processor 120 of FIG. 1) on the screen 951 may be an operation of automatically selecting and displaying, as the area 910 to be captured, a screen corresponding to a window having received a user's input immediately before a capture command in the multi-windows.

According to various embodiments, the operation of selecting and displaying, by the electronic device (e.g., the electronic device 101 of FIG. 1 or the electronic device 200 of FIG. 2A), the area to be captured, according to the predetermined criterion, under the control of the processor (e.g., the processor 120 of FIG. 1) on the screen 951 may be an operation of automatically selecting and displaying, as the area 910 to be captured, a process corresponding to a window having received a user's input immediately before a capture command in the multi-windows.

According to various embodiments, on the screen 951, the electronic device (e.g., the electronic device 101 of FIG. 1 or the electronic device 200 of FIG. 2A) may brightly display the area 910 to be captured, which has been selected according to the predetermined criterion, and darkly display an unselected area 920, under the control of the processor (e.g., the processor 120 of FIG. 1).

According to various embodiments, on the screen 951, the electronic device (e.g., the electronic device 101 of FIG. 1 or the electronic device 200 of FIG. 2A) may emphasize and display the area 910 to be captured, which has been selected according to the predetermined criterion, and may not emphasize the unselected area 920, under the control of the processor (e.g., the processor 120 of FIG. 1).

According to various embodiments, on the screen 951, when the area to be captured is displayed, the electronic device (e.g., the electronic device 101 of FIG. 1 or the electronic device 200 of FIG. 2A) may determine whether there is a user's input 901 and/or request 901 for modification of a captured area, under the control of the processor (e.g., the processor 120 of FIG. 1). The user's input 901 and/or request 901 for modification of the captured area may be, for example, an input requesting a tool for editing the captured screen or a user's input (e.g., a touch or voice input) for the captured screen.

According to various embodiments, on screen 953, when there is the user's input 901 and/or request 901 for modification of the captured area, the electronic device (e.g., the electronic device 101 of FIG. 1 or the electronic device 200 of FIG. 2A) may receive an input 912 for selecting an area to be captured according to the user's input, under the control of the processor (e.g., the processor 120 of FIG. 1). In this case, the area to be captured, which has been selected according to the predetermined criterion on the screen 951, may be darkly displayed 921.

According to various embodiments, on screen 955, when the area to be captured is changed by the user input, the electronic device (e.g., the electronic device 101 of FIG. 1 or the electronic device 200 of FIG. 2A) may update the area to be captured, under the control of the processor (e.g., the processor 120 of FIG. 1).

According to various embodiments, on the screen 955, when the area to be captured is changed by the user input, the electronic device (e.g., the electronic device 101 of FIG. 1 or the electronic device 200 of FIG. 2A) may display a changed area 902 to be captured, under the control of the processor (e.g., the processor 120 of FIG. 1).

According to various embodiments, on the screen 955, the electronic device (e.g., the electronic device 101 of FIG. 1 or the electronic device 200 of FIG. 2A) may brightly display 911 the area 902 to be captured, which has been selected according to the user input, and darkly display 922 an unselected area, under the control of the processor (e.g., the processor 120 of FIG. 1).

According to various embodiments, on the screen 955, the electronic device (e.g., the electronic device 101 of FIG. 1 or the electronic device 200 of FIG. 2A) may emphasize and display 911 the area 902 to be captured, which has been selected according to the user's input, and may not emphasize the unselected area, under the control of the processor (e.g., the processor 120 of FIG. 1).

According to various embodiments, on the screen 955, a user input according to the operation of changing an area to be captured, by a user input, in the electronic device (e.g., the electronic device 101 of FIG. 1 or the electronic device 200 of FIG. 2A) may be a gesture input, a multi-finger input, a touch input, and/or a pen input.

The touch input may be, for example, an input of touching a specific location by using a pointer and/or touching a specific location by using the pointer and then dragging the touch to a predetermined distance while maintaining the touch. The touch input may be an input to the selected window or to an editing tool (for example, a GUI represented by a clamp) displayed together in the selected window.

According to various embodiments, in order to change an area to be captured by a user input, the electronic device (e.g., the electronic device 101 of FIG. 1 or the electronic device 200 of FIG. 2A) may provide a screen and/or a function capable of editing a captured screen and/or an area to be captured, under the control of the processor (e.g., the processor 120 of FIG. 1).

According to various embodiments, the editing screen may be an editing screen for maintaining a view layout of a captured screen while arranging editing tool user interfaces (for example, an image cropping user interface) around an area to be captured according to a predetermined criterion. In this case, an area on the captured screen other than the area to be captured according to the predetermined criterion may be displayed to be darker or separated from the area to be captured according to the predetermined criterion.

According to various embodiments, on the screen 955, under the control of the processor (e.g., the processor 120 of FIG. 1), the electronic device (e.g., the electronic device 101 of FIG. 1 or the electronic device 200 of FIG. 2A) may display a graphical user interface (GUI) relating to an editing screen on which a window can be selected, on the display (e.g., the display device 160 of FIG. 1, or the display 230 or the sub-display 252 of FIG. 2A), and receive a user input to the GUI relating to the editing screen.

According to various embodiments, the operation of changing an area to be captured according to a user input may be an operation of selecting a screen desired by a user in a captured screen by moving an editing tool user interface (for example, an image cropping user interface) according to a user input. In this case, the editing operation according to the user input may include moving the editing tool user interface (for example, an image cropping user interface) according to the user input, and determining a time point when the user input is released as a time point when the image editing operation is completed. When the user input is released, the electronic device (e.g., the electronic device 101 of FIG. 1 or the electronic device 200 of FIG. 2A) may change a view layout of the captured screen, mainly based on an edited screen and/or image according to the user input, under the control of the processor (e.g., the processor 120 of FIG. 1).

According to various embodiments, when an image editing and/or modifying command is selected on a screenshot toolbar including a screen and/or a function capable of editing a captured screen, the electronic device (e.g., the electronic device 101 of FIG. 1 or the electronic device 200 of FIG. 2A) may determine that a command for modifying the captured screen has been received, under the control of the processor (e.g., the processor 120 of FIG. 1).

Figure 10:
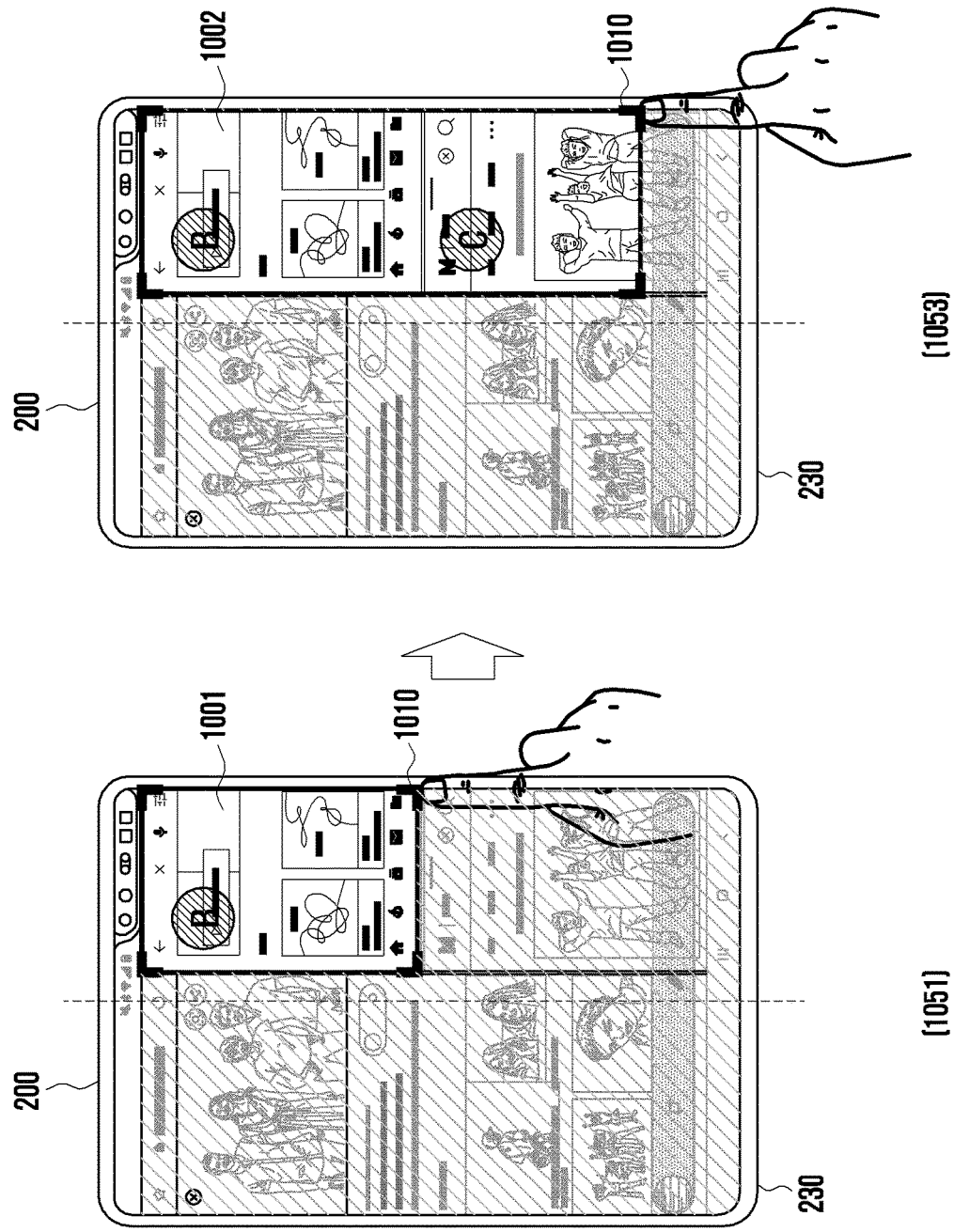
FIG. 10 is a diagram illustrating an exemplary execution of an operation of modifying a captured screen according to a user input in an electronic device according to various embodiments of the disclosure.

FIG. 10 is a diagram illustrating an exemplary execution of an operation of modifying a captured screen according to a user input in an electronic device (e.g., the electronic device 101 of FIG. 1 or the electronic device 200 of FIG. 2A) according to various embodiments of the disclosure.

According to various embodiments, on screen 1051, when an area to be captured is changed by a user input, the electronic device (e.g., the electronic device 101 of FIG. 1 or the electronic device 200 of FIG. 2A) may update the area to be captured, under the control of a processor (e.g., the processor 120 of FIG. 1).

According to various embodiments, on the screen 1051, when the area to be captured is changed by the user input, the electronic device (e.g., the electronic device 101 of FIG. 1 or the electronic device 200 of FIG. 2A) may display a changed area 1001 to be captured, under the control of the processor (e.g., the processor 120 of FIG. 1).

According to various embodiments, on the screen 1051, the electronic device (e.g., the electronic device 101 of FIG. 1 or the electronic device 200 of FIG. 2A) may brightly display the area 1001 to be captured, which has been selected according to the user input, and darkly display an unselected area, under the control of the processor (e.g., the processor 120 of FIG. 1).

According to various embodiments, on the screen 1051, the electronic device (e.g., the electronic device 101 of FIG. 1 or the electronic device 200 of FIG. 2A) may emphasize and display the area 1001 to be captured, which has been selected according to the user's input, and may not emphasize the unselected area, under the control of the processor (e.g., the processor 120 of FIG. 1).

According to various embodiments, on the screen 1051, a user input according to the operation of changing an area to be captured, by a user input, in the electronic device (e.g., the electronic device 101 of FIG. 1 or the electronic device 200 of FIG. 2A) may be a gesture input, a multi-finger input, a touch input, and/or a pen input.

The touch input may be, for example, an input of touching a specific location by using a pointer and/or touching a specific location by using the pointer and then dragging the touch to a predetermined distance while maintaining the touch. The touch input may be an input to a selected window or an editing tool user interface 1010 (for example, a GUI element 1010 represented by a clamp) displayed together in the selected window. For example, the GUI element represented by a clamp may be an image cropping user interface.

According to various embodiments, on the screen 1051, under the control of the processor (e.g., the processor 120 of FIG. 1), the electronic device (e.g., the electronic device 101 of FIG. 1 or the electronic device 200 of FIG. 2A) may display a graphical user interface (GUI) relating to an editing screen on which a window can be selected, on a display (e.g., the display device 160 of FIG. 1, or the display 230 or the sub-display 252 of FIG. 2A), and receive a user input to the GUI relating to the editing screen.

According to various embodiments, in order to change an area to be captured by a user input, the electronic device (e.g., the electronic device 101 of FIG. 1 or the electronic device 200 of FIG. 2A) may provide a screen and/or a function capable of editing a captured screen and/or an area to be captured, under the control of the processor (e.g., the processor 120 of FIG. 1).

According to various embodiments, on the screen 1051, the electronic device (e.g., the electronic device 101 of FIG. 1 or the electronic device 200 of FIG. 2A) may receive, by a user input, an operation of expanding or reducing a window selected by a user, under the control of the processor (e.g., the processor 120 of FIG. 1).

According to various embodiments, on screen 1053, when an user input is received on an editing tool user interface 1010 for selecting, by a user, an area to be captured, the electronic device (e.g., the electronic device 101 of FIG. 1 or the electronic device 200 of FIG. 2A) may update an area 1002 to be captured, under the control of the processor (e.g., the processor 120 of FIG. 1).

According to various embodiments, on the screen 1053, when the editing tool user interface 1010 (for example, an image cropping user interface) is displayed on the display (e.g., the display device 160 of FIG. 1, or the display 230 or the sub-display 252 of FIG. 2A) and the editing tool user interface 1010 is touched and dragged by a user input, the area 1002 to be captured may be updated. According to various embodiments, on the screen 1053, the updated area 1002 to be captured may be an area in which the selected window is expanded more than that of the screen 1051.

According to various embodiments, as shown in the screen 1053, first, when the editing tool user interface 1010 (for example, an image cropping user interface) is displayed on the display (e.g., the display device 160 of FIG. 1, or the display 230 or the sub-display 252 of FIG. 2A) and the editing tool user interface 1010 is touched by a user input and then reduced back to the screen 1051, the updated area 1001 to be captured may be an area in which the selected window is reduced more than that of the screen 1053.

According to various embodiments, the operation of changing an area to be captured according to a user input may be an operation of selecting a screen desired by a user in a captured screen by moving the editing tool user interface 1010 (for example, an image cropping user interface) according to a user input. In this case, the editing operation according to the user input may include moving the editing tool user interface 1010 (for example, an image cropping user interface) according to the user input, and determining a time point when the user input is released as a time point when the image editing operation is completed. When the user input is released, the electronic device (e.g., the electronic device 101 of FIG. 1 or the electronic device 200 of FIG. 2A) may determine that the area to be captured has been updated, under the control of the processor (e.g., the processor 120 of FIG. 1).

Figure 11:
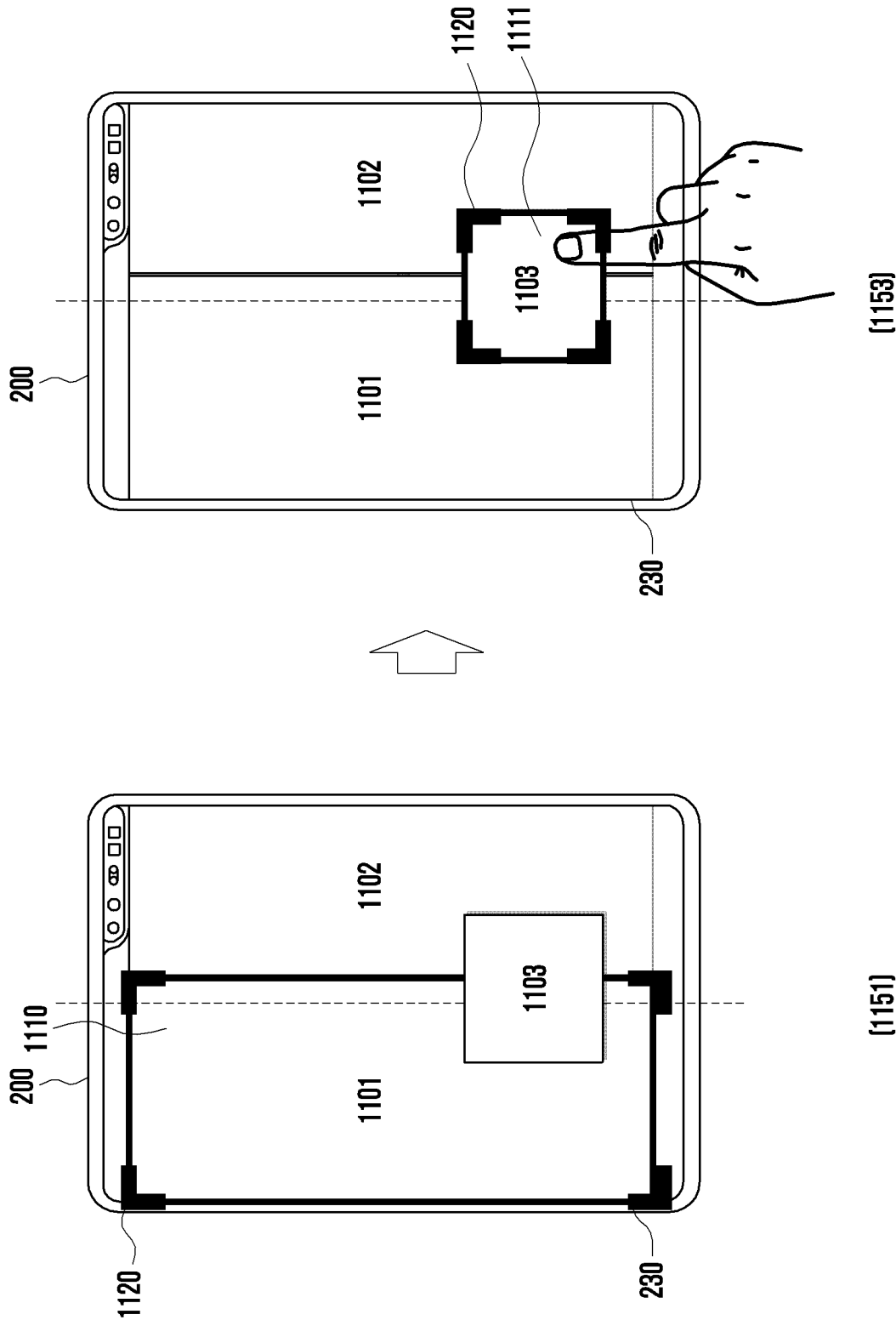
FIG. 11 is a diagram illustrating an exemplary execution of an operation of modifying a captured screen according to a user input in an electronic device according to various embodiments of the disclosure.

FIG. 11 is a diagram illustrating an exemplary execution of an operation of modifying a captured screen according to a user input in an electronic device (e.g., the electronic device 101 of FIG. 1 or the electronic device 200 of FIG. 2A) according to various embodiments of the disclosure.

On screen 1151, under the control of a processor (e.g., the processor 120 of FIG. 1), the electronic device (e.g., the electronic device 101 of FIG. 1 or the electronic device 200 of FIG. 2A) may capture a screen displayed on a display (e.g., the display device 160 of FIG. 1, or the display 230 or the sub-display 252 of FIG. 2A) and select and display one window 1101 from among multi-windows 1101, 1102, and 1103 as an area 1110 to be captured, according to a predetermined criterion. At least one of the multi-windows 1101, 1102, and 1103 may be an overlapping window 1103. The overlapping window 1103 may be, for example, a pop-up window 1103. The overlapping window 1103 may be a window overlapped and displayed on another window.

According to various embodiments, the operation of selecting and displaying, by the electronic device (e.g., the electronic device 101 of FIG. 1 or the electronic device 200 of FIG. 2A), the area 1110 to be captured, according to the predetermined criterion, under the control of the processor (e.g., the processor 120 of FIG. 1) on the screen 1151 may be an operation of automatically selecting and displaying the largest window 1101 among the multi-windows 1101, 1102, and 1103 as the area 1110 to be captured.

According to various embodiments, the operation of selecting and displaying, by the electronic device (e.g., the electronic device 101 of FIG. 1 or the electronic device 200 of FIG. 2A), the area 1110 to be captured, according to the predetermined criterion, under the control of the processor (e.g., the processor 120 of FIG. 1) may be an operation of automatically selecting and displaying, as the area 1110 to be captured, a screen corresponding to the window 1101 used by a user immediately before a capture command in the multi-windows 1101, 1102, and 1103.

According to various embodiments, the operation of selecting and displaying, by the electronic device (e.g., the electronic device 101 of FIG. 1 or the electronic device 200 of FIG. 2A), the area 1110 to be captured, according to the predetermined criterion, under the control of the processor (e.g., the processor 120 of FIG. 1) may be an operation of automatically selecting and displaying, as the area 1110 to be captured, a process corresponding to the window 1101 used by a user immediately before a capture command in the multi-windows 1101, 1102, and 1103. According to various embodiments, the operation of selecting and displaying, by the electronic device (e.g., the electronic device 101 of FIG. 1 or the electronic device 200 of FIG. 2A), the area 1110 to be captured, according to the predetermined criterion, under the control of the processor (e.g., the processor 120 of FIG. 1) on the screen 1151 may be an operation of automatically selecting and displaying, as the area 1110 to be captured, a screen corresponding to the window 1101 having received a user's input immediately before a capture command in the multi-windows 1101, 1102, and 1103.

According to various embodiments, the operation of selecting and displaying, by the electronic device (e.g., the electronic device 101 of FIG. 1 or the electronic device 200 of FIG. 2A), the area 1110 to be captured, according to the predetermined criterion, under the control of the processor (e.g., the processor 120 of FIG. 1) on the screen 1151 may be an operation of automatically selecting and displaying, as the area 1110 to be captured, a process corresponding to the window 1101 having received a user's input immediately before a capture command in the multi-windows 1101, 1102, and 1103.

On the screen 1151, under the control of the processor (e.g., the processor 120 of FIG. 1), the electronic device (e.g., the electronic device 101 of FIG. 1 or the electronic device 200 of FIG. 2A) may capture a screen displayed on the display (e.g., the display device 160 of FIG. 1, or the display 230 or the sub-display 252 of FIG. 2A), select and display one window 1101 from among the multi-windows 1101, 1102, and 1103 as the area 1110 to be captured, according to the predetermined criterion, and display an editing tool user interface 1120 (for example, an image cropping user interface) on the display (e.g., the display device 160 of FIG. 1, or the display 230 or the sub-display 252 of FIG. 2A) with respect to the area 1110 to be captured.

According to various embodiments, on the screen 1151, the electronic device (e.g., the electronic device 101 of FIG. 1 or the electronic device 200 of FIG. 2A) may brightly display the area 1110 to be captured, which has been selected according to the predetermined criterion, and darkly display an unselected area, under the control of the processor (e.g., the processor 120 of FIG. 1).

According to various embodiments, on the screen 1151, the electronic device (e.g., the electronic device 101 of FIG. 1 or the electronic device 200 of FIG. 2A) may emphasize and display the area 1110 to be captured, which has been selected according to the predetermined criterion, and may not emphasize the unselected area, under the control of the processor (e.g., the processor 120 of FIG. 1).

On screen 1153, when an area to be captured is changed according to a user input, the electronic device (e.g., the electronic device 101 of FIG. 1 or the electronic device 200 of FIG. 2A) may update the area to be captured, under the control of the processor (e.g., the processor 120 of FIG. 1).

On the screen 1153, the electronic device (e.g., the electronic device 101 of FIG. 1 or the electronic device 200 of FIG. 2A) may update at least one overlapping window 1103 among the multi-windows 1101, 1102, and 1103 as an area 1111 to be captured, according to a user input, under the control of the processor (e.g., the processor 120 of FIG. 1).

On the screen 1153, under the control of the processor (e.g., the processor 120 of FIG. 1), the electronic device (e.g., the electronic device 101 of FIG. 1 or the electronic device 200 of FIG. 2A) may capture a screen displayed on the display (e.g., the display device 160 of FIG. 1, or the display 230 or the sub-display 252 of FIG. 2A), select and display the window 1103 selected by the user input as the area 1111 to be captured, and display an editing tool user interface 1120 (for example, an image cropping user interface) on the display (e.g., the display device 160 of FIG. 1, or the display 230 or the sub-display 252 of FIG. 2A) with respect to the area 1111 to be captured.

Figure 12:
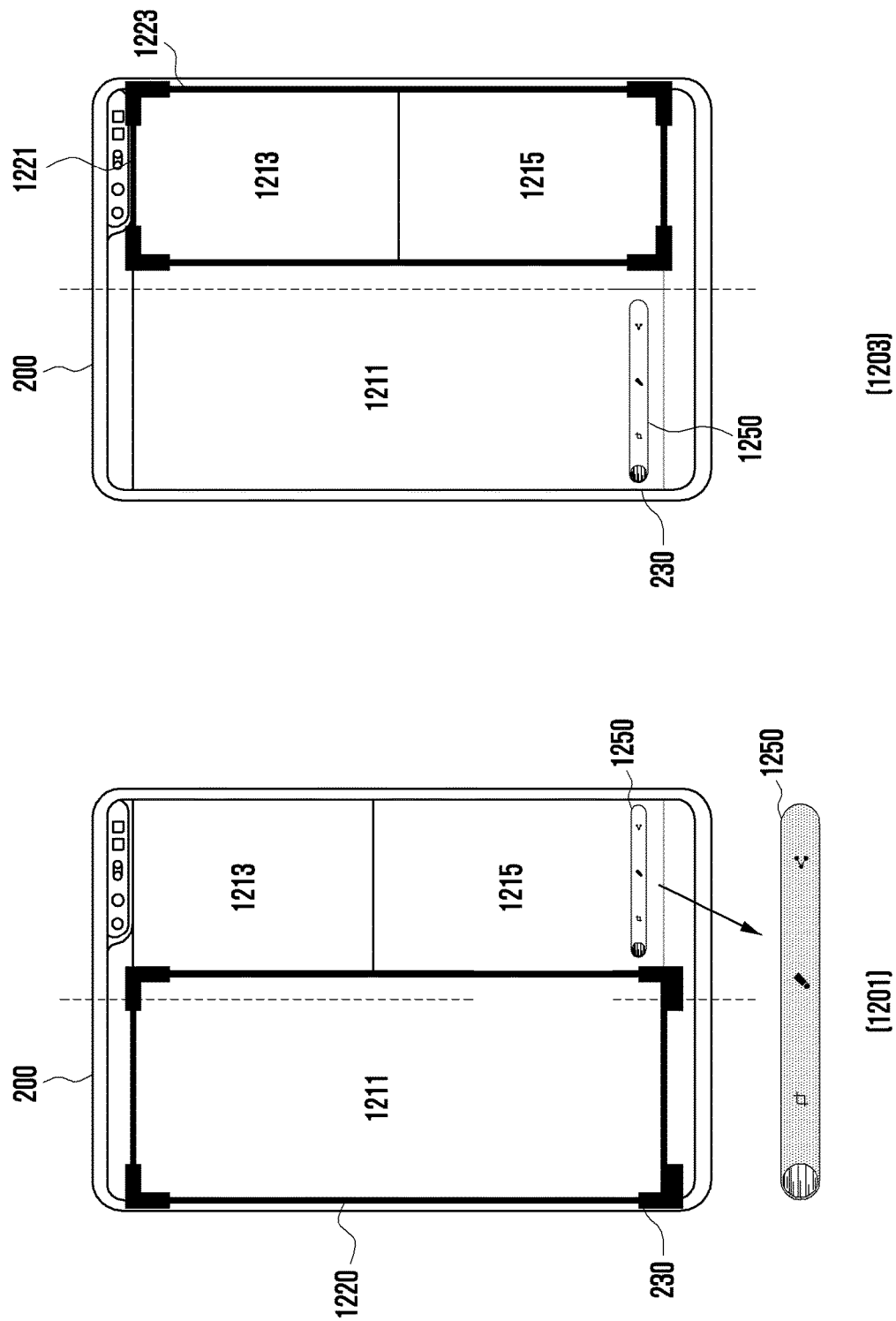
FIG. 12 is a diagram illustrating an exemplary execution of an operation of modifying a captured screen according to a user input in an electronic device according to various embodiments of the disclosure.

FIG. 12 is a diagram illustrating an exemplary execution of an operation of modifying a captured screen according to a user input in an electronic device (e.g., the electronic device 101 of FIG. 1 or the electronic device 200 of FIG. 2A) according to various embodiments of the disclosure.

On screen 1201, under the control of a processor (e.g., the processor 120 of FIG. 1), the electronic device (e.g., the electronic device 101 of FIG. 1 or the electronic device 200 of FIG. 2A) may capture a screen displayed on a display (e.g., the display device 160 of FIG. 1, or the display 230 or the sub-display 252 of FIG. 2A) and select and display one window 1211 from among multi-windows 1211, 1213, and 1215 as an area 1220 to be captured, according to a predetermined criterion.

According to various embodiments, the operation of selecting and displaying, by the electronic device (e.g., the electronic device 101 of FIG. 1 or the electronic device 200 of FIG. 2A), the area 1220 to be captured, according to the predetermined criterion, under the control of the processor (e.g., the processor 120 of FIG. 1) on the screen 1201 may be an operation of automatically selecting and displaying the largest window 1211 among the multi-windows 1211, 1213, and 1215 as the area 1220 to be captured.

According to various embodiments, the operation of selecting and displaying, by the electronic device (e.g., the electronic device 101 of FIG. 1 or the electronic device 200 of FIG. 2A), the area 1220 to be captured, according to the predetermined criterion, under the control of the processor (e.g., the processor 120 of FIG. 1) may be an operation of automatically selecting and displaying, as an area 1320 to be captured, a screen corresponding to the window 1211 used by a user immediately before a capture command in the multi-windows 1211, 1213, and 1215.

According to various embodiments, the operation of selecting and displaying, by the electronic device (e.g., the electronic device 101 of FIG. 1 or the electronic device 200 of FIG. 2A), the area 1220 to be captured, according to the predetermined criterion, under the control of the processor (e.g., the processor 120 of FIG. 1) may be an operation of automatically selecting and displaying, as the area 1320 to be captured, a process corresponding to the window 1211 used by a user immediately before a capture command in the multi-windows 1211, 1213, and 1215.

According to various embodiments, the operation of selecting and displaying, by the electronic device (e.g., the electronic device 101 of FIG. 1 or the electronic device 200 of FIG. 2A), the area 1220 to be captured, according to the predetermined criterion, under the control of the processor (e.g., the processor 120 of FIG. 1) on the screen 1201 may be an operation of automatically selecting and displaying, as the area 1220 to be captured, a screen corresponding to the window 1211 having received a user's input immediately before a capture command in the multi-windows 1211, 1213, and 1215.

According to various embodiments, the operation of selecting and displaying, by the electronic device (e.g., the electronic device 101 of FIG. 1 or the electronic device 200 of FIG. 2A), the area 1220 to be captured, according to the predetermined criterion, under the control of the processor (e.g., the processor 120 of FIG. 1) on the screen 1201 may be an operation of automatically selecting and displaying, as the area 1220 to be captured, a process corresponding to the window 1211 having received a user's input immediately before a capture command in the multi-windows 1211, 1213, and 1215.

On the screen 1201, under the control of the processor (e.g., the processor 120 of FIG. 1), the electronic device (e.g., the electronic device 101 of FIG. 1 or the electronic device 200 of FIG. 2A) may capture a screen displayed on the display (e.g., the display device 160 of FIG. 1, or the display 230 or the sub-display 252 of FIG. 2A), select and display one window 1211 from among the multi-windows 1211, 1213, and 1215 as the area 1220 to be captured, according to the predetermined criterion, and display an editing tool user interface (for example, an image cropping user interface) on the display (e.g., the display device 160 of FIG. 1, or the display 230 or the sub-display 252 of FIG. 2A) with respect to the area 1220 to be captured.

According to various embodiments, on the screen 1201, the electronic device (e.g., the electronic device 101 of FIG. 1 or the electronic device 200 of FIG. 2A) may brightly display the area 1220 to be captured, which has been selected according to the predetermined criterion, and darkly display an unselected area, under the control of the processor (e.g., the processor 120 of FIG. 1).

According to various embodiments, on the screen 1201, the electronic device (e.g., the electronic device 101 of FIG. 1 or the electronic device 200 of FIG. 2A) may emphasize and display the area 1220 to be captured, which has been selected according to the predetermined criterion, and may not emphasize the unselected area, under the control of the processor (e.g., the processor 120 of FIG. 1).

According to various embodiments, on the screen 1201, the electronic device (e.g., the electronic device 101 of FIG. 1 or the electronic device 200 of FIG. 2A) may display a screenshot toolbar 1250 including a screen and/or a function capable of editing a captured area, under the control of the processor (e.g., the processor 120 of FIG. 1). When an image editing and/or modifying command is selected on the screenshot toolbar 1250, the electronic device may determine that a command for modifying a captured screen has been received.

According to various embodiments, on the screen 1201, the electronic device (e.g., the electronic device 101 of FIG. 1 or the electronic device 200 of FIG. 2A) may display the screenshot toolbar 1250 in an area which is not overlapped with the area 1220 to be captured, under the control of the processor (e.g., the processor 120 of FIG. 1).

On screen 1203, when an area to be captured is changed according to a user input, the electronic device (e.g., the electronic device 101 of FIG. 1 or the electronic device 200 of FIG. 2A) may update the area to be captured, under the control of the processor (e.g., the processor 120 of FIG. 1).

On the screen 1203, the electronic device (e.g., the electronic device 101 of FIG. 1 or the electronic device 200 of FIG. 2A) may update at least one window 1213 and 1215 among the multi-windows 1211, 1213, and 1215 as an area 1221 to be captured, according to a user input, under the control of the processor (e.g., the processor 120 of FIG. 1).

On the screen 1203, under the control of the processor (e.g., the processor 120 of FIG. 1), the electronic device (e.g., the electronic device 101 of FIG. 1 or the electronic device 200 of FIG. 2A) may capture a screen displayed on the display (e.g., the display device 160 of FIG. 1, or the display 230 or the sub-display 252 of FIG. 2A), select and display the windows 1213 and 1215 selected by the user input as the area to be captured, and display an editing tool user interface 1223 (for example, an image cropping user interface) on the display (e.g., the display device 160 of FIG. 1, or the display 230 or the sub-display 252 of FIG. 2A) with respect to the area to be captured.

According to various embodiments, on the screen 1201, the electronic device (e.g., the electronic device 101 of FIG. 1 or the electronic device 200 of FIG. 2A) may display the screenshot toolbar 1250 in an area which is not overlapped with the area 1221 to be captured, which has been selected according to the user input, under the control of the processor (e.g., the processor 120 of FIG. 1). The screenshot toolbar 1250 may be dynamically moved according to the areas 1220 and 1221 to be captured.

Figure 13:
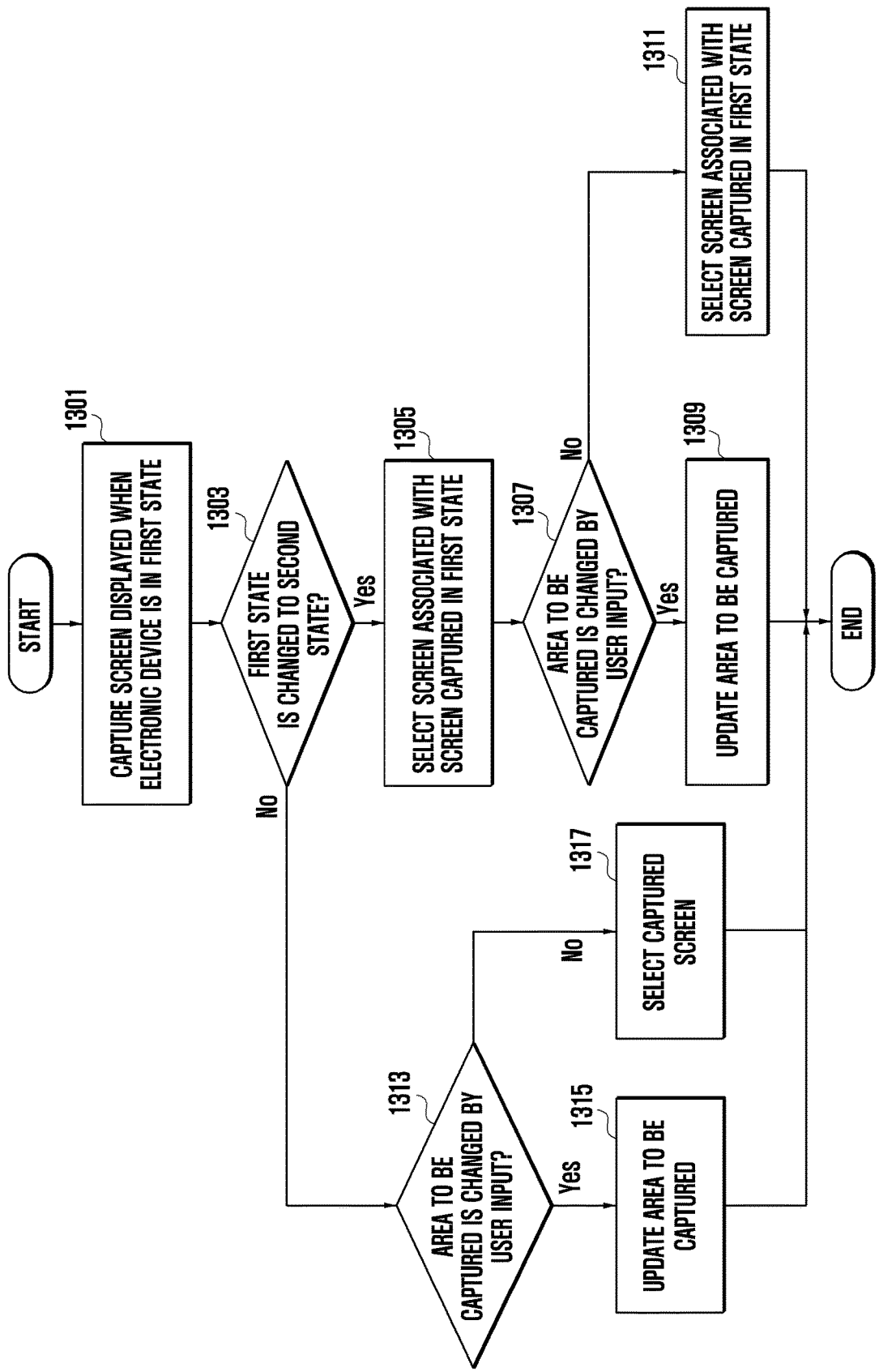
FIG. 13 is a flowchart illustrating another method of capturing a screen of an electronic device according to various embodiments of the disclosure.

FIG. 13 is a flowchart illustrating another capture operation method of an electronic device (e.g., the electronic device 101 of FIG. 1 or the electronic device 200 of FIG. 2A) according to various embodiments of the disclosure.

According to various embodiments, the electronic device (e.g., the electronic device 101 of FIG. 1 or the electronic device 200 of FIG. 2A) may capture a screen displayed on a display (e.g., the display device 160 of FIG. 1, or the display 230 or the sub-display 252 of FIG. 2A) when the electronic device (e.g., the electronic device 101 of FIG. 1 or the electronic device 200 of FIG. 2A) is in a first state, according to a capture command, in operation 1301, under the control of a processor (e.g., the processor 120 of FIG. 1).

According to various embodiments, referring to FIGS. 2A and 2B, the first state of the electronic device (e.g., the electronic device 101 of FIG. 1 or the electronic device 200 of FIG. 2A) may be a folded state.

The electronic device (e.g., the electronic device 101 of FIG. 1 or the electronic device 200 of FIG. 2A) according to various embodiments may determine whether the electronic device (e.g., the electronic device 101 of FIG. 1 or the electronic device 200 of FIG. 2A) has been changed from the first state to a second state, in operation 1303, under the control of the processor (e.g., the processor 120 of FIG. 1).

According to various embodiments, referring to FIGS. 2A and 2B, the second state of the electronic device (e.g., the electronic device 101 of FIG. 1 or the electronic device 200 of FIG. 2A) may be a flat state or an open state.

When it is determined in operation 1303, under the control of the processor (e.g., the processor 120 of FIG. 1), that the electronic device (e.g., the electronic device 101 of FIG. 1 or the electronic device 200 of FIG. 2A) has been changed from the first state to the second state, the electronic device (e.g., the electronic device 101 of FIG. 1 or the electronic device 200 of FIG. 2A) according to various embodiments may proceed to operation 1305 branched therefrom.

When it is determined in operation 1303, under the control of the processor (e.g., the processor 120 of FIG. 1), that the electronic device (e.g., the electronic device 101 of FIG. 1 or the electronic device 200 of FIG. 2A) maintains the first state, the electronic device (e.g., the electronic device 101 of FIG. 1 or the electronic device 200 of FIG. 2A) according to various embodiments may proceed to operation 1313 branched therefrom.

When the electronic device (e.g., the electronic device 101 of FIG. 1 or the electronic device 200 of FIG. 2A) according to various embodiments is changed from the first state to the second state, the electronic device (e.g., the electronic device 101 of FIG. 1 or the electronic device 200 of FIG. 2A) may select a screen associated with the screen captured in the first state as an area to be captured, in operation 1305.

When the electronic device (e.g., the electronic device 101 of FIG. 1 or the electronic device 200 of FIG. 2A) according to various embodiments is changed from the first state to the second state, the electronic device (e.g., the electronic device 101 of FIG. 1 or the electronic device 200 of FIG. 2A) may automatically select a screen associated with an image displayed on the sub-display 252 as an area to be captured and display the same on the display 230, in operation 1305.

The electronic device (e.g., the electronic device 101 of FIG. 1 or the electronic device 200 of FIG. 2A) according to various embodiments may determine whether an area to be captured has been changed by a user input, in operation 1307, under the control of the processor (e.g., the processor 120 of FIG. 1).

When it is determined in operation 1307, under the control of the processor (e.g., the processor 120 of FIG. 1), that the area to be captured has been changed by the user input, the electronic device (e.g., the electronic device 101 of FIG. 1 or the electronic device 200 of FIG. 2A) according to various embodiments may proceed to operation 1309 branched therefrom.

When it is determined in operation 1307, under the control of the processor (e.g., the processor 120 of FIG. 1), that the area to be captured has not been changed by the user input, the electronic device (e.g., the electronic device 101 of FIG. 1 or the electronic device 200 of FIG. 2A) according to various embodiments may proceed to operation 1311 branched therefrom.

The operation in which the electronic device (e.g., the electronic device 101 of FIG. 1 or the electronic device 200 of FIG. 2A) according to various embodiments changes the area to be captured, by the user input, in operation 1307, under the control of the processor (e.g., the processor 120 of FIG. 1) may be at least one of an operation of selecting a window different from an automatically selected window in a captured screen according to a user's input, an operation of expanding or reducing the automatically selected window, and/or an operation of selecting a window different from the selected window and expanding or reducing the window selected by the user.

A user input capable of expanding or reducing a window may be a gesture input, a multi-finger input, a touch input, and/or a pen input. The touch input may be, for example, an input of touching a specific location by using a pointer and/or touching a specific location by using the pointer and then dragging the touch to a predetermined distance while maintaining the touch. The touch input may be an input to the selected window or to an editing tool (for example, a GUI represented by a clamp) displayed together in the selected window.

Under the control of the processor (e.g., the processor 120 of FIG. 1), the electronic device (e.g., the electronic device 101 of FIG. 1 or the electronic device 200 of FIG. 2A) may display a graphical user interface (GUI) relating to an editing screen on which a window can be selected, on the display (e.g., the display device 160 of FIG. 1, or the display 230 or the sub-display 252 of FIG. 2A), and receive a user input to the GUI relating to the editing screen.

According to various embodiments, in order to change an area to be captured by a user input, the electronic device (e.g., the electronic device 101 of FIG. 1 or the electronic device 200 of FIG. 2A) may provide a screen and/or a function capable of editing a captured screen and/or an area to be captured, under the control of the processor (e.g., the processor 120 of FIG. 1).

When the area to be captured is changed by the user input, the electronic device (e.g., the electronic device 101 of FIG. 1 or the electronic device 200 of FIG. 2A) according to various embodiments may update the area to be captured, in operation 1309, under the control of the processor (e.g., the processor 120 of FIG. 1).

When the area to be captured is not changed by the user input, the electronic device (e.g., the electronic device 101 of FIG. 1 or the electronic device 200 of FIG. 2A) according to various embodiments may select a screen associated with the screen captured in the first state of the electronic device (e.g., the electronic device 101 of FIG. 1 or the electronic device 200 of FIG. 2A) as the area to be captured, in operation 1311, under the control of the processor (e.g., the processor 120 of FIG. 1).

According to various embodiments, when the electronic device (e.g., the electronic device 101 of FIG. 1 or the electronic device 200 of FIG. 2A) maintains the first state, the electronic device (e.g., the electronic device 101 of FIG. 1 or the electronic device 200 of FIG. 2A) may determine whether the area to be captured has been changed by the user input, in operation 1313, under the control of the processor (e.g., the processor 120 of FIG. 1).

When it is determined in operation 1313, under the control of the processor (e.g., the processor 120 of FIG. 1), that the area to be captured has been changed by the user input, the electronic device (e.g., the electronic device 101 of FIG. 1 or the electronic device 200 of FIG. 2A) according to various embodiments may proceed to operation 1315 branched therefrom.

When it is determined in operation 1313, under the control of the processor (e.g., the processor 120 of FIG. 1), that the area to be captured has not been changed by the user input, the electronic device (e.g., the electronic device 101 of FIG. 1 or the electronic device 200 of FIG. 2A) according to various embodiments may proceed to operation 1317 branched therefrom.

The operation in which the electronic device (e.g., the electronic device 101 of FIG. 1 or the electronic device 200 of FIG. 2A) according to various embodiments changes the area to be captured, by the user input, in operation 1313, under the control of the processor (e.g., the processor 120 of FIG. 1) may be at least one of an operation of selecting a window different from an automatically selected window in a captured screen according to a user's input, an operation of expanding or reducing the automatically selected window, and/or an operation of selecting a window different from the selected window and expanding or reducing the window selected by the user.

A user input capable of expanding or reducing a window may be a gesture input, a multi-finger input, a touch input, and/or a pen input. The touch input may be, for example, an input of touching a specific location by using a pointer and/or touching a specific location by using the pointer and then dragging the touch to a predetermined distance while maintaining the touch. The touch input may be an input to the selected window or to an editing tool (for example, a GUI represented by a clamp) displayed together in the selected window.

Under the control of the processor (e.g., the processor 120 of FIG. 1), the electronic device (e.g., the electronic device 101 of FIG. 1 or the electronic device 200 of FIG. 2A) may display a graphical user interface (GUI) relating to an editing screen on which a window can be selected, on the display (e.g., the display device 160 of FIG. 1, or the display 230 or the sub-display 252 of FIG. 2A), and receive a user input to the GUI relating to the editing screen.

According to various embodiments, in order to change an area to be captured by a user input, the electronic device (e.g., the electronic device 101 of FIG. 1 or the electronic device 200 of FIG. 2A) may provide a screen and/or a function capable of editing a captured screen and/or an area to be captured, under the control of the processor (e.g., the processor 120 of FIG. 1).

When the area to be captured is changed by the user input, the electronic device (e.g., the electronic device 101 of FIG. 1 or the electronic device 200 of FIG. 2A) according to various embodiments may update the area to be captured, in operation 1315, under the control of the processor (e.g., the processor 120 of FIG. 1).

When the area to be captured is not changed by the user input, the electronic device (e.g., the electronic device 101 of FIG. 1 or the electronic device 200 of FIG. 2A) according to various embodiments may select a screen associated with the screen captured in the first state of the electronic device (e.g., the electronic device 101 of FIG. 1 or the electronic device 200 of FIG. 2A) as the area to be captured, in operation 1317, under the control of the processor (e.g., the processor 120 of FIG. 1).

Figure 14:
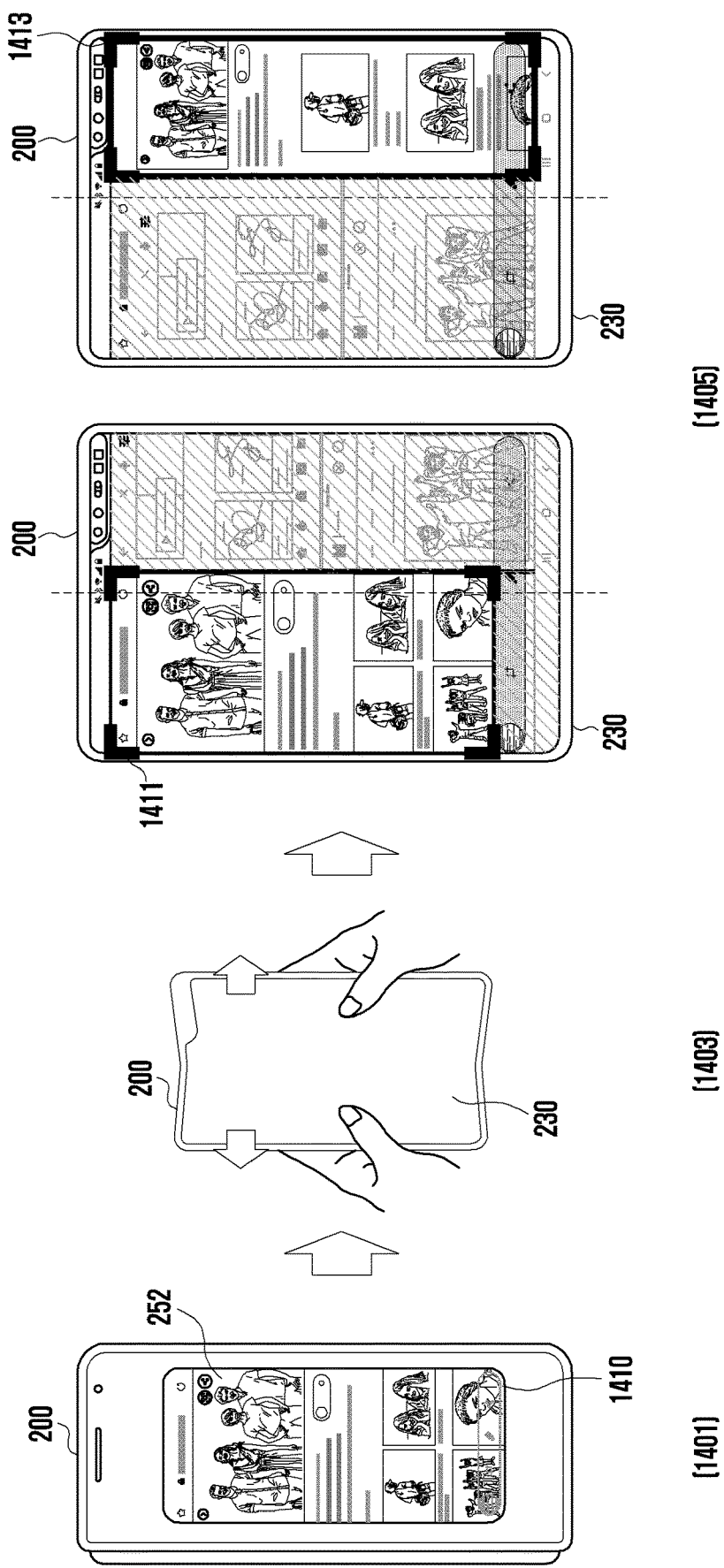
FIG. 14 is a diagram illustrating an exemplary execution of a capture operation of an electronic device according to various embodiments of the disclosure.

FIG. 14 is a diagram illustrating an exemplary execution of a capture operation of an electronic device (e.g., the electronic device 101 of FIG. 1 or the electronic device 200 of FIG. 2A) according to various embodiments of the disclosure.

On screen 1401, when the electronic device (e.g., the electronic device 101 of FIG. 1 or the electronic device 200 of FIG. 2A) is in a first state, the electronic device (e.g., the electronic device 101 of FIG. 1 or the electronic device 200 of FIG. 2A) may capture a screen 1410 displayed on a display (e.g., the display device 160 of FIG. 1 or the sub-display 252 of FIG. 2A) according to a capture command, under the control of a processor (e.g., the processor 120 of FIG. 1).

According to various embodiments, referring to FIGS. 2A and 2B, the first state of the electronic device (e.g., the electronic device 101 of FIG. 1 or the electronic device 200 of FIG. 2A) may be a folded state.

On screen 1403, in relation to the electronic device (e.g., the electronic device 101 of FIG. 1 or the electronic device 200 of FIG. 2A), the electronic device (e.g., the electronic device 101 of FIG. 1 or the electronic device 200 of FIG. 2A) may be changed from the first state to a second state under the control of the processor (e.g., the processor 120 of FIG. 1).

According to various embodiments, referring to FIGS. 2A and 2B, the second state of the electronic device (e.g., the electronic device 101 of FIG. 1 or the electronic device 200 of FIG. 2A) may be a flat state or an open state.

On screen 1405, the electronic device (e.g., the electronic device 101 of FIG. 1 or the electronic device 200 of FIG. 2A) may automatically select a screen 1410 displayed on the sub-display 252 as an area 1411 to be captured and display the same on the display 230, under the control of the processor (e.g., the processor 120 of FIG. 1).

On the screen 1405, when an area 1413 to be captured is changed by a user input, the electronic device (e.g., the electronic device 101 of FIG. 1 or the electronic device 200 of FIG. 2A) may update the area to be captured, under the control of the processor (e.g., the processor 120 of FIG. 1).

Figure 15:
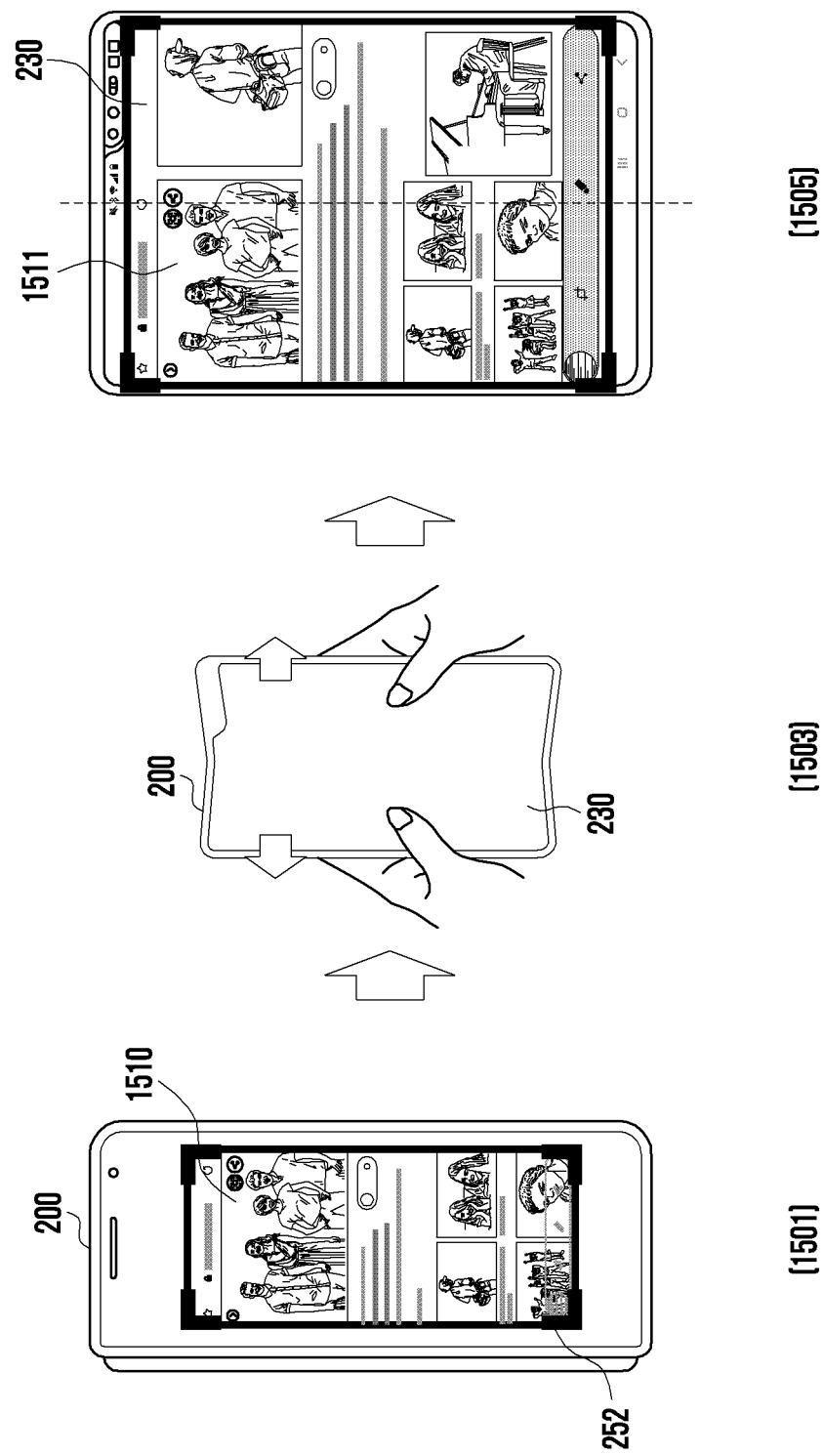
FIG. 15 is a diagram illustrating another exemplary execution of a capture operation of an electronic device according to various embodiments of the disclosure.

FIG. 15 is a diagram illustrating another exemplary execution of a capture operation of an electronic device (e.g., the electronic device 101 of FIG. 1 or the electronic device 200 of FIG. 2A) according to various embodiments of the disclosure.

On screen 1501, when the electronic device (e.g., the electronic device 101 of FIG. 1 or the electronic device 200 of FIG. 2A) is in a first state, the electronic device (e.g., the electronic device 101 of FIG. 1 or the electronic device 200 of FIG. 2A) may capture a screen 1510 displayed on a display (e.g., the display device 160 of FIG. 1 or the sub-display 252 of FIG. 2A) according to a capture command, under the control of a processor (e.g., the processor 120 of FIG. 1).

According to various embodiments, referring to FIGS. 2A and 2B, the first state of the electronic device (e.g., the electronic device 101 of FIG. 1 or the electronic device 200 of FIG. 2A) may be a folded state.

On screen 1503, in relation to the electronic device (e.g., the electronic device 101 of FIG. 1 or the electronic device 200 of FIG. 2A), the electronic device (e.g., the electronic device 101 of FIG. 1 or the electronic device 200 of FIG. 2A) may be changed from the first state to a second state under the control of a processor (e.g., the processor 120 of FIG. 1).

According to various embodiments, referring to FIGS. 2A and 2B, the second state of the electronic device (e.g., the electronic device 101 of FIG. 1 or the electronic device 200 of FIG. 2A) may be a flat state or an open state.

On screen 1505, the electronic device (e.g., the electronic device 101 of FIG. 1 or the electronic device 200 of FIG. 2A) may automatically select a screen 1510 displayed on the sub-display 252 as an area 1511 to be captured and display the same on the display 230, under the control of the processor (e.g., the processor 120 of FIG. 1).

In the first state of the electronic device (e.g., the electronic device 101 of FIG. 1 or the electronic device 200 of FIG. 2A), the screen 1510 displayed on the sub-display 252 may be a mobile interface screen.

In the second state of the electronic device (e.g., the electronic device 101 of FIG. 1 or the electronic device 200 of FIG. 2A), the screen 1510 displayed on the sub-display 252, which is displayed on the display 230, may be a tablet interface screen and/or a PC interface screen.

Figure 16:
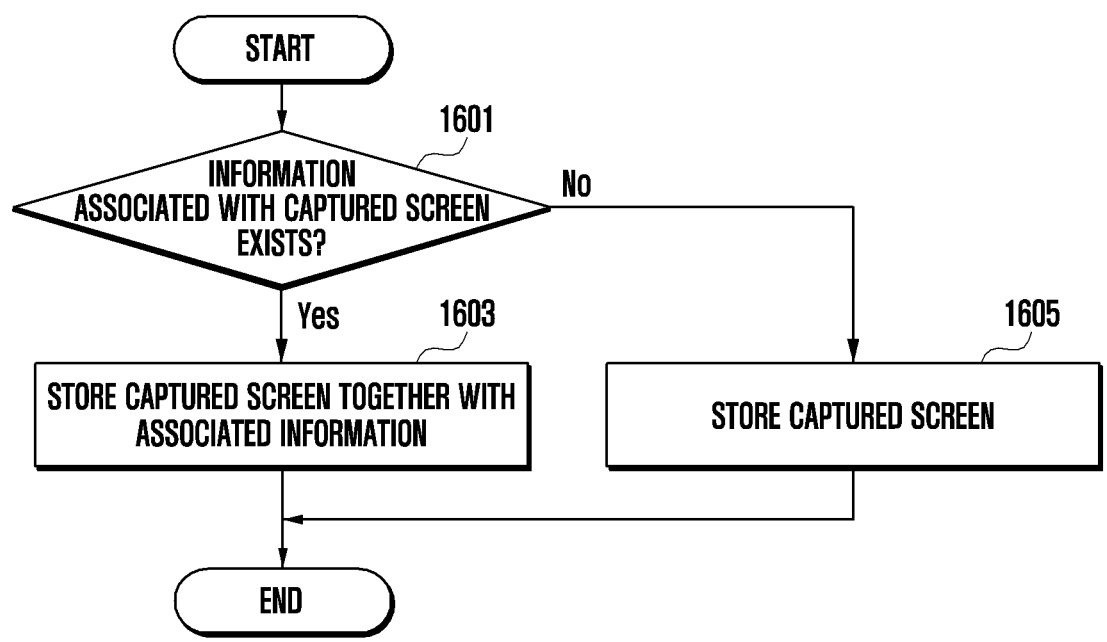
FIG. 16 is a flowchart illustrating an operation of storing a captured image by an electronic device according to various embodiments of the disclosure.

FIG. 16 is a flowchart illustrating operations 611 and 613 of storing a captured image by an electronic device (e.g., the electronic device 101 of FIG. 1 or the electronic device 200 of FIG. 2A) according to various embodiments of the disclosure.

According to various embodiments, the electronic device (e.g., the electronic device 101 of FIG. 1 or the electronic device 200 of FIG. 2A) may determine whether information associated with a captured screen exists, in operation 1601, under the control of a processor (e.g., the processor 120 of FIG. 1).

When it is determined in operation 1601, under the control of the processor (e.g., the processor 120 of FIG. 1), that the information associated with the captured screen exists, the electronic device (e.g., the electronic device 101 of FIG. 1 or the electronic device 200 of FIG. 2A) according to various embodiments may proceed to operation 1603 branched therefrom.

When it is determined in operation 1601, under the control of the processor (e.g., the processor 120 of FIG. 1), that the information associated with the captured screen does not exist, the electronic device (e.g., the electronic device 101 of FIG. 1 or the electronic device 200 of FIG. 2A) according to various embodiments may proceed to operation 1605 branched therefrom.

When the captured screen is related to an Internet application, the information associated with the captured screen according to various embodiments may include at least some pieces of information among uniform resource locator (URL) information, a title of a URL page, a time or place where the captured screen is generated, text information extracted from the captured screen, and/or color information extracted from the captured screen.

The information associated with the captured screen according to various embodiments may correspond to a call recording when the captured screen is related to a call application. When the captured screen is related to the call application, the information (e.g., tag information) associated with the captured screen may include at least some pieces of information among information (a phone number and name) on a call counterpart, a time of recording, a length of recording, or a date of recording.

When the captured screen is related to a music playback application, the information associated with the captured screen according to various embodiments may be generated in a form corresponding to an audio file (e.g., mp3 or m3a extension) by capturing audio including at least a part of audio data reproduced by the music playback application. The information (e.g., tag information) associated with the captured screen, which can be added to an audio file (e.g., mp3 or m3a extension), may include information on at least a part of a music title, an album title, a singer's name, or a length of a sound source.

The electronic device (e.g., the electronic device 101 of FIG. 1 or the electronic device 200 of FIG. 2A) according to various embodiments may store the captured screen together with the associated information as a captured image, in operation 1603, under the control of the processor (e.g., the processor 120 of FIG. 1).

The electronic device (e.g., the electronic device 101 of FIG. 1 or the electronic device 200 of FIG. 2A) according to various embodiments may store the associated information as the captured image in a vertical and/or horizontal direction of the captured screen, in operation 1603, under the control of the processor (e.g., the processor 120 of FIG. 1).

The electronic device (e.g., the electronic device 101 of FIG. 1 or the electronic device 200 of FIG. 2A) according to various embodiments may store only the captured screen as a captured image, in operation 1605, under the control of the processor (e.g., the processor 120 of FIG. 1).

Figure 17:
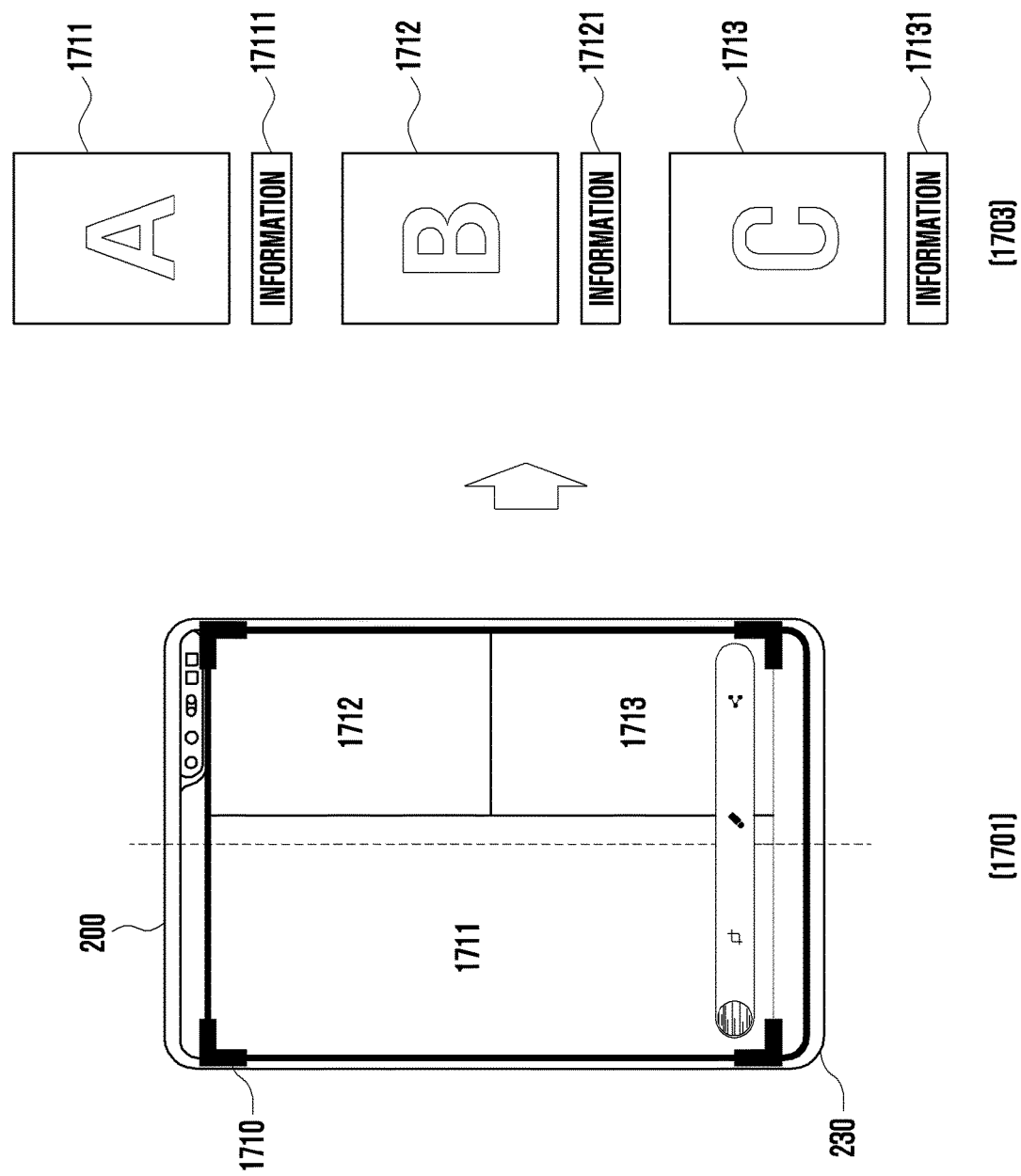
FIG. 17 is a diagram illustrating an exemplary execution of an operation of storing a captured image by an electronic device according to various embodiments of the disclosure.

FIG. 17 is a diagram illustrating an exemplary execution of operations 611 and 613 of storing a captured image by an electronic device (e.g., the electronic device 101 of FIG. 1 or the electronic device 200 of FIG. 2A) according to various embodiments of the disclosure.

The electronic device (e.g., the electronic device 101 of FIG. 1 or the electronic device 200 of FIG. 2A) according to various embodiments may determine whether information associated with a captured screen 1710 exists, under the control of a processor (e.g., the processor 120 of FIG. 1). At least one window 1711, 1712, and 1713 may be included in the captured screen 1710.

When the captured screen 1710 is related to an Internet application, information 17111, 17121, and 17131 associated with the captured screen 1710 according to various embodiments may include at least some pieces of information among uniform resource locator (URL) information, a title of a URL page, a time or place where the captured screen is generated, text information extracted from the captured screen, and/or color information extracted from the captured screen.

The information 17111, 17121, and 17131 associated with the captured screen 1710 according to various embodiments may correspond to a call recording when the captured screen 1710 is related to a call application. When the captured screen 1710 is related to the call application, the information (e.g., tag information) associated with the captured screen 1710 may include at least some pieces of information among information (a phone number and name) on a call counterpart, a time of recording, a length of recording, or a date of recording.

When the captured screen 1710 is related to a music playback application, the information 17111, 17121, and 17131 associated with the captured screen 1710 according to various embodiments may be generated in a form corresponding to an audio file (e.g., mp3 or m3a extension) by capturing audio including at least a part of audio data reproduced by the music playback application. The information (e.g., tag information) associated with the captured screen, which can be added to an audio file (e.g., mp3 or m3a extension), may include information on at least a part of a music title, an album title, a singer's name, or a length of a sound source.

The electronic device (e.g., the electronic device 101 of FIG. 1 or the electronic device 200 of FIG. 2A) according to various embodiments may store the captured screens 1711, 1712, and 1713 together with the associated information 17111, 17121, and 17131 as captured images, under the control of the processor (e.g., the processor 120 of FIG. 1).

The electronic device (e.g., the electronic device 101 of FIG. 1 or the electronic device 200 of FIG. 2A) according to various embodiments may store the associated information 17111, 17121, and 17131 as the captured images in a vertical and/or horizontal direction of the captured screens 1711, 1712, and 1713, under the control of the processor (e.g., the processor 120 of FIG. 1).

Figure 18:
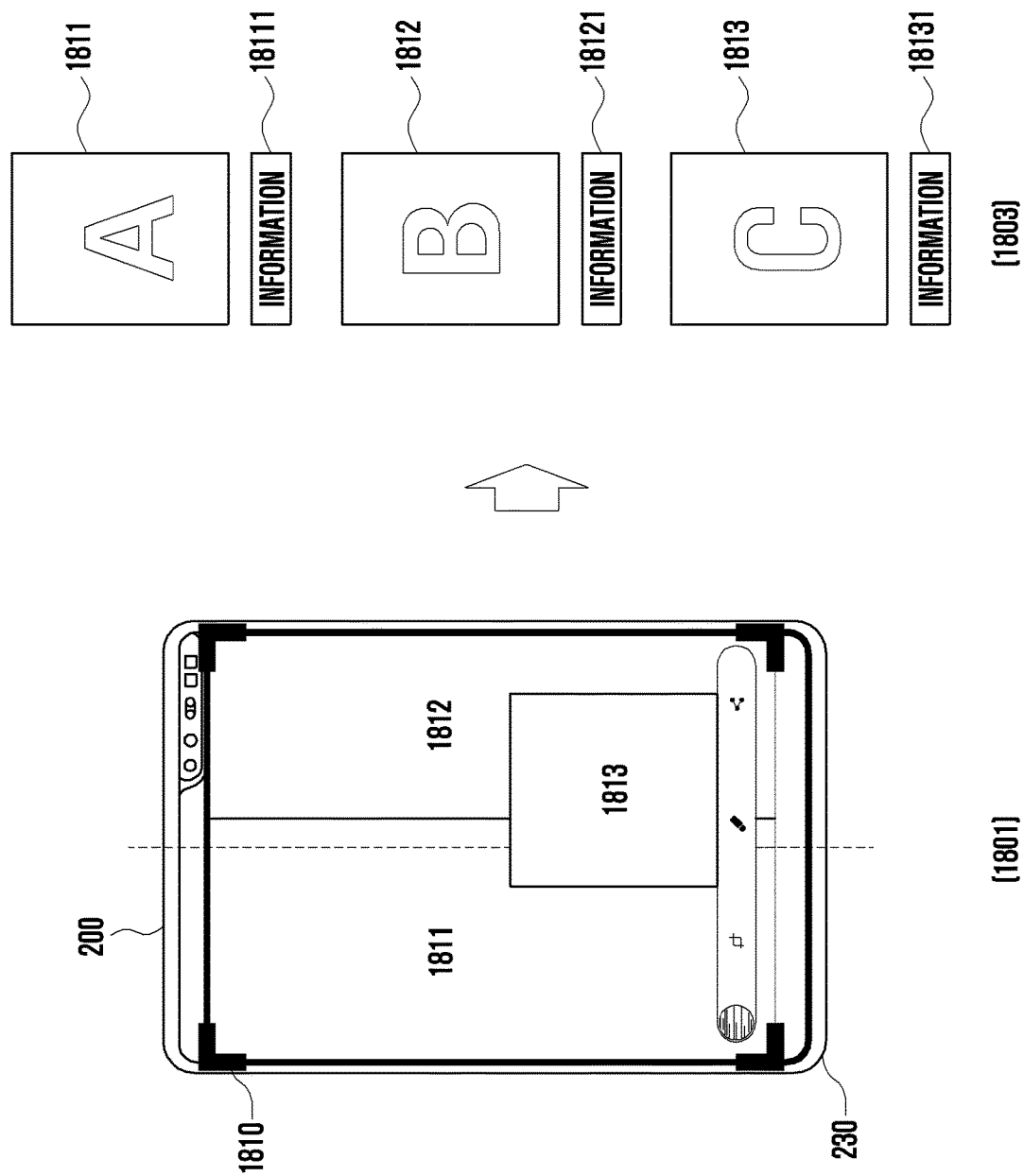
FIG. 18 is a diagram illustrating another exemplary execution of an operation of storing a captured image by an electronic device according to various embodiments of the disclosure.

FIG. 18 is a diagram illustrating another exemplary execution of operations 611 and 613 of storing a captured image by an electronic device (e.g., the electronic device 101 of FIG. 1 or the electronic device 200 of FIG. 2A) according to various embodiments of the disclosure.

The electronic device (e.g., the electronic device 101 of FIG. 1 or the electronic device 200 of FIG. 2A) according to various embodiments may determine whether information associated with a captured screen 1810 exists, under the control of a processor (e.g., the processor 120 of FIG. 1). At least one window 1811, 1812, and 1813 may be included in the captured screen 1810. At least one of the windows 1811, 1812, and 1813 may be multi-windows. At least one of the multi-windows 1811, 1812, and 1813 may be an overlapping window 1813. The overlapping window 1813 may be, for example, a pop-up window 1813. The overlapping window 1913 may be a window overlapped and displayed on another window.

When the captured screen 1810 is related to an Internet application, information 18111, 18121, and 18131 associated with the captured screen 1810 according to various embodiments may include at least some pieces of information among uniform resource locator (URL) information, a title of a URL page, a time or place where the captured screen is generated, text information extracted from the captured screen, and/or color information extracted from the captured screen.

The information 18111, 18121, and 18131 associated with the captured screen 1810 according to various embodiments may correspond to a call recording when the captured screen 1810 is related to a call application. When the captured screen 1810 is related to the call application, the information (e.g., tag information) associated with the captured screen 1810 may include at least some pieces of information among information (a phone number and name) on a call counterpart, a time of recording, a length of recording, or a date of recording.

When the captured screen 1810 is related to a music playback application, the information 18111, 18121, and 18131 associated with the captured screen 1810 according to various embodiments may be generated in a form corresponding to an audio file (e.g., mp3 or m3a extension) by capturing audio including at least a part of audio data reproduced by the music playback application. The information (e.g., tag information) associated with the captured screen, which can be added to an audio file (e.g., mp3 or m3a extension), may include information on at least a part of a music title, an album title, a singer's name, or a length of a sound source.

The electronic device (e.g., the electronic device 101 of FIG. 1 or the electronic device 200 of FIG. 2A) according to various embodiments may store the captured screens of windows 1811, 1812, and 1813 together with the associated information 18111, 18121, and 18131 as captured images, under the control of the processor (e.g., the processor 120 of FIG. 1).

The electronic device (e.g., the electronic device 101 of FIG. 1 or the electronic device 200 of FIG. 2A) according to various embodiments may store the associated information 18111, 18121, and 18131 as the captured images in a vertical and/or horizontal direction of the captured screens 1811, 1812, and 1813, under the control of the processor (e.g., the processor 120 of FIG. 1).

Figure 19:
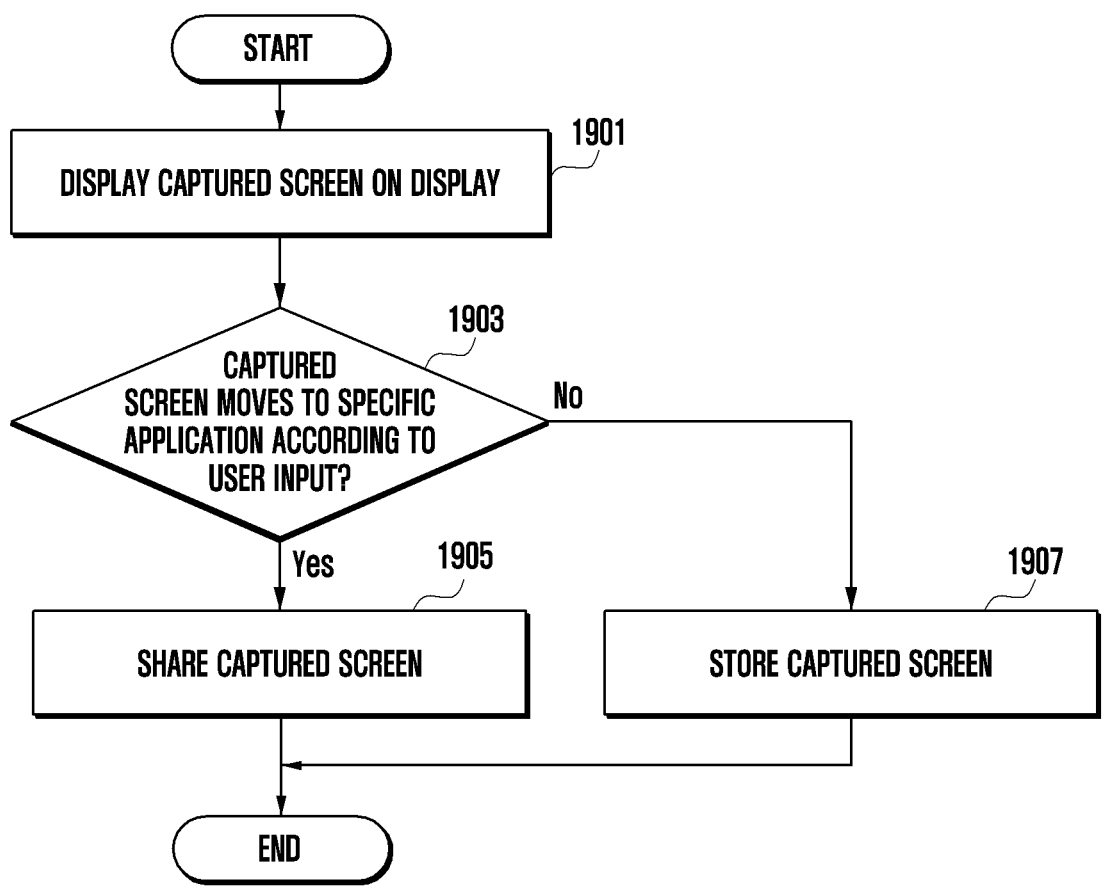
FIG. 19 is a flowchart illustrating an operation of sharing a captured image by an electronic device according to various embodiments of the disclosure.

FIG. 19 is a flowchart illustrating an operation of sharing a captured image by an electronic device (e.g., the electronic device 101 of FIG. 1 or the electronic device 200 of FIG. 2A) according to various embodiments of the disclosure.

The electronic device (e.g., the electronic device 101 of FIG. 1 or the electronic device 200 of FIG. 2A) according to various embodiments may display a captured screen on a display, in operation 1901, under the control of a processor (e.g., the processor 120 of FIG. 1).

The electronic device (e.g., the electronic device 101 of FIG. 1 or the electronic device 200 of FIG. 2A) according to various embodiments may display an image stored after being captured on the display, in operation 1901, under the control of the processor (e.g., the processor 120 of FIG. 1).

The electronic device (e.g., the electronic device 101 of FIG. 1 or the electronic device 200 of FIG. 2A) according to various embodiments may determine whether a captured screen moves to a specific application according to a user input, in operation 1903, under the control of the processor (e.g., the processor 120 of FIG. 1).

When it is determined in operation 1903, under the control of the processor (e.g., the processor 120 of FIG. 1), that the captured screen moves to the specific application according to the user input, the electronic device (e.g., the electronic device 101 of FIG. 1 or the electronic device 200 of FIG. 2A) according to various embodiments may proceed to operation 1905 branched therefrom.

When it is determined in operation 1903, under the control of the processor (e.g., the processor 120 of FIG. 1), that the captured screen does not move to the specific application according to the user input, the electronic device (e.g., the electronic device 101 of FIG. 1 or the electronic device 200 of FIG. 2A) according to various embodiments may proceed to operation 1907 branched therefrom.

In the electronic device (e.g., the electronic device 101 of FIG. 1 or the electronic device 200 of FIG. 2A) according to various embodiments, the captured screen may be reduced and moved according to the user input while the captured screen moves to the specific application according to the user input, in operation 1903, under the control of the processor (e.g., the processor 120 of FIG. 1). In this case, the user input may be a drag, sweep input, and/or gesture on the captured screen.

The specific application may be a communication application, a web hard application, and/or a social network application.

The electronic device (e.g., the electronic device 101 of FIG. 1 or the electronic device 200 of FIG. 2A) according to various embodiments may transmit the captured screen to another electronic device via the specific application, in operation 1905, under the control of the processor (e.g., the processor 120 of FIG. 1).

The electronic device (e.g., the electronic device 101 of FIG. 1 or the electronic device 200 of FIG. 2A) according to various embodiments may share the captured screen with another electronic device (e.g., the electronic device 104 or the server 108) via the specific application, in operation 1905, under the control of the processor (e.g., the processor 120 of FIG. 1).

The electronic device (e.g., the electronic device 101 of FIG. 1 or the electronic device 200 of FIG. 2A) according to various embodiments may store the captured screen in a cloud storage device or the memory 130 of the electronic device (e.g., the electronic device 101 of FIG. 1 or the electronic device 200 of FIG. 2A), in operation 1907, under the control of the processor (e.g., the processor 120 of FIG. 1).

Figure 20:
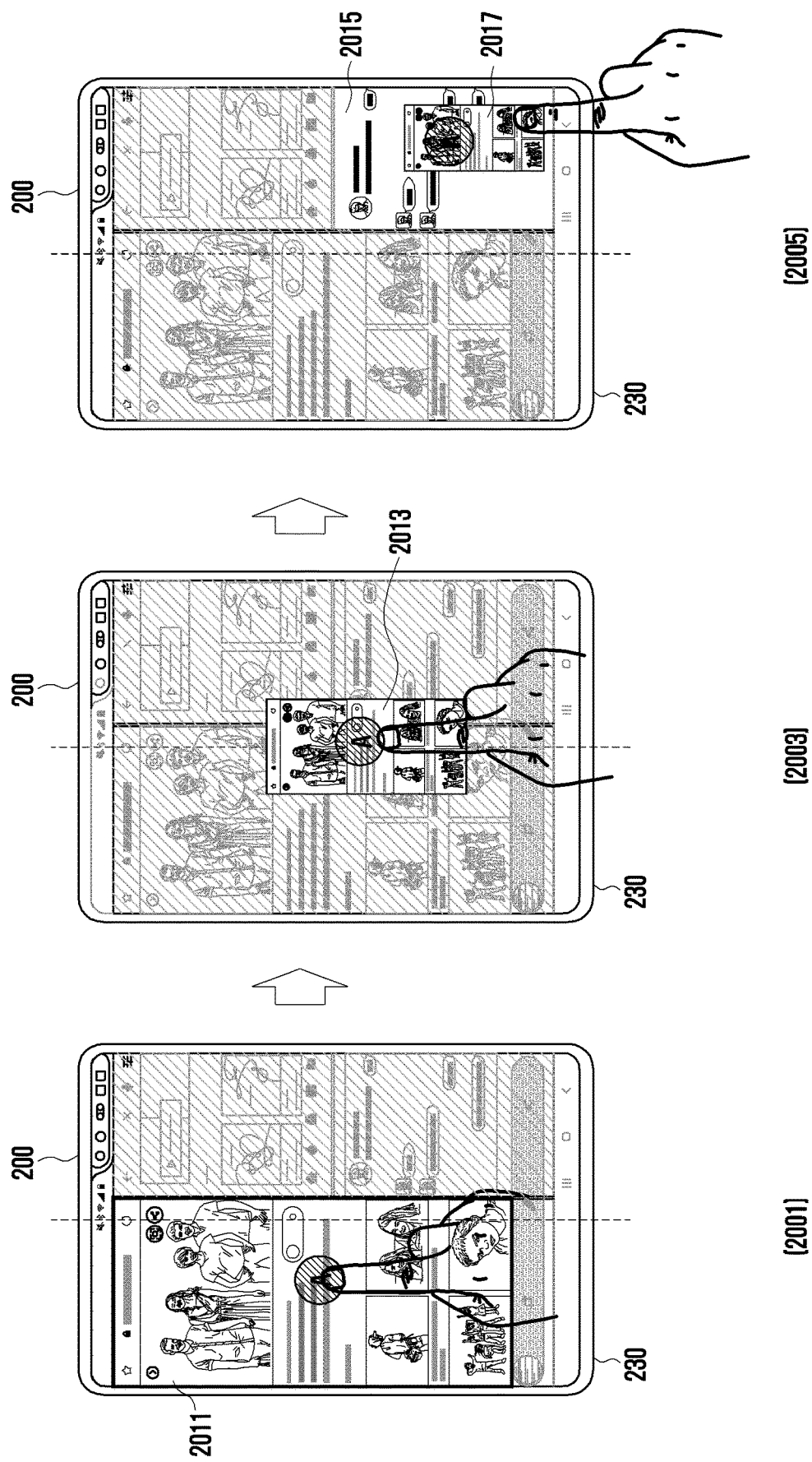
FIG. 20 is a diagram illustrating an exemplary execution of an operation of sharing a captured image by an electronic device according to various embodiments of the disclosure.

FIG. 20 is a diagram illustrating an exemplary execution of an operation of sharing a captured image by an electronic device (e.g., the electronic device 101 of FIG. 1 or the electronic device 200 of FIG. 2A) according to various embodiments of the disclosure.

On screen 2001, the electronic device (e.g., the electronic device 101 of FIG. 1 or the electronic device 200 of FIG. 2A) according to various embodiments may display a captured screen 2011 on the display 230, under the control of a processor (e.g., the processor 120 of FIG. 1).

On the screen 2001, the electronic device (e.g., the electronic device 101 of FIG. 1 or the electronic device 200 of FIG. 2A) according to various embodiments may display an image of the captured screen 2011 stored after being captured on the display 230, under the control of the processor (e.g., the processor 120 of FIG. 1).

On screen 2003, the electronic device (e.g., the electronic device 101 of FIG. 1 or the electronic device 200 of FIG. 2A) according to various embodiments may move the captured screen to a specific application 2015 according to a user input, under the control of the processor (e.g., the processor 120 of FIG. 1).

On the screen 2003, in the electronic device (e.g., the electronic device 101 of FIG. 1 or the electronic device 200 of FIG. 2A) according to various embodiments, a captured screen 2113 may be reduced and moved according to the user input while the captured screen moves to the specific application 2015 according to the user input, under the control of the processor (e.g., the processor 120 of FIG. 1). In this case, the user input may be a drag, sweep input, and/or gesture on the captured screen.

The specific application may be a communication application, a web hard application, and/or a social network application.

On screen 2005, the electronic device (e.g., the electronic device 101 of FIG. 1 or the electronic device 200 of FIG. 2A) according to various embodiments may transmit a captured screen 2017 to another electronic device via the specific application 2015, under the control of the processor (e.g., the processor 120 of FIG. 1).

On the screen 2005, the electronic device (e.g., the electronic device 101 of FIG. 1 or the electronic device 200 of FIG. 2A) according to various embodiments may share the captured screen 2017 with another electronic device (e.g., the electronic device 104 or the server 108) via the specific application 2015, under the control of the processor (e.g., the processor 120 of FIG. 1).

Figure 21:
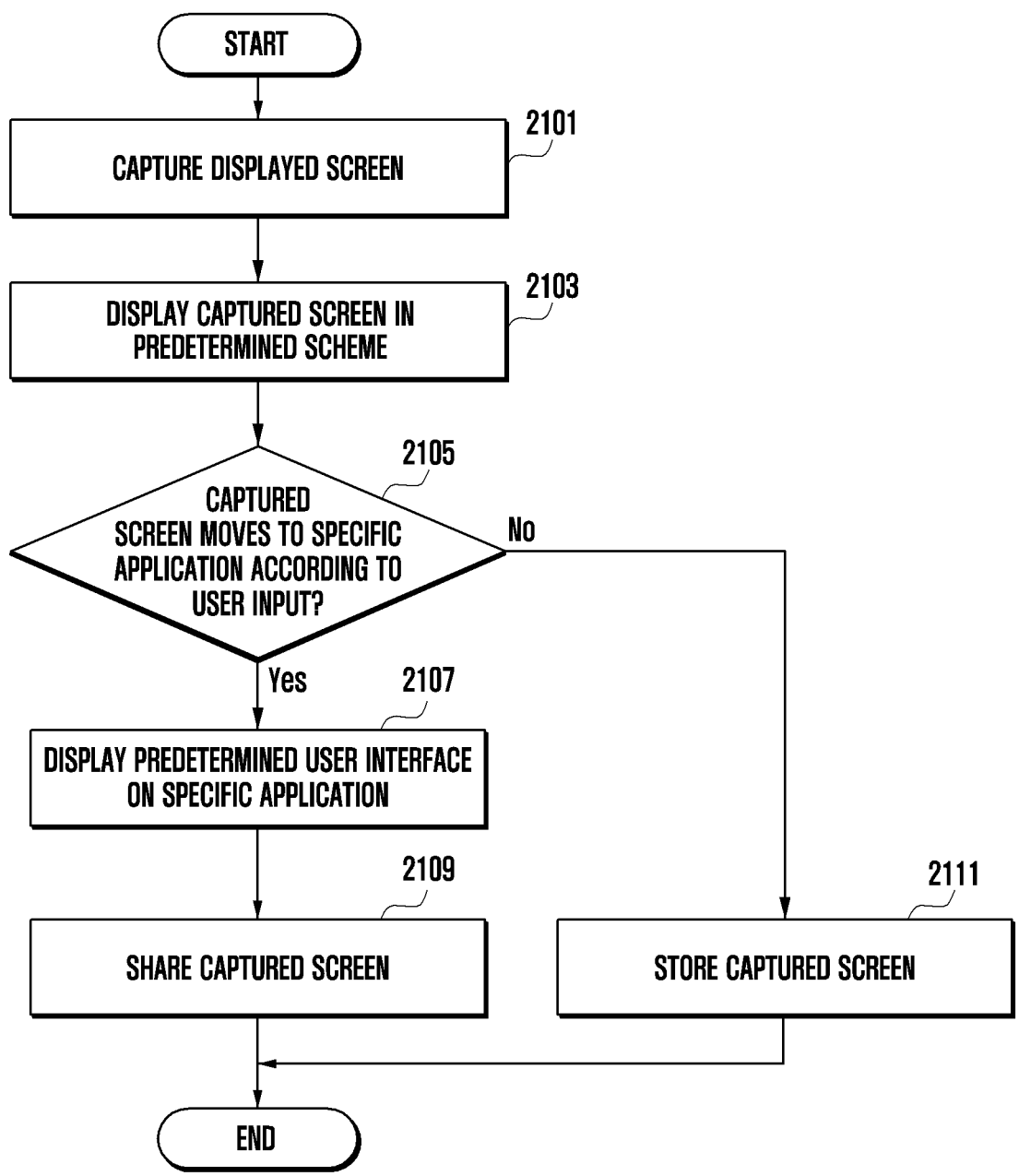
FIG. 21 is a flowchart illustrating an operation of sharing a captured image by an electronic device according to various embodiments of the disclosure.

FIG. 21 is a flowchart illustrating an operation of sharing a captured image by an electronic device (e.g., the electronic device 101 of FIG. 1 or the electronic device 200 of FIG. 2A) according to various embodiments of the disclosure.

The electronic device (e.g., the electronic device 101 of FIG. 1 or the electronic device 200 of FIG. 2A) according to various embodiments may capture a displayed screen, in operation 2101, under the control of a processor (e.g., the processor 120 of FIG. 1).

According to various embodiments, the displayed screen may be a screen in which image or video information is displayed in a window and/or a layout activated on a display (e.g., the display device 160 of FIG. 1, or the display 230 or the sub-display 252 of FIG. 2A).

According to various embodiments, the displayed screen may include a user interface of a running application. The application may correspond to a running application stored in one window frame buffer screen or multiple window frame buffers. According to various embodiments, the capturing operation may include an operation of acquiring and/or generating an image of a still image of a screen displayed on the display (e.g., the display device 160 of FIG. 1, or the display 230 or the sub-display 252 of FIG. 2A).

According to various embodiments, the capturing operation may include an operation of capturing the entire screen displayed on the display (e.g., the display device 160 of FIG. 1, or the display 230 or the sub-display 252 of FIG. 2A).

According to various embodiments, the capturing operation may include an operation of capturing at least a part of a screen displayed on the display (e.g., the display device 160 of FIG. 1, or the display 230 or the sub-display 252 of FIG. 2A).

According to various embodiments, the capturing operation may be an operation of capturing a screen being displayed in an area corresponding to at least one of the first area 231a or the second area 231b of the display (e.g., the display 230 of FIG. 2A).

The electronic device (e.g., the electronic device 101 of FIG. 1 or the electronic device 200 of FIG. 2A) according to various embodiments may display a captured screen on the display in a predetermined scheme, in operation 2103, under the control of the processor (e.g., the processor 120 of FIG. 1).

The operation of displaying the captured screen on the display in the predetermined scheme according to various embodiments may be, for example, a floating user interface scheme including the captured screen. The floating user interface may be, for example, configured in a form in which a reduced image (e.g., thumbnail) of the captured screen is displayed to float.

The electronic device (e.g., the electronic device 101 of FIG. 1 or the electronic device 200 of FIG. 2A) according to various embodiments may determine whether the captured screen moves to a specific application according to a user input, in operation 2105, under the control of the processor (e.g., the processor 120 of FIG. 1).

When it is determined in operation 2105, under the control of the processor (e.g., the processor 120 of FIG. 1), that the captured screen moves to the specific application according to the user input, the electronic device (e.g., the electronic device 101 of FIG. 1 or the electronic device 200 of FIG. 2A) according to various embodiments may proceed to operation 2107 branched therefrom.

When it is determined in operation 2105, under the control of the processor (e.g., the processor 120 of FIG. 1), that the captured screen does not move to the specific application according to the user input, the electronic device (e.g., the electronic device 101 of FIG. 1 or the electronic device 200 of FIG. 2A) according to various embodiments may proceed to operation 2111 branched therefrom.

The electronic device (e.g., the electronic device 101 of FIG. 1 or the electronic device 200 of FIG. 2A) according to various embodiments may display the captured screen in the form of a floating user interface while the captured screen moves to the specific application according to the user input, in operation 2105, under the control of the processor (e.g., the processor 120 of FIG. 1). In this case, the user input may be a drag and drop input and/or gesture on the captured screen. The specific application may be a communication application, a web hard application, and/or a social network application.

When the captured screen moves to the specific application according to the user input, the electronic device (e.g., the electronic device 101 of FIG. 1 or the electronic device 200 of FIG. 2A) according to various embodiments may display a predetermined user interface on the specific application, in operation 2107, under the control of the processor (e.g., the processor 120 of FIG. 1).

The predetermined user interface may be, for example, a user interface such as text such as "Send here" or an indicator indicating a transmission location.

The electronic device (e.g., the electronic device 101 of FIG. 1 or the electronic device 200 of FIG. 2A) according to various embodiments may transmit the captured screen to another electronic device via the specific application, in operation 2109, under the control of the processor (e.g., the processor 120 of FIG. 1).

The electronic device (e.g., the electronic device 101 of FIG. 1 or the electronic device 200 of FIG. 2A) according to various embodiments may share the captured screen with another electronic device (e.g., the electronic device 104 or the server 108) via the specific application, in operation 2109, under the control of the processor (e.g., the processor 120 of FIG. 1).

The electronic device (e.g., the electronic device 101 of FIG. 1 or the electronic device 200 of FIG. 2A) according to various embodiments may store the captured screen in a cloud storage device or the memory 130 of the electronic device (e.g., the electronic device 101 of FIG. 1 or the electronic device 200 of FIG. 2A), in operation 2111, under the control of the processor (e.g., the processor 120 of FIG. 1).

Figure 22:
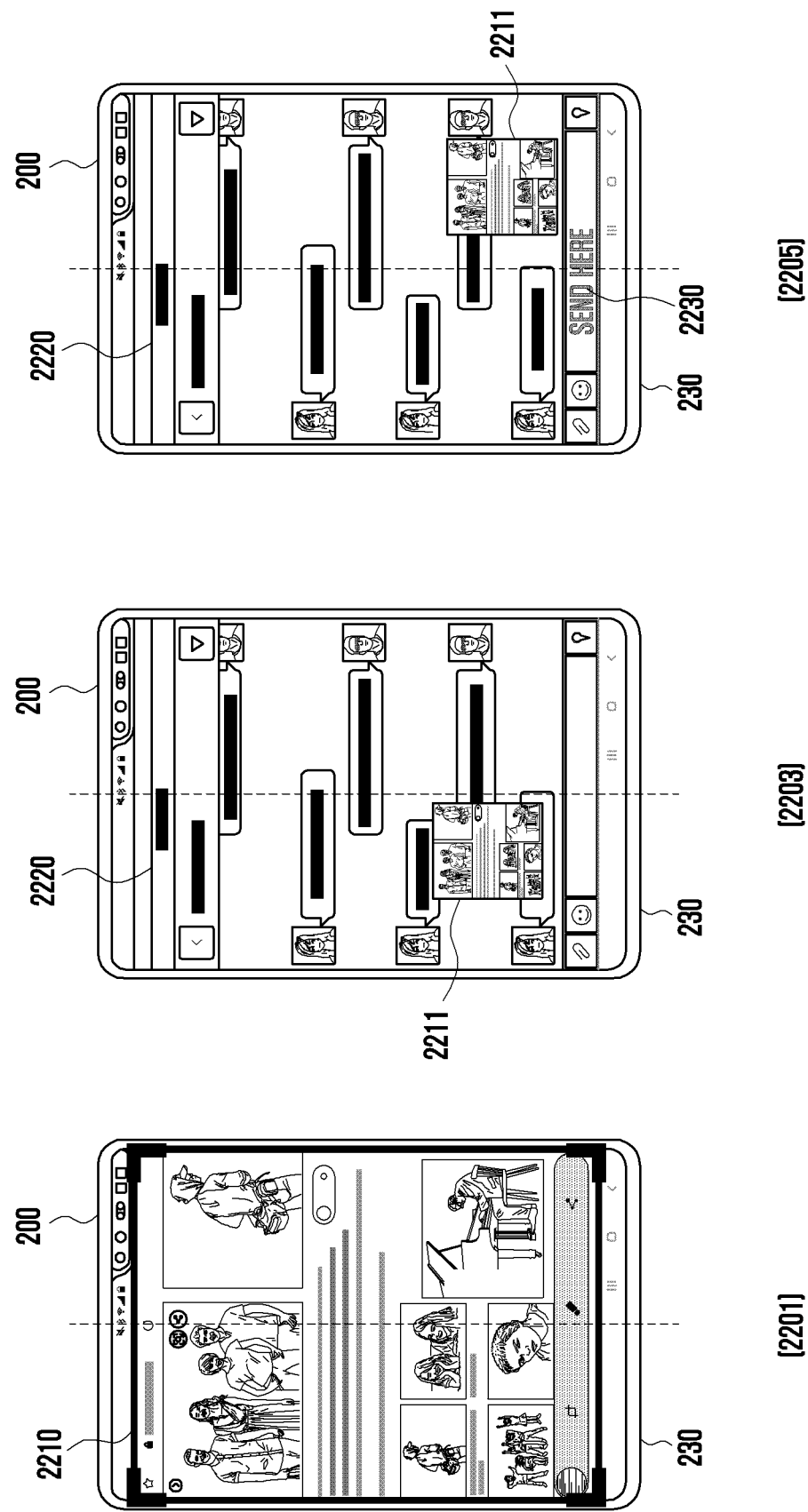
FIG. 22 is a diagram illustrating an exemplary execution of an operation of sharing a captured image by an electronic device according to various embodiments of the disclosure.

FIG. 22 is a diagram illustrating an exemplary execution of an operation of sharing a captured image by an electronic device (e.g., the electronic device 101 of FIG. 1 or the electronic device 200 of FIG. 2A) according to various embodiments of the disclosure.

On screen 2201, the electronic device (e.g., the electronic device 101 of FIG. 1 or the electronic device 200 of FIG. 2A) according to various embodiments may display a screen 2210 on the display 230, under the control of a processor (e.g., the processor 120 of FIG. 1).

On screen 2203, the electronic device (e.g., the electronic device 101 of FIG. 1 or the electronic device 200 of FIG. 2A) according to various embodiments may display a specific application 2220 when a screen is captured, and display the captured screen 2210 as a floating user interface 2211 and move the same, under the control of the processor (e.g., the processor 120 of FIG. 1).

On screen 2205, the electronic device (e.g., the electronic device 101 of FIG. 1 or the electronic device 200 of FIG. 2A) according to various embodiments may move the floating user interface 2211 on the displayed specific application 2210 according to a user input, under the control of the processor (e.g., the processor 120 of FIG. 1). In this case, the user input may be a drag and drop input and/or gesture on the captured screen. The specific application 2210 may display a predetermined user interface 2230. The predetermined user interface 2230 may be, for example, a user interface such as text such as "Send here" or an indicator indicating a transmission location.

The specific application may be a communication application, a web hard application, and/or a social network application.

The electronic device (e.g., the electronic device 101 of FIG. 1 or the electronic device 200 of FIG. 2A) according to various embodiments may transmit the captured screen 2210 to another electronic device via the specific application 2220, under the control of the processor (e.g., the processor 120 of FIG. 1).

The electronic device (e.g., the electronic device 101 of FIG. 1 or the electronic device 200 of FIG. 2A) according to various embodiments may share the captured screen 2210 with another electronic device (e.g., the electronic device 104 or the server 108) via the specific application 2220, under the control of the processor (e.g., the processor 120 of FIG. 1).

Figure 23:
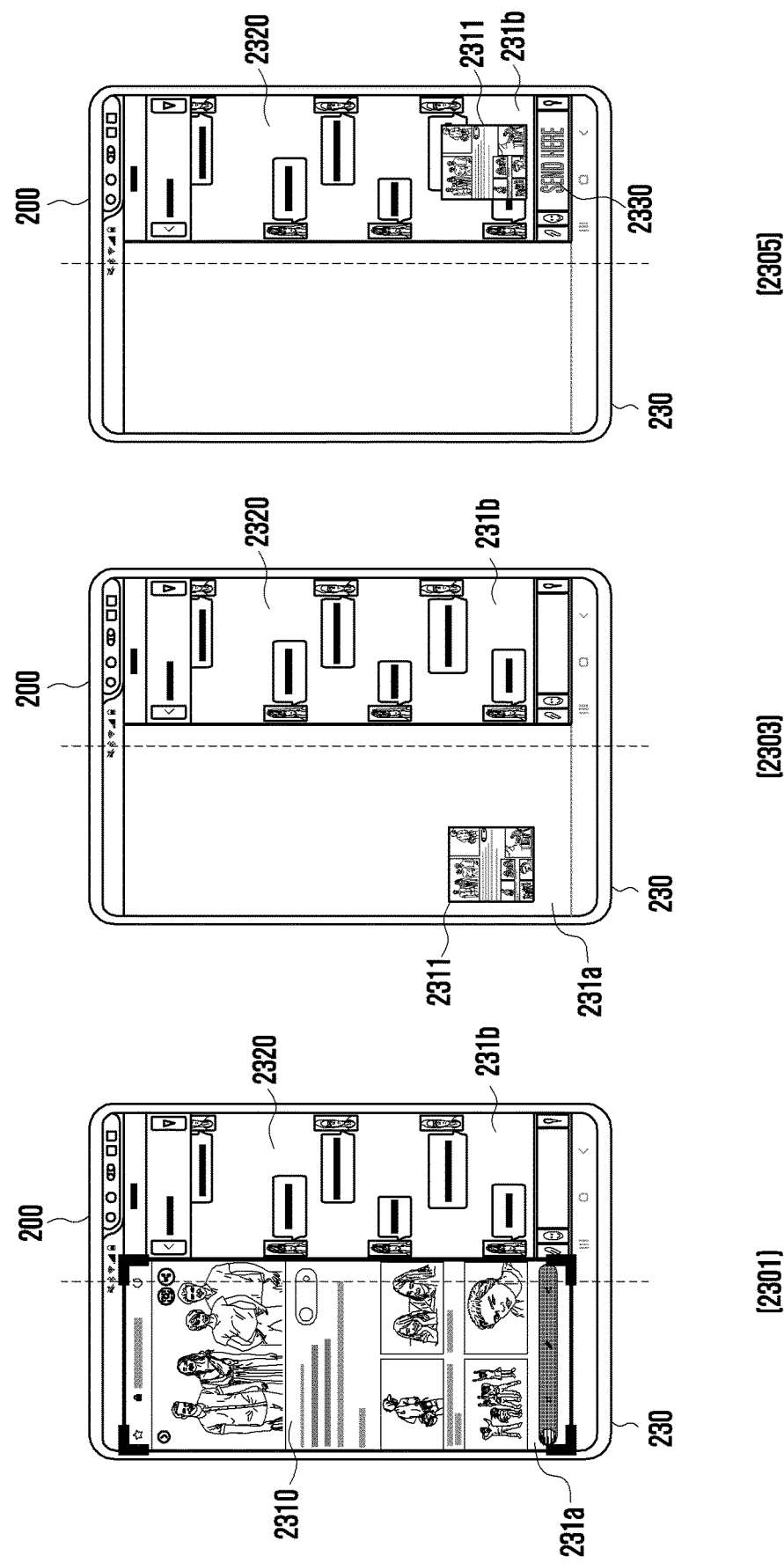
FIG. 23 is a diagram illustrating another exemplary execution of an operation of sharing a captured image by an electronic device according to various embodiments of the disclosure.

FIG. 23 is a diagram illustrating another exemplary execution of an operation of sharing a captured image by an electronic device (e.g., the electronic device 101 of FIG. 1 or the electronic device 200 of FIG. 2A) according to various embodiments of the disclosure.

On screen 2301, the electronic device (e.g., the electronic device 101 of FIG. 1 or the electronic device 200 of FIG. 2A) according to various embodiments may display a screen 2310 to be captured and an execution screen of a specific application 2320 on the display 230, under the control of a processor (e.g., the processor 120 of FIG. 1).

According to various embodiments, a capturing operation may include an operation of capturing at least a part of a screen displayed on a display (e.g., the display device 160 of FIG. 1, or the display 230 or the sub-display 252 of FIG. 2A).

According to various embodiments, the capturing operation may be an operation of capturing the screen 2310 being displayed in an area corresponding to at least one of the first area 231a or the second area 231b of the display (e.g., the display 230 of FIG. 2A).

On screen 2303, the electronic device (e.g., the electronic device 101 of FIG. 1 or the electronic device 200 of FIG. 2A) according to various embodiments may display the captured screen 2310 as a floating user interface 2311 when the screen is captured, and move the same to the specific application 2320, under the control of the processor (e.g., the processor 120 of FIG. 1).

On screen 2305, the electronic device (e.g., the electronic device 101 of FIG. 1 or the electronic device 200 of FIG. 2A) according to various embodiments may move the floating user interface 2311 on the displayed specific application 2320 according to a user input, under the control of the processor (e.g., the processor 120 of FIG. 1). In this case, the user input may be a drag and drop input and/or gesture on the captured screen. The specific application 2320 may display a predetermined user interface 2330. The predetermined user interface 2330 may be, for example, a user interface such as text such as "Send here" or an indicator indicating a transmission location.

The specific application may be a communication application, a web hard application, and/or a social network application.

The electronic device (e.g., the electronic device 101 of FIG. 1 or the electronic device 200 of FIG. 2A) according to various embodiments may transmit the captured screen 2310 to another electronic device via the specific application 2320, under the control of the processor (e.g., the processor 120 of FIG. 1).

The electronic device (e.g., the electronic device 101 of FIG. 1 or the electronic device 200 of FIG. 2A) according to various embodiments may share the captured screen 2310 with another electronic device (e.g., the electronic device 104 or the server 108) via the specific application 2320, under the control of the processor (e.g., the processor 120 of FIG. 1).

Figure 24:
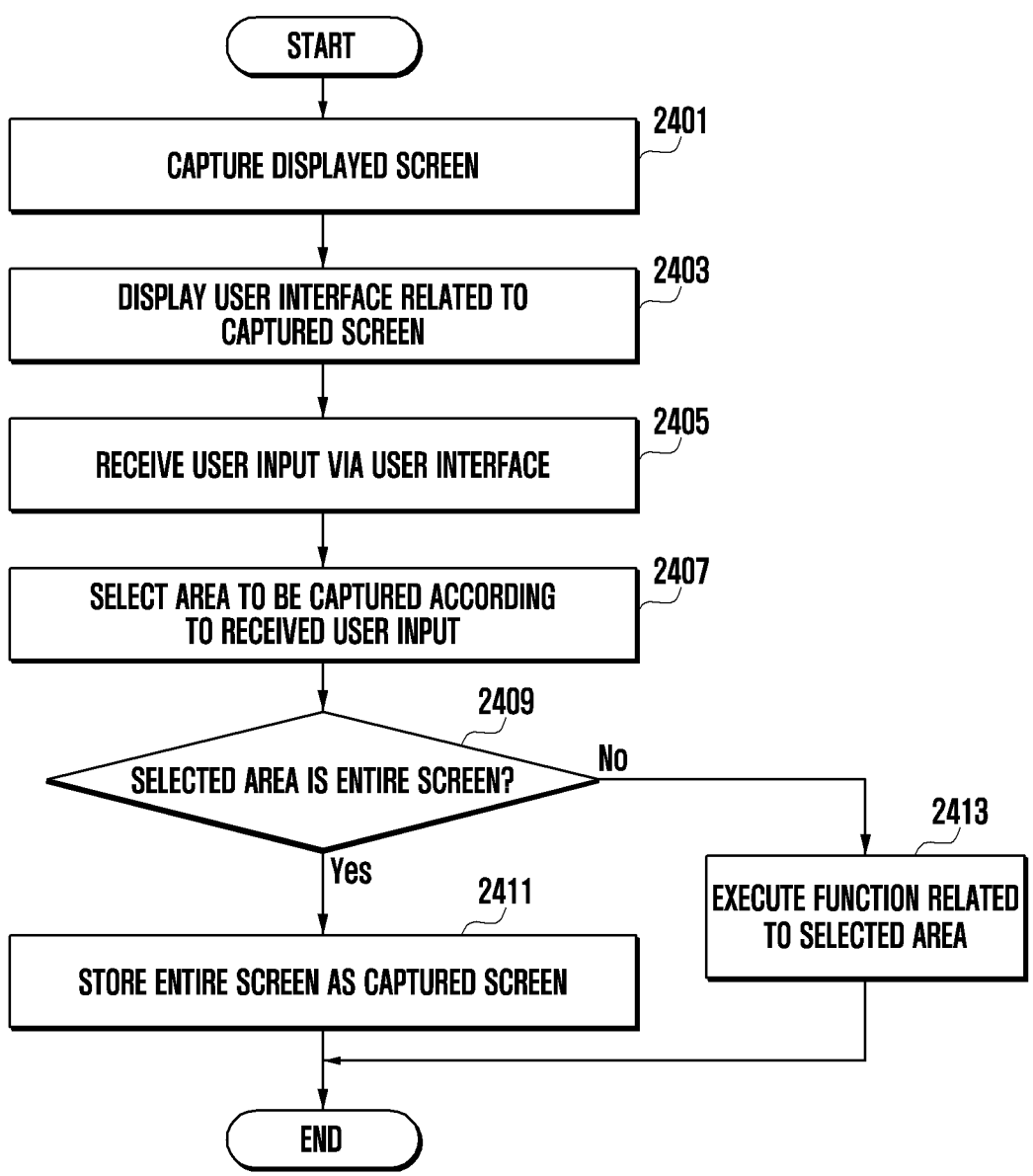
FIG. 24 is a flowchart illustrating another method of capturing a screen of an electronic device according to various embodiments of the disclosure.

FIG. 24 is a flowchart illustrating another capture operation method of an electronic device (e.g., the electronic device 101 of FIG. 1 or the electronic device 200 of FIG. 2A) according to various embodiments of the disclosure.

The electronic device (e.g., the electronic device 101 of FIG. 1 or the electronic device 200 of FIG. 2A) according to various embodiments may capture a screen displayed on a display (e.g., the display device 160 of FIG. 1, or the display 230 or the sub-display 252 of FIG. 2A) according to a capture command, in operation 2401, under the control of a processor (e.g., the processor 120 of FIG. 1).

The electronic device (e.g., the electronic device 101 of FIG. 1 or the electronic device 200 of FIG. 2A) according to various embodiments may display a user interface related to the captured screen on the display (e.g., the display device 160 of FIG. 1, or the display 230 or the sub-display 252 of FIG. 2A), in operation 2403, under the control of the processor (e.g., the processor 120 of FIG. 1).

The user interface related to the captured screen may be, for example, a floating user interface scheme including the captured screen. The floating user interface may be, for example, configured in a form in which a reduced image (e.g., thumbnail) of the captured screen is displayed to float.

In addition, the user interface related to the captured screen may be a user interface capable of selecting an area to be captured and/or a layout to be captured among the captured screen. The user interface related to the captured screen may be, for example, an icon and/or a reduced image of the captured screen.

The electronic device (e.g., the electronic device 101 of FIG. 1 or the electronic device 200 of FIG. 2A) according to various embodiments may receive a user input via the user interface, in operation 2405, under the control of the processor (e.g., the processor 120 of FIG. 1).

The electronic device (e.g., the electronic device 101 of FIG. 1 or the electronic device 200 of FIG. 2A) according to various embodiments may select an area to be captured according to the received user input, in operation 2407, under the control of the processor (e.g., the processor 120 of FIG. 1).

The electronic device (e.g., the electronic device 101 of FIG. 1 or the electronic device 200 of FIG. 2A) according to various embodiments may determine whether the selected area is the entire screen, in operation 2409, under the control of the processor (e.g., the processor 120 of FIG. 1). The entire screen may be may be a selection of an entire area to be captured and/or an entire layout to be captured, by a user input. The entire screen may be a selection of an entire area to be captured and/or layout to be captured from among a plurality of areas to be captured and/or layouts to be captured, by a user input.

When it is determined in operation 2409, under the control of the processor (e.g., the processor 120 of FIG. 1), that the selected area is the entire screen, the electronic device (e.g., the electronic device 101 of FIG. 1 or the electronic device 200 of FIG. 2A) according to various embodiments may proceed to operation 2411 branched therefrom.

When it is determined in operation 2409, under the control of the processor (e.g., the processor 120 of FIG. 1), that the selected area is not the entire screen, the electronic device (e.g., the electronic device 101 of FIG. 1 or the electronic device 200 of FIG. 2A) according to various embodiments may proceed to operation 2413 branched therefrom.

When it is determined in operation 2409, under the control of the processor (e.g., the processor 120 of FIG. 1), that the selected area corresponds to some areas to be captured and/or layouts to be captured which are selected from among a plurality of areas to be captured and/or layouts to be captured, the electronic device (e.g., the electronic device 101 of FIG. 1 or the electronic device 200 of FIG. 2A) according to various embodiments may proceed to operation 2413 branched therefrom.

The electronic device (e.g., the electronic device 101 of FIG. 1 or the electronic device 200 of FIG. 2A) according to various embodiments may store the entire screen as the captured screen when the selected area is the entire screen, in operation 2411, under the control of the processor (e.g., the processor 120 of FIG. 1). When it is determined that the selected area corresponds to some areas to be captured and/or layouts to be captured which are selected from among a plurality of areas to be captured and/or layouts to be captured, the electronic device (e.g., the electronic device 101 of FIG. 1 or the electronic device 200 of FIG. 2A) according to various embodiments may execute a function related to the selected area, in operation 2413, under the control of the processor (e.g., the processor 120 of FIG. 1). The function related to the selected area may be, for example, an operation of storing the selected area as a captured screen. The function related to the selected area may be, for example, an operation of using the selected area as a captured screen to share the captured screen with another electronic device or another user according to an additional user input.

Figure 25:
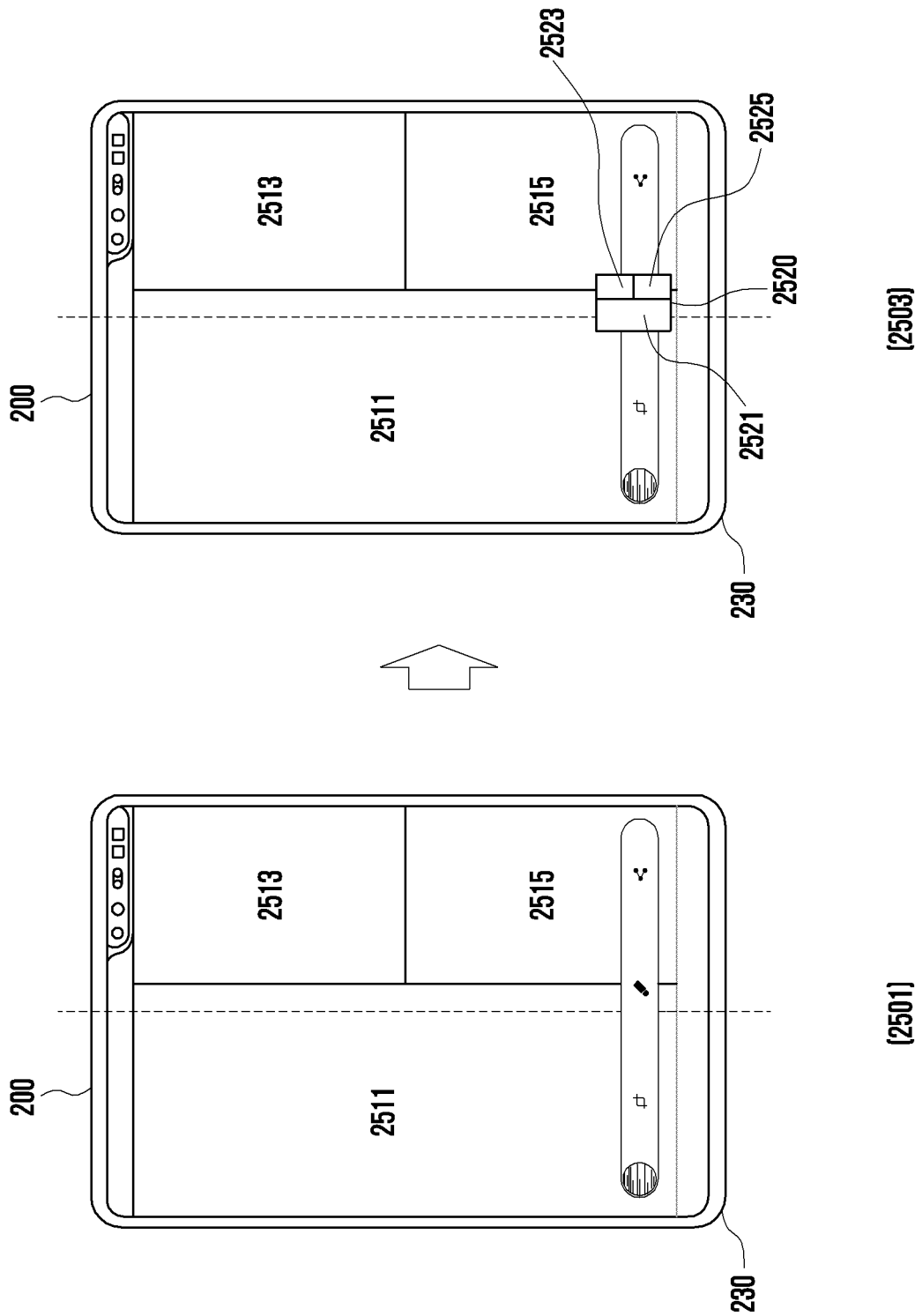
FIG. 25 is a diagram illustrating an exemplary execution of a method for displaying a user interface by an electronic device according to various embodiments of the disclosure.

FIG. 25 is a diagram illustrating an exemplary execution of a method for displaying a user interface by an electronic device (e.g., the electronic device 101 of FIG. 1 or the electronic device 200 of FIG. 2A) according to various embodiments of the disclosure.

On screen 2501, the electronic device (e.g., the electronic device 101 of FIG. 1 or the electronic device 200 of FIG. 2A) may capture a screen displayed on a display (e.g., the display device 160 of FIG. 1, or the display 230 or the sub-display 252 of FIG. 2A) according to a capture command. The displayed screen may display a plurality of windows, a plurality of areas, and/or a plurality of layouts. For example, the displayed screen may include a first window 2511, a second window 2513, and/or a third window 2515.

In operation 2503, the electronic device (e.g., the electronic device 101 of FIG. 1 or the electronic device 200 of FIG. 2A) may display a user interface 2520 related to the captured screen on the display (e.g., the display device 160 of FIG. 1, or the display 230 or the sub-display 252 of FIG. 2A). The user interface 2520 related to the captured screen may be, for example, a floating user interface scheme including the captured screen. The user interface 2520 related to the captured screen may be, for example, configured in a form in which a reduced image (e.g., thumbnail) of the captured screen is displayed to float.

In addition, the user interface 2520 related to the captured screen may be a user interface capable of selecting an area to be captured and/or a layout to be captured among the captured screen. The user interface 2520 related to the captured screen may be, for example, an icon and/or a reduced image of the captured screen. The user interface 2520 related to the captured screen may reduce and display a plurality of windows, a plurality of areas, and/or a plurality of layouts of the captured screen. For example, the displayed screen may include a first reduced window 2521, a second reduced window 2523, and/or a third reduced window 2525. When a user input for selecting an area on the user interface 2520 displayed by reducing the plurality of windows, the plurality of areas, and/or the plurality of layouts of the captured screen is received, a window and/or an area corresponding to the selected area may be designated as the captured screen. The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities, and some of the multiple entities mat be separately disposed in any other element. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

What is claimed is:

1. A capture operation method of an electronic device, the method comprising:
   capturing a screen displayed on a display;
   determining whether additional information exists on the displayed screen;
   when the additional information exists, extracting the additional information, based on the displayed screen;
   determining whether a command for modifying the captured screen has been received;
   when the command for modifying the captured screen is determined as having been received, modifying the captured screen according to a user input; and
   storing the extracted additional information and/or the captured screen as a captured image.

2. The method of claim 1, wherein the additional information extracted based on the displayed screen is window information.

3. The method of claim 1, further comprising:
   when the additional information does not exist, storing the captured screen as the captured image; and
   when a request for modification of the captured screen does not exist, storing the captured screen as the captured image.

4. The method of claim 1, wherein the extracting of the additional information based on the displayed screen comprises:
   extracting area information from a frame buffer and/or a running application;
   acquiring screen configuration information, based on the area information; and
   displaying the screen configuration information and/or display image data corresponding to the area information on the display.

5. The method of claim 1, wherein the modifying of the captured screen according to the user input comprises:
   selecting and displaying an area to be captured, according to a predetermined criterion,
   determining whether the area to be captured has been changed by the user input, and
   when the area to be captured has been changed by the user input, updating the area to be captured.

6. The method of claim 5, wherein the modifying of the captured screen according to the user input further comprises, when the area to be captured has not been changed by the user input, maintaining selection of the area to be captured, which has been selected according to the predetermined criterion.

7. The method of claim 5, wherein the selecting of the area to be captured, which has been selected according to the predetermined criterion, comprises at least one of:
   selecting and displaying a largest window among multi-windows as the area to be captured,
   selecting and displaying a screen corresponding to a window used by a user immediately before a capture command in the multi-windows as the area to be captured, and
   when the electronic device receives a command for capturing an image on a sub-display in a folded state and then switches into an unfolded state, selecting and displaying a screen associated with the image displayed on the sub-display as the area to be captured.

8. The method of claim 1, wherein the capturing of the screen displayed on the display comprises capturing the displayed screen while the electronic device is in a folded state, and wherein the method further comprises:
   determining whether the electronic device has been changed from the folded state to an unfolded state;
   when the folded state has been changed to the unfolded state, selecting and displaying a screen associated with the screen captured in the folded state as an area to be captured;
   determining whether the area to be captured has been changed by the user input; and
   when the area to be captured has been changed by the user input, updating the area to be captured.

9. The method of claim 1, wherein the storing of the extracted additional information and/or the captured screen as the captured image comprises:
   determining whether information associated with the captured screen exists; and
   when the associated information exists, storing the captured screen together with the associated information as the captured image.

10. The method of claim 1, further comprising:
displaying the captured screen on the display; and
when the captured screen moves to a specific application according to the user input, transmitting the captured screen to another electronic device via the specific application.

11. An electronic device comprising:
a display;
a processor operatively connected to the display; and
a memory operatively connected to the processor,
wherein the memory stores instructions which, when executed, cause the processor to:
capture a screen displayed on the display;
determine whether additional information exists on the displayed screen;
when the additional information exists, extract the additional information, based on the displayed screen;
determine whether a command for modifying the captured screen has been received;
when the command for modifying the captured screen is determined as having been received, modify the captured screen according to a user input; and
store the extracted additional information and/or the captured screen as a captured image in the memory.

12. The electronic device of claim 11, wherein the additional information comprises window information.

13. The electronic device of claim 11, wherein the instructions, when executed, further cause the processor to:
when the additional information does not exist, store the captured screen as the captured image; and
when a request for modification of the captured screen does not exist, store the captured screen as the captured image.

14. The electronic device of claim 11, wherein the instructions, when executed, further cause the processor to:
extract area information from a frame buffer and/or a running application;
acquire screen configuration information, based on the area information; and
display the screen configuration information and/or display image data corresponding to the area information on the display.

15. The electronic device of claim 11, wherein the instructions, when executed, further cause the processor to:
select and display an area to be captured, according to a predetermined criterion;
determine whether the area to be captured has been changed by the user input; and
when the area to be captured has been changed by the user input, update the area to be captured.

16. The electronic device of claim 15, wherein the instructions, when executed, further cause the processor, when the area to be captured has not been changed by the user input, to maintain selection of the area to be captured.

17. The electronic device of claim 15, wherein the instructions, when executed, further cause the processor, when selecting the area to be captured, which has been selected according to the predetermined criterion, to do at least one of:
select and display a largest window among multi-windows as the area to be captured;
select and display a screen corresponding to a window used by a user immediately before a capture command in the multi-windows as the area to be captured; and
when the electronic device receives a command for capturing an image on a sub-display in a folded state and then switches into an unfolded state, select and display a screen associated with the image displayed on the sub-display as the area to be captured.

18. The electronic device of claim 11, wherein the instructions, when executed, further cause the processor to:
capture the displayed screen while the electronic device is in a folded state;
determine whether the electronic device has been changed from the folded state to an unfolded state;
when the folded state has been changed to the unfolded state, select and display a screen associated with the screen captured in the folded state as an area to be captured;
determine whether the area to be captured has been changed by the user input; and
when the area to be captured has been changed by the user input, update the area to be captured.

19. The electronic device of claim 11, wherein the instructions, when executed, further cause the processor to:
determine whether information associated with the captured screen exists; and
when the associated information exists, store the captured screen together with the associated information as the captured image.

20. The electronic device of claim 11, wherein the instructions, when executed, further cause the processor to:
display the captured screen on the display; and
when the captured screen moves to a specific application according to the user input, transmit the captured screen to another electronic device via the specific application.

* * * * *